(12) United States Patent
Tadayon et al.

(10) Patent No.: US 8,145,199 B2
(45) Date of Patent: Mar. 27, 2012

(54) CONTROLLING MOBILE DEVICE FUNCTIONS

(75) Inventors: Saied Tadayon, Potomac, MD (US); Maryam Halavi, Fairfax, VA (US)

(73) Assignee: BT Patent LLC MD (US)

( * ) Notice: Subject to any disclaimer, the term of this patent is extended or adjusted under 35 U.S.C. 154(b) by 0 days.

(21) Appl. No.: 13/091,119

(22) Filed: Apr. 20, 2011

(65) Prior Publication Data

US 2011/0195699 A1 Aug. 11, 2011

Related U.S. Application Data

(63) Continuation-in-part of application No. 12/610,319, filed on Oct. 31, 2009.

(51) Int. Cl.
*H04M 3/00* (2006.01)
(52) U.S. Cl. ........................................................ 455/418
(58) Field of Classification Search ................... 455/418
See application file for complete search history.

(56) References Cited

U.S. PATENT DOCUMENTS

| 2011/0105097 A1* | 5/2011 | Tadayon et al. | 455/418 |
| 2011/0195699 A1* | 8/2011 | Tadayon et al. | 455/418 |

* cited by examiner

*Primary Examiner* — William D Cumming
(74) *Attorney, Agent, or Firm* — Bijan Tadayon; Saied Tadayon

(57) ABSTRACT

This provides for controlling mobile device functions and features, along with systems incorporating these devices and methods. For example, it limits or disables the use of some of mobile device features which could cause distraction to the user, when the user is engaged in another activity. In an example, it enables other mobile device features based on occurrence of events related to the user or environment. Another example addresses controlling the mobile device features, such as SMS, while the user is in a vehicle or driving. Another example restricts the ability of the driver of a vehicle to text, while the vehicle is in motion, by automatically disabling the texting ability of mobile device within and around the perimeter of the driver's seat. Other variations, examples, improvements, detection mechanisms, models, techniques, calculations, verification mechanisms, and features are also described in details.

25 Claims, 26 Drawing Sheets

PRIOR ART

CONTROLLING MOBILE DEVICE FUNCTIONS

RELATED APPLICATIONS

This application is a continuation-in-part (CIP) of an earlier co-pending U.S. application Ser. No. 12/610,319, filed on 31 Oct. 2009, by the same inventors and same assignee, under the same title, just adding some examples for illustration.

BACKGROUND OF THE INVENTION

Modern mobile devices provide many functionalities including telephony (e.g., cellular phone, VOIP), PDA (personal digital assistance) (e.g., contact/address list, games, photos), network connectivity (e.g., Internet web browser, email, short message service (SMS), mapping/location services). Generally, the mobile device user explicitly controls which applications/functionalities to use at a given moment. For example, the user might use SMS services (or texting) at any location where there might be network connectivity. Given that the network connectivity has become more prevalent, the mobile device users tend to use the functionality of mobile devices in more places and situations.

An example of these mobile device functionalities is the text messaging (or texting) which is a communication method between mobile devices over cellular networks wherein short written messages are exchanged between mobile telephone devices, using a communication service standard commonly known as SMS. Given the gateways between the IP networks and telephone networks, one or more SMS users may be on one or both types of networks. This messaging service has been extended to Multimedia Messaging Service (MMS) to include multimedia messages, e.g., containing video, still image, and sound.

This method of communication and its underlying technology has grown to such a great level that it has become one of the most widely used form of mobile communication in the world, wherein almost every mobile phone service provider has made it available to its users as part of its service, covering several billions active users, spanning almost every age group.

The typical mobile device (shown schematically in FIG. 6) includes an audio interface (612) block connected to speaker unit (610) and microphone (611) on one side, and digital signal processor (DSP) block (613) on the other side. Audio interface block usually includes a digital-to-analog converter (DAC), being coupled to a speaker, and an analog-to-digital converter (ADC), being coupled to microphone, to digitize the audio voice and to send the digitized voice to DSP for further processing. DSP, which is considered processing heart of the mobile telephone system, communicates with audio interface block and RF interface block (616), and digitally performs such signal processing functions as speech coding/decoding, error detection/correction, channel coding/decoding, signal equalization, and demodulation, as is well-known to those skilled in the art.

Typically, DSP performs under the control of microprocessor/controller (615), and may further be coupled to an application specific integrated circuit (ASIC) block (614), where it can help with the operation of DSP in some application specific functions in the background, as known to those skilled in the art. RF interface block which is coupled to DSP, receives digitally processed base band signal from DSP, and it for example performs quadrature (complex) modulation on the digital base band signal, converts the modulated digital signal to analog form, using digital-to-analog converter, and sends the modulated analog signal to transmitter block (618) for further frequency up conversion to radiofrequency (RF), for wireless transmission through power amplification block (621) and antenna (622).

In the receiving side of mobile telephone system, downlink wireless RF signals are received by the receiver block (619) via the antenna. Receiver block amplifies the received RF signal through an automatic gain control unit, down converts the amplified RF signal to intermediate frequency (IF) by mixing it with a locally generated reference signal (620), and passes the IF signal on to interface block (616) for quadrature (complex) demodulation, with filtering and analog-to-digital conversion as is well-known to those skilled in the art.

Digital signal processor (DSP) block receives the digitized IF signal from the interface block and performs various signal processing techniques such as demodulation, equalization, error detection/correction, and signal detection, and forwards the detected signal (i.e. voice) to audio interface block, to be converted to analog voice, amplitude controlled (i.e. amplified or attenuated) and sent to the speaker block.

As those skilled in the art recognize, most of the above operation is performed under the control of microprocessor/controller block (615). In a typical mobile telephone system, as depicted above, microprocessor/controller block performs such functions as level 2/3 protocol, radio services management, man/machine interface, operating system (OS) software, and short message service (SMS). The operations of both keyboard and display (617) are under the control of the microprocessor/controller. Mobile devices also include local memory/storage (623) used by the processor and/or other components of the system.

As is known to those skilled in the art (and from sources such as printed publications or online technical articles, e.g., WIKIPEDIA®(An Internet community information web site), during the text messaging, microprocessor/controller receives alphanumeric information from the keyboard, uses SMS services software embedded in its memory, converts the alphanumeric information into short message format, and typically sends the generated message to DSP to be processed and sent over the control channel to a short message service center (SMSC), which provides a store-and-forward mechanism to forward the text messages to the intended recipient.

Although this method of communication service has provided unprecedented level of mobile phone subscriber service, it may be desirable to limit/disable the use of some of mobile device features which could cause distraction to the user when the user is engaged in another activity. For example, statistics indicate that the likelihood of being involved in a traffic accident, while driving and using a hand-held device, is four times more than any other situations. One the other hand, it may be desirable to enable other mobile device features based on occurrence of events related to the user or environment. For an example, this invention addresses controlling the mobile device features, such as SMS, while the user is in a vehicle.

SUMMARY OF THE INVENTION

This invention provides for controlling mobile device functions and features. For example, an embodiment of this invention limits or disables the use of some of mobile device features which could cause distraction to the user when the user is engaged in another activity. An embodiment of this invention enables other mobile device features based on occurrence of events related to the user or environment.

An embodiment of this invention addresses controlling the mobile device features, such as SMS, while the user is in a vehicle.

An embodiment of this invention restricts the ability of the driver of a vehicle to text while the vehicle is in motion, by automatically disabling the texting ability of mobile device within and around perimeter of driver's seat, while the vehicle is in motion.

Other variations, examples, improvements, detection mechanisms, models, techniques, calculations, verification mechanisms, and features are also described in details.

DETAILED DESCRIPTION OF THE PREFERRED EMBODIMENTS

Figure 1:
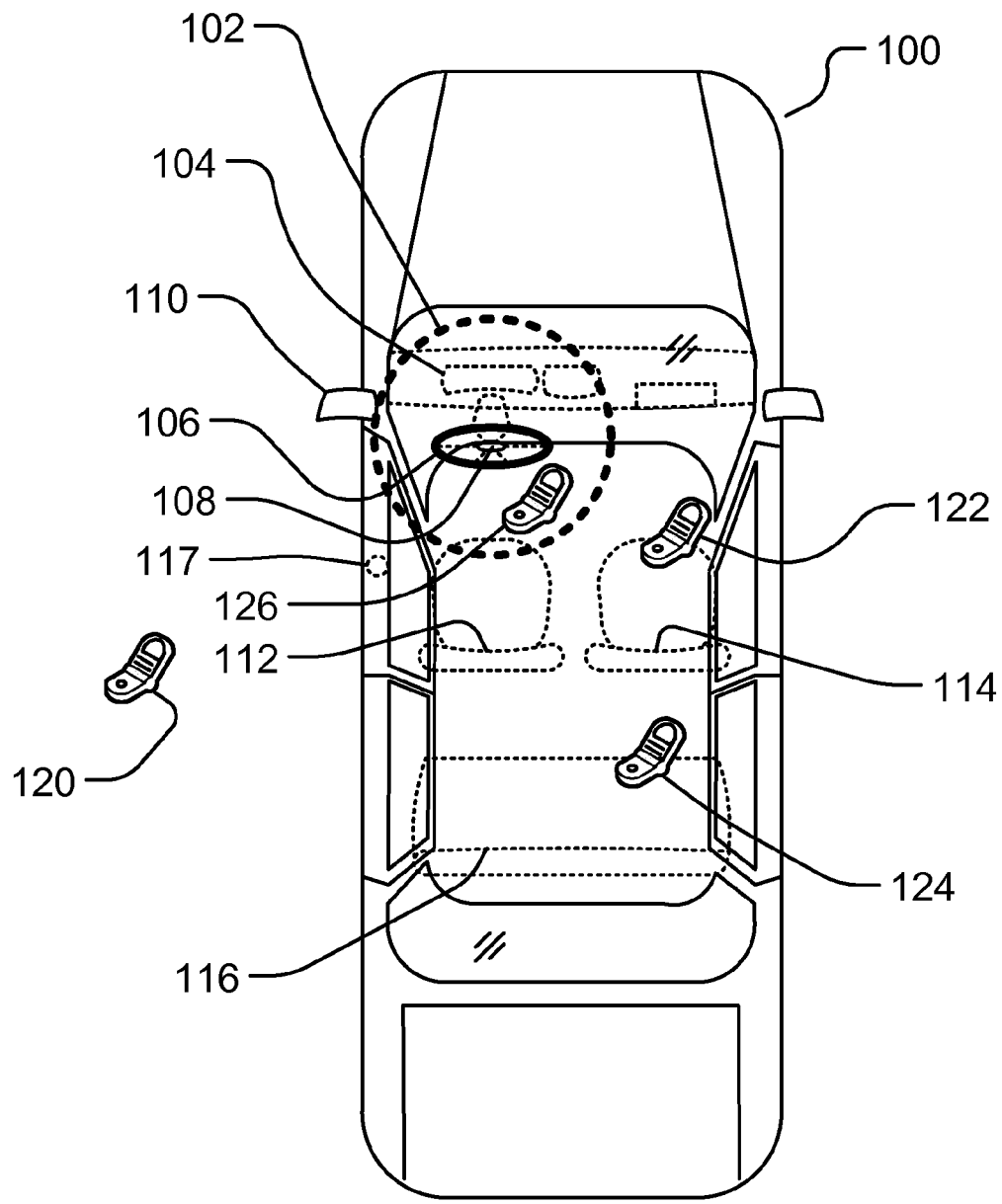
FIG. 1 illustrates several positions of a mobile device within and outside of a vehicle for an embodiment of this invention.

In one embodiment of this invention, as illustrates in FIG. 1, a transceiver (108) is placed on or about the steering wheel (106) of a vehicle (100). In one embodiment, the transceiver (108) has a limited effective range (102) of few feet. In one embodiment, the effective range is about the range of where the driver of the vehicle would be located/seated (e.g., driver seating on the driver seat (112)). In one embodiment, the transceiver is located at/about/under the driver side control panel (104), driver's seat (112), driver's door (117), or driver side mirror (110). In one embodiment, when a mobile device is located outside (120) of vehicle (i.e., sufficiently far (e.g., few feet) from the driver side seat (112), or inside vehicle at/near front (122) passenger seat (114), or at/near backside (124) passenger seat (116), the mobile device is out of effective range (102) of the transceiver (108).

In one embodiment, when localized transmitter/transceiver (e.g., 108) is activated (e.g., by turning on the vehicle (e.g., ignition) and setting the gear outside of Park position), the localized transmitter/transceiver sends a code.

In one embodiment, when the RF signal level received (400) by the mobile device from a localized transmitter/transceiver (e.g., 108) is above a threshold signal level power, the mobile device decodes (or processes as in another embodiment) a code sent by the localized transmitter/transceiver. In one embodiment, the effective range (e.g., 102) of transmitter/transceiver is set so that within the effective range, the received power level by a mobile device (e.g., 126) is above the threshold signal power level, while substantially outside the effective range (e.g., at 120, 122, or 124), the received power level by the mobile device from the localized transmitter/transceiver (108) is lower than the threshold signal level power.

Figure 4:
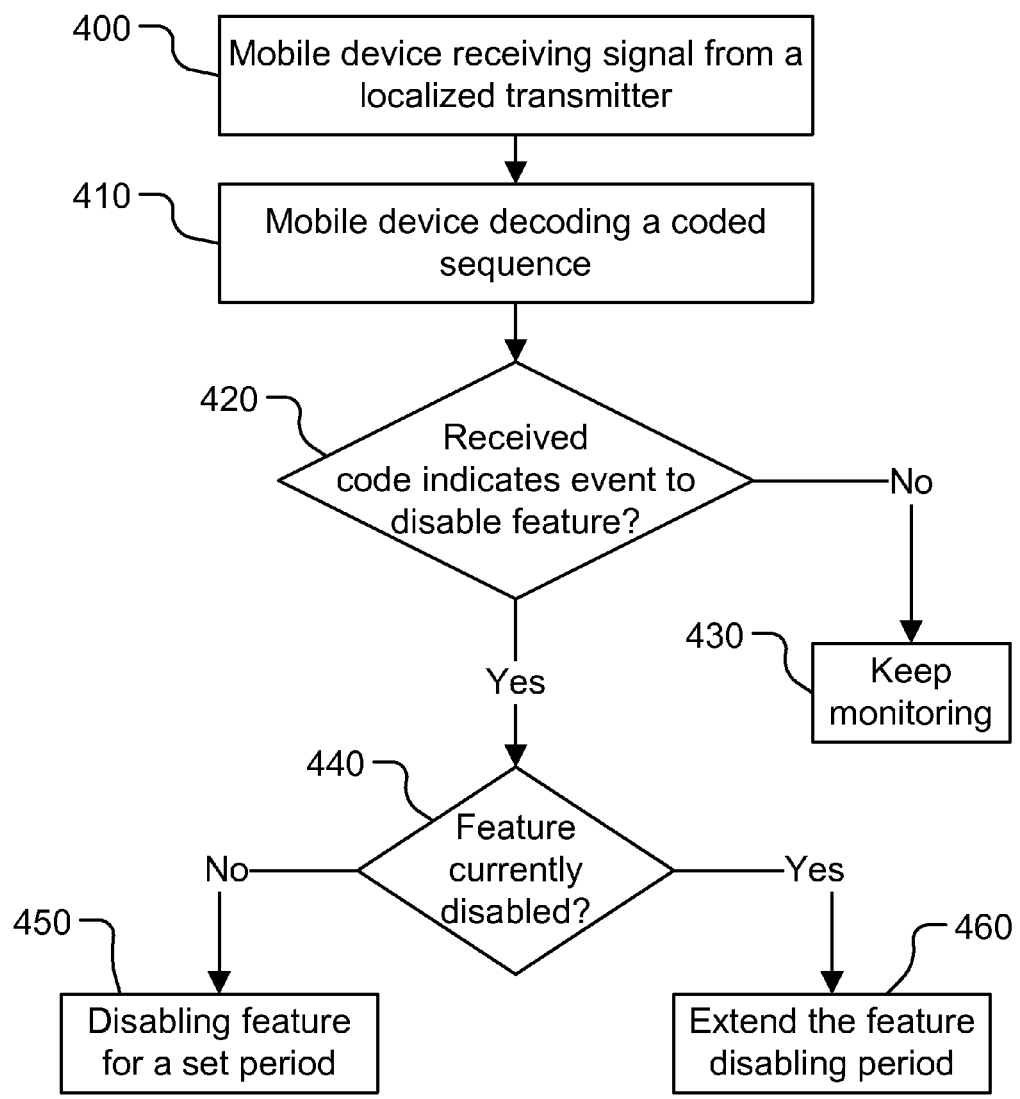
FIG. 4 illustrates steps in disabling/modifying a feature of the mobile device in an embodiment of this invention.

As illustrated by FIG. 4, in one embodiment, after the mobile device receives a signal from a localized transmitter/transceiver (e.g., 108), the mobile device decodes (e.g., via a running program or in firmware) a coded sequence or a code sent from the localized transmitter/transceiver (410). In one embodiment, if the received code matches a preconfigured code or code sequence, it would indicate that an event has occurred (e.g., the mobile device has entered an effective range of the localized transmitter/transceiver). In one embodiment, such event would indicate that one or more feature or functionality of the mobile device (e.g., SMS) should be changed (e.g., to become limited or disabled) (e.g., 420). If so, in one embodiment, the feature (e.g., SMS) of the mobile device is changed (e.g., disabled) if not already disabled (440).

In one embodiment, the duration of the feature modification is a set (450) to a period of time (e.g., 30 seconds).

In one embodiment, upon occurrence of other events (e.g., an emergency event indicated by a signal/input to the mobile device), the disabled or limited feature of the mobile device is restored. In one embodiment, when user dials an emergency number or the mobile device enters an emergency mode, the disabled or limited feature of the mobile device is restored.

In one embodiment, when the code received from the localized transmitter/transceiver indicates e.g., an enabling event, the mobile device terminates the period of feature modification and restores the corresponding feature/functionality. For example, if the driver sets the vehicle on the Park position, the localized transmitter/transceiver sends an enabling code to the mobile device indicating that the feature (e.g., SMS) can be restored. In an embodiment, where a status of vehicle (such as speed) is used to determine the modification of a feature, when the vehicle comes to full stop, the limited feature becomes enabled again (e.g., after a predefined period of time such as 10 seconds), e.g., by sending an enabling code to the mobile device from a localized transmitter.

In one embodiment, the configurations and rules are dynamically configurable via the user interface on the car computer/control, the mobile device, or a remote server (e.g., a web server). In one embodiment, the operational settings (e.g., how often the code is transmitted by the transceivers (e.g., every 15 seconds)) is also configurable via a control panel (e.g., attached to a localized unit via a car computer panel, or via the mobile device).

In one embodiment, when the mobile device receives a code indicating an event to modify (e.g., limit/disable) a feature (e.g., SMS), and the feature is already modified (440) (e.g., SMS is already disabled/limited, e.g., due to prior code transmission), the remaining time period for maintaining the feature modification is extended to a predefined time period (e.g., 460). In one embodiment, the extending time period is the same as the original time period for feature modification. In another embodiment, the extending time period is shorter or longer than the original time period for feature modification. For example, in one embodiment, upon receiving the code from the localized transmitter/transceiver, the SMS feature of the mobile device is disabled/limited for 30 seconds. If after 25 seconds, similar code is again received by the mobile device, the remaining 5 second turns to 30 seconds, in an embodiment for which the original time period is the same as the extending time period for the feature modification. However, in one embodiment, when the extending time period (e.g., 4 seconds) is shorter than the original (e.g., 30 seconds), the remaining time is extended if the remaining time is less than the extending time period. In this example, the remaining time period remains as 5 seconds because it is more than 4-second extending time period. In one embodiment, the remaining time is tracked in a variable (memory location). In one embodiment, the expiration time is stored in a variable (memory location). In one embodiment, the remaining time is updated periodically or the expiration time is checked against the current time (e.g., from local system or synchronized from network via NTP) periodically to determine when expiration is reached.

In one embodiment, one or both of the original time period and the extending time period for the feature modification are configurable on the mobile device. In one embodiment, one or both of these time periods are transmitted to the mobile device via the localized transmitter/transceiver. In one embodiment, the mobile device receives one or both of these time period values from a push (or pull) service from the corresponding telephone carrier or from a server in network or Internet.

In one embodiment, the mobile device is equipped with GPS (Global Positioning System) service or receives its (or vehicle's) position from another GPS system (e.g., from a GPS service on the vehicle or an emergency service provider on the vehicle). In one embodiment, the mobile device or the computer/GPS on the vehicle (periodically or on-demand) determine the locality/jurisdiction/state/country by using mapping/address/location services (e.g., via Internet or a local database). In one embodiment, a change in locality/jurisdiction/state/country is identified by comparing subsequent GPS readings. In one embodiment, upon a change in locality/jurisdiction/state/country, the original time period and the extending time period for the feature modification corresponding to current locality/jurisdiction/state/country is determined, e.g., by querying a local database or downloading data from a service from Internet, and these time values (or other parameters provided by the service, e.g., speed limits) are used subsequently to modify the mobile device feature.

In one embodiment, when and how long to maintain the feature modification is determined by a set of rules and configuration values, which are executed in a rule-based engine (e.g., in a mobile device, vehicle computer, or a server on a network). In one embodiment, the rules are downloaded upon querying by the mobile device or the vehicle's computer based on the geography (e.g., location of the vehicle or mobile device), type of the vehicle, and/or one or more attributes of the driver or passenger(s) (e.g., age, occupation, or exemptions).

In one embodiment, when the mobile device (e.g., 126) whose one of its features is already modified, leaves the effective range of a localized transmitter/transceiver (e.g., 108) or does not receive a further code indicating extension of the feature modification period, the modified feature is restored to previous state when the remaining modification period is over.

Figure 12:
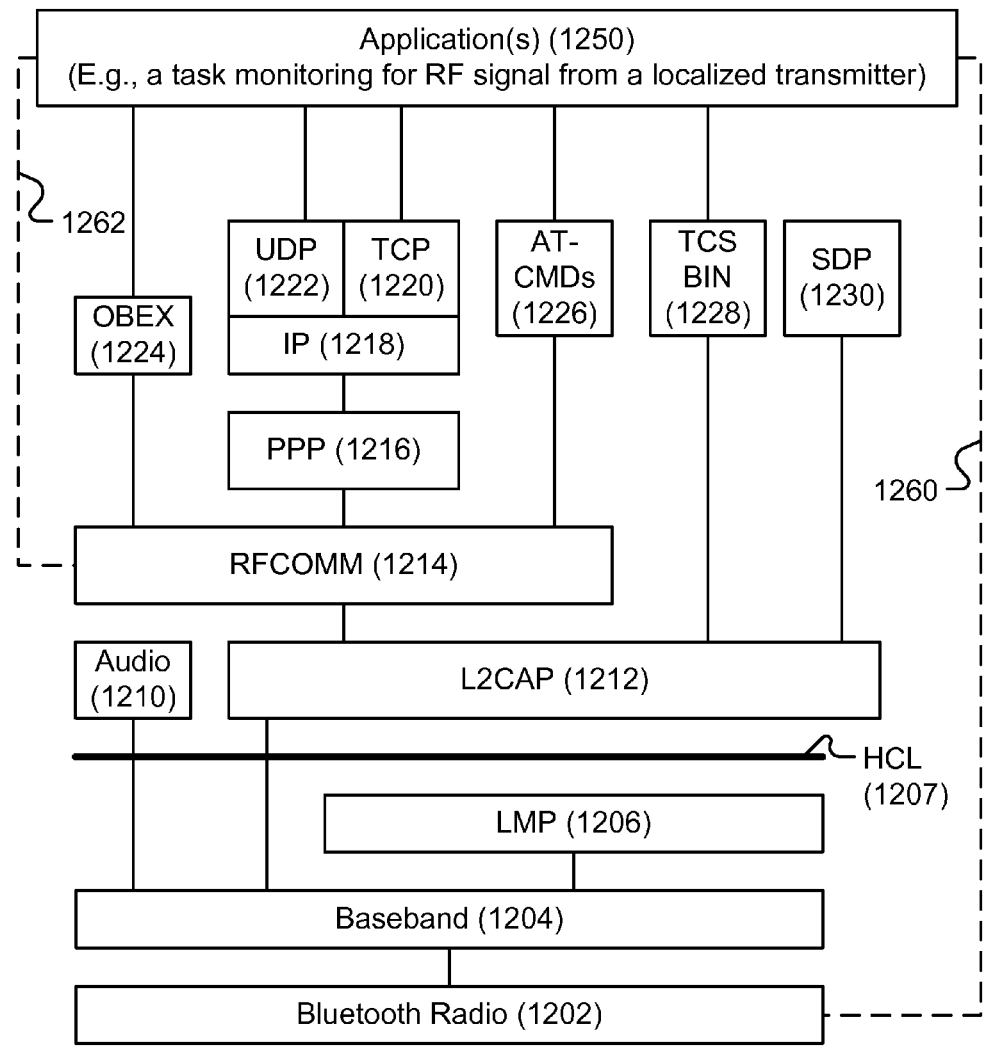
FIG. 12 illustrates a typical BLUETOOTH®(A wireless technology protocol) networking stack with an application layer.

In one embodiment, the mobile device keeps monitoring (e.g., 430) for an RF signal from a localized transmitter/transceiver. For example, in one embodiment, a program/task running on the mobile device periodically checks for such signal or is notified by an underlying hardware/firmware/operating system/RF modules that a signal has been received. In one embodiment, the communication between the local transceiver and the mobile device is performed through BLUETOOTH®(A wireless technology protocol) (or related) technology. FIG. 12 shows a typical transport stack of BLUETOOTH®(A wireless technology protocol) from physical layer (1202) through Application layer (1250). In principle, a signal monitoring application can be implemented at any layer or directly use one or more layers in the stack. In one embodiment, a monitoring application uses OBEX (1224), UDP (1222), or TCP (1220) to communicate with the localized transceiver. For example, in one embodiment, the signal monitoring application opens a port (UDP or TCP) with a predetermined port number for listening for incoming messages. In one embodiment, the signal monitoring application uses (1262) a lower layer such as RCOMM (1214) or L2CAP (1212) directly to communicate with the localized transceiver. In one embodiment, a signal monitoring program determines the received signal power level from drivers or directly from physical layer (or higher layer) (1260). In one embodiment, the monitoring program runs as a background task. In one embodiment, the background task runs even when the mobile device is in sleep mode, e.g., to conserve battery power (e.g., by turning off the display).

Figure 13:
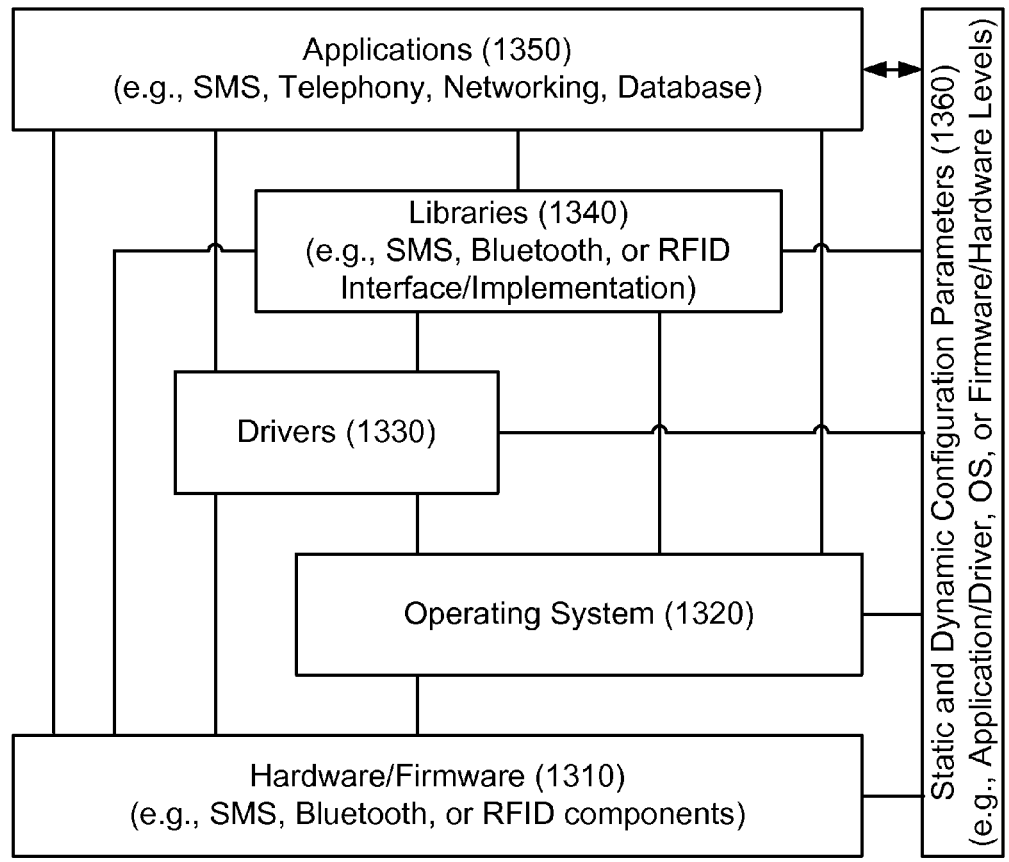
FIG. 13 illustrates dependencies of various software components and configurations in a mobile device.

In one embodiment, when the signal monitoring application receives a code from a localized transmitter/transceiver, it modifies or triggers modification of a mobile device feature/function (e.g., SMS). In one embodiment, the signal monitoring application is integrated part of function/feature to be modified (e.g., integrated or a module of SMS application). In such an embodiment, a tight integration between the signal monitoring module and core functionality control enables one to modify the functionality directly, e.g., via non-public API (Application Programming Interface) or direct calls. In one embodiment, the signal monitoring application and the feature/function to be modified are not as tightly integrated. In such an embodiment, there are various methods that the feature modification may be achieved. For example, the triggering application (i.e., the signal monitoring application) calls one or more APIs of the triggered application (i.e., SMS application), to modify the feature. In such an embodiment, the triggered application supports modification of the feature via those APIs. In one embodiment, the triggering application modifies configuration data (1360) used by the triggered application and/or other underlying software/firmware/hardware. For example, FIG. 13 illustrates a typical application stack and interdependencies between hardware (1310), operating system (OS) (1320), drivers (1330), interface/implementation libraries (1340), and applications (1350), as well as configuration data (1360). Depending on the configuration and the nature of the modules, the behavior of the module is affected by available configurations. Some configurations are allowed to be modified and some are dynamically used by their respective modules. In one embodiment, the triggering application modifies a configuration for a lower level module (e.g., a driver 1330) to modify the feature supported by the driver and used by one or more triggered applications at a higher level (1350). In this case, if there are multiple applications supporting the feature to be modified (e.g., several SMS applications on the mobile device) which use a common module (e.g., a driver), the feature may be modified by configuring/affecting the common module.

In one embodiment, the triggering application identifies (e.g., by querying the OS) the applications/processes that provide the feature to be modified, for example, by using the signatures of those triggered applications. In one embodiment, the triggering application terminates the identified triggered applications (if they are running), e.g., by sending a command to the OS or using an inter-process messaging. In one embodiment, the triggering application prevents launching of the triggered applications via the mobile device user interface, e.g., by temporary disabling access to the triggered application. In one embodiment, the triggering application sends messages via an inter-process messaging to affect the behavior of the triggered application and modify a feature supported by the triggered application.

Figure 2:
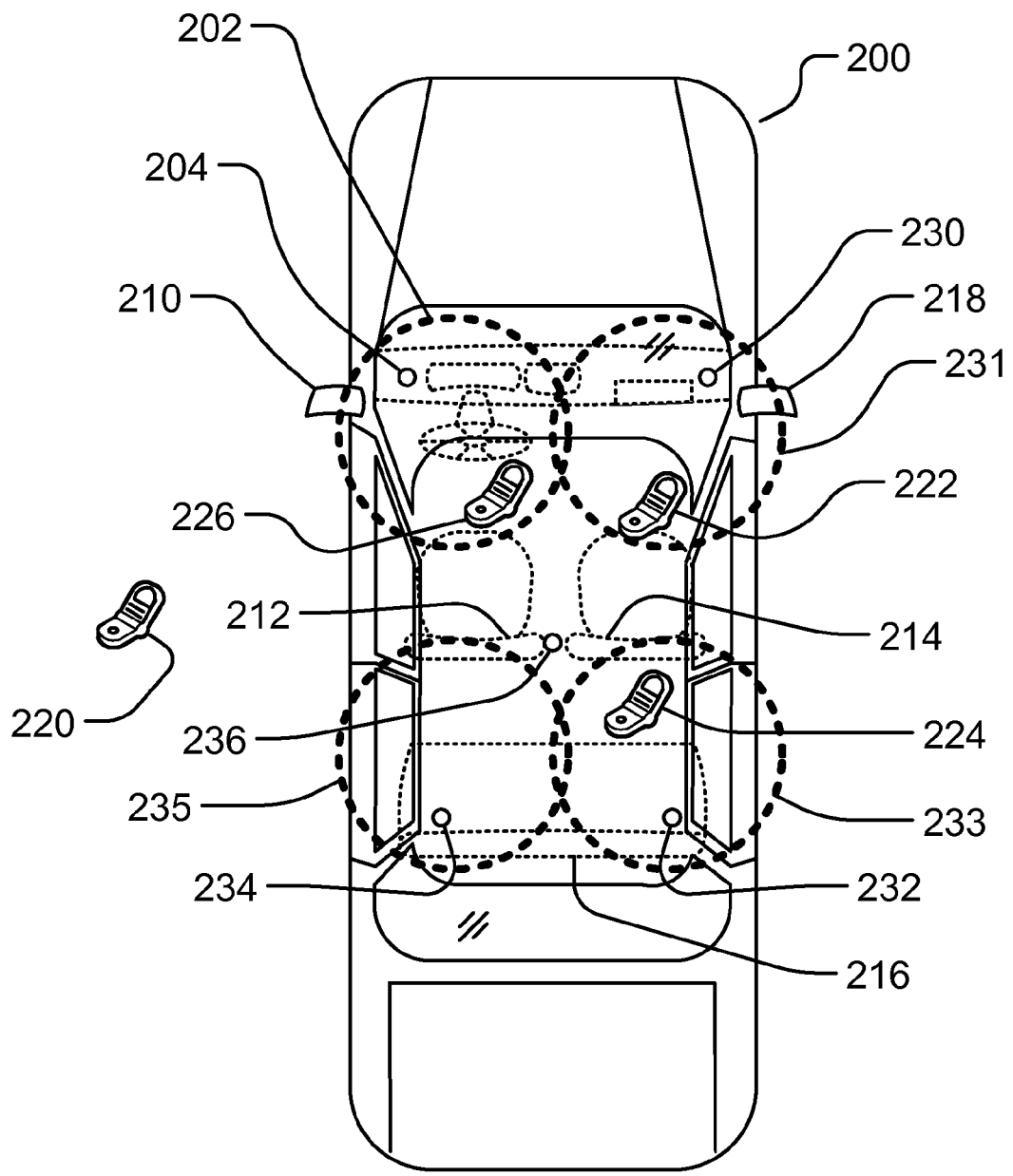
FIG. 2 illustrates multiple transmitters/receivers/transceivers placed, e.g., on a vehicle, used in an embodiment of this invention.

As illustrated in FIG. 2, in one embodiment, multiple local transmitters/transceivers (e.g., 204, 230, 232, 234, and 236) are placed on a vehicle (200). In one embodiment, one or more of these local transmitters/transceivers (e.g., 204, 230, 232, and 234) have a short effective range (e.g., few feet) (e.g., 202, 231, 233, and 235, respectively). In such an embodiment, if the mobile device is moved around inside the vehicle, its location may be monitored/tracked, based on the events related to the mobile device getting in RF range of one or more of these local transmitters/transceivers. In one embodiment, when the mobile device exits the effective range (202) of the local transmitter/transceiver corresponding to the driver (204), and it enters (e.g., at 222) the effective range (e.g., 231) of another local transmitter/transceiver (e.g., 230), the mobile device receives a code indicating, for example, in-range event from local transmitter/transceiver 230, and the modified feature on the mobile device is restored. In such embodiment, instead of driver (at 212) attempting to use a feature (e.g., SMS), the mobile device can be handed to a person on the passenger side (at 214) to perform the function. Similarly, the mobile device (e.g., at 224) can be used by a person on the back seat (216) to perform the task. In one embodiment, if the mobile device is taken outside vehicle (e.g., at 220), the functionality is restored, e.g., due to the lack of receiving a code from the local transmitter/transceiver 204 to extend the feature modification period.

In one embodiment, the multiple transmitters/transceivers are positioned so that their effective ranges map the interior of the vehicle where the driver and passengers might be located (and hence, the potential location of the mobile device(s)). In one embodiment, the power level settings of the multiple transmitter/transceivers are adjusted so that their effective ranges better map the interior of the vehicle, in order to make a more accurate determination of the mobile device location especially close to the driver seat (212). For example, in one embodiment, the front transmitters/transceivers (204, 230) are placed close to mirrors (210 and 218) to reduce overlap between their corresponding effective ranges. In one embodiment, the back transmitter/transceivers (232, 234) are placed behind or above the back seat at the left and right sides of the vehicle.

In one embodiment, one or more transmitters/transceivers (e.g., 236) is placed, e.g., about the center of the vehicle. In one embodiment, such a transmitter is used to calibrate the power level of the other transmitters/transceivers (e.g., 204, 230, 232, and 234). In an embodiment, the power level output of the localized transmitters/transceivers is adjusted based on an RF calibration. This, for example, helps keeping the effective ranges stable by keeping the power levels stable, when the output power levels of these transmitters/transceivers tend to drift over time. In one embodiment, additional transmitters/transceivers (e.g., 236) help better position the mobile device.

Figure 7A:
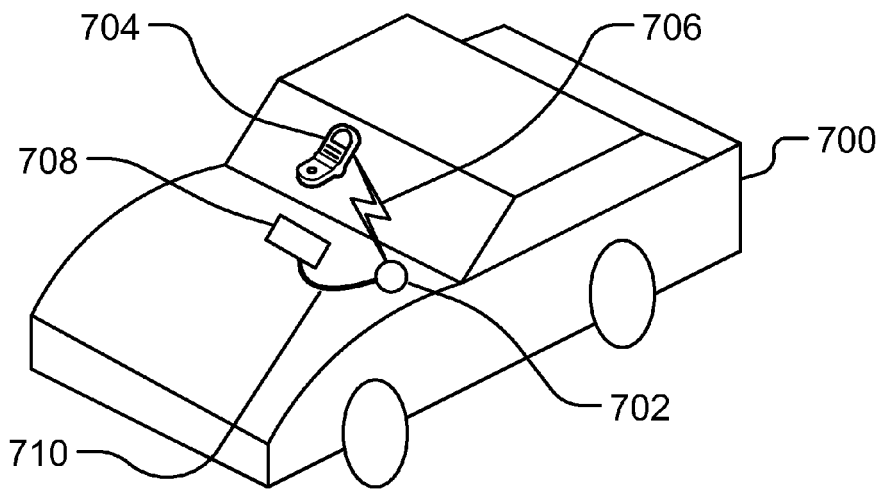
FIGS. 7(a) and 7(b) illustrate a mobile device, a localized unit, and a local computer/control (e.g., of a vehicle) used in an embodiment of this invention.

In one embodiment, a transceiver 236 has a higher effective range than the other local transmitters (e.g., 204, 230, 232, and 234). In an embodiment, the mobile device makes the data communication with transceiver 236, while it determines the received power level signals from transmitters 204, 230, 232, and 234, as well as their unique identifiers. Based on these received power levels, the mobile device determines within which effective range(s) it is located, and the mobile device communicates the corresponding identifier(s) to transceiver 236. In one embodiment, transceiver 236 provides the data to a localized unit, and the localized unit provides a code to be sent to the mobile device via transceiver 236. A localized unit is installed on the vehicle, e.g., behind control panel, dashboard, trunk, floor, etc. In one embodiment, transceiver 236 is wired to the localized unit for signaling and power. In one embodiment, transceiver 236 is integrated with the localized unit. In one embodiment, a localized unit uses a processor/controller to perform logical and other calculations, control the transmitters/transceivers, communicate with the mobile device via transceiver(s), and receive data/status from vehicle's computer/control or sensors. FIG. 7 depicts an embodiment of this invention, where the localized unit (702) installed near the vehicle's (700) driver side control panel is integrated with its transceiver. The transceiver communicates (706) with the mobile device (704) when mobile device is on its effective range. The localized device communicates (710) with the vehicle's computer/control (708) system or sensors.

Figure 7B:
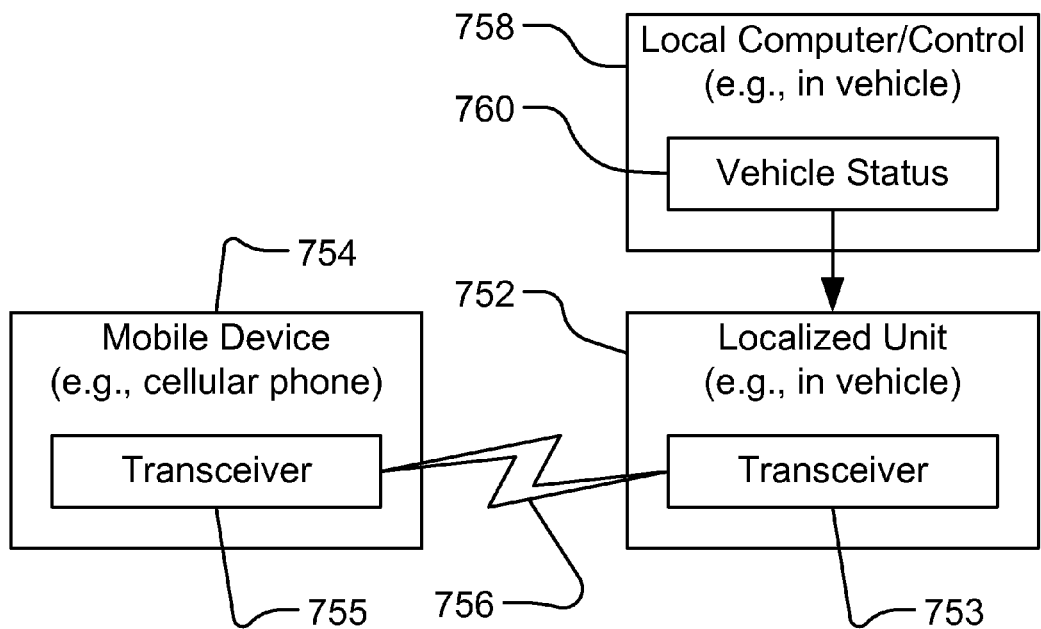

In one embodiment, as depicted in FIG. 7(b), the mobile device (754) and the localized unit (752) communicate (756) via their respective transceivers (755, 753), and the localized unit receives vehicle status (760) from the local vehicle's computer/control system. In one embodiment, vehicle's local computer/control share resources with the localized unit, i.e., they are integrated in one unit. For example, the processor, memory, operating system, display, networking, or other components of the vehicle computer system is used for implementing localized unit functionality.

Figure 3A:
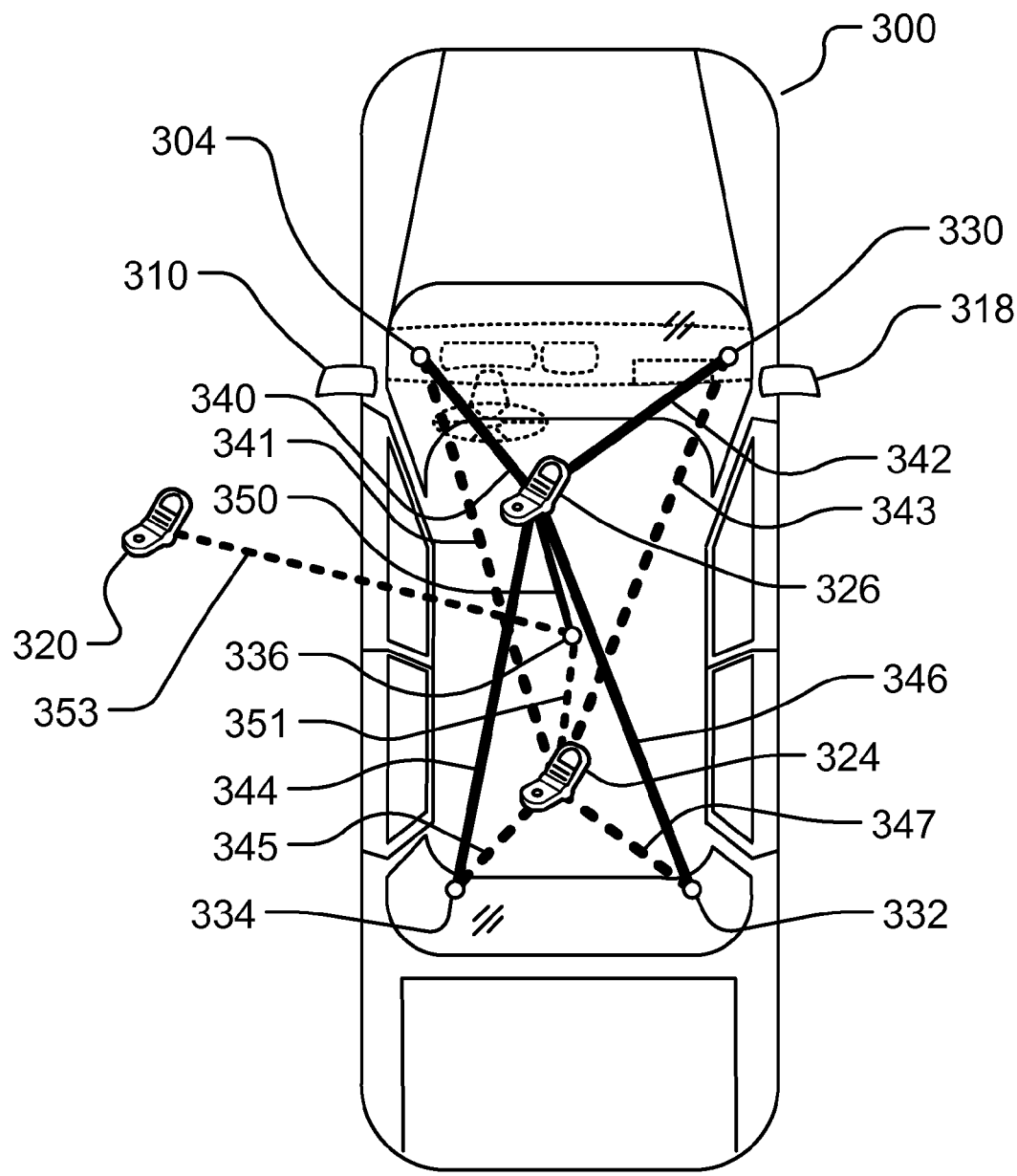
FIG. 3(a) illustrates locating a mobile device, e.g., in or about a vehicle, used in an embodiment of this invention.

In one embodiment, e.g., as illustrated in FIG. 3(a), multiple localized transmitters/transceivers (304, 330, 332, 334, and 336) are placed on a vehicle (300), e.g., with effective ranges of more than few feet. In one embodiment, the effective ranges are set at factory and/or during installation, e.g., during calibration.

In one embodiment, the mobile device location is determined by using the localized transmitters/transceivers. In one embodiment, the location of the mobile device is determined based on the relative timing of signal from the mobile device to the transceivers. In such an embodiment, using the radio wave as media, the time resolution is in order of 1 nsec or less, and the transceiver(s) have stable clocks/reference signal generator (e.g., with low phase noise). For example, one transceiver (e.g., 336) provides a reference RF signal for the other transceivers (304, 330, 332, 334, and 336) to obtain and compare with signals from the mobile device (326).

In an embodiment, the location of the mobile device is determined based on the relative signal power levels from the local transmitters/transceivers, measured at the mobile device. In one embodiment, the power levels are measured at the local transceivers for the signals from other transceivers and the mobile device. Based on the antenna configurations of the transceivers (and other obstacles), a transmitter's signal power level attenuation is dependent on the distance to the transmitter. For example, with the geometric expansion of the radiated wave front, the free space attenuation is given by $r^2 \cdot (4\pi)^2/\lambda^2$, where r is the distance to the transmitter and $\lambda$ is the wavelength of the radiation.

In one embodiment, the relative power levels measured at the mobile device or the local transceivers are used to estimate the relative distances of the mobile device to the local transmitters/transceivers. For example, assuming the attenuation is inversely proportional to $r^2$, in one embodiment, the ratio of distances of the mobile device to two transmitters is proportional to the inverse square root of the ratio of their corresponding signal power level measurements at the mobile device. In one embodiment, once the ratio of distances of the transmitters from the mobile device is determined (for example, by a program on the mobile device or the localized unit), the position of the mobile device is determined with respect to the transmitters.

Given that the attenuation has strong dependence on the distance from the transmitter, in one embodiment, the distance of the mobile device to each transmitter is estimated based on the signal power level received from the transmitters to the mobile device. To help the accuracy of the estimation, in one embodiment, the power level measurement by the mobile device is calibrated by placing the mobile device at one or more predetermined locations with respect to the transmitters during a calibration procedure. For example, in one embodiment, the calibration is performed by placing the mobile device close to the steering wheel, close to dashboard at the front passenger area, on back seats, or in the area between the front and back seats. The calibration is stored (e.g., in the mobile device and associated with the vehicle (300) identification), and it is used to determine the location of the mobile device at a later time. In one embodiment, the calibration program may be run, e.g., in factory, during installation by using a typical or the same mobile device, by authorized personnel, the user, or service repair staff, and the calibration data may be on the mobile device, electronically sent to the user for installation of the mobile device, placed on a server accessible via Internet, for later retrieval, stored on a non-volatile memory/storage of localized unit or accessible to localized unit (such as vehicle's computer/control system).

In one embodiment, the output signal power level of each transmitter/transceiver is measured by other transceiver(s) in order to baseline the relative power output from each transmitter/transceiver, given that the locations of the local transmitter(s)/transceiver(s) remain fixed with respect to each other. For example, the signal output power of transmitter/transceiver 304 is measured by one or more of transceivers 330, 332, 334, or 336. Comparing these power measurements with a set of previously calibrated power measurements provides the amount of deviation in transmitted output power from transmitter/transceiver 304, since the prior calibration. For example, if signal power from transmitter/transceiver 304 (as measured by other local transceivers) has dropped 2 dB (compared to the that during calibration), while the output signal power level out of transceiver 330 (as measured by other transceivers) has increased 1 db since calibration, then in one embodiment, the relative output signal power measurements of the transceivers 304 and 330 (at the mobile device) is adjusted 3 dB compared to that during the calibration. Then, in one embodiment, the adjusted measured transmitted output signals (i.e., adjusted by 2 dB and 1 dB, respectively) and/or the adjusted ratio of the transmitted output power signals (i.e., adjusted by 3 dB) are used as correction factors in estimating the distance of the mobile device to the transmitters.

In one embodiment, the baseline power output measurement(s) of each local transmitter/transceiver (as measured by other local transceivers) is communicated to the mobile device via a transmitter/transceiver (e.g., 336) (or used by localized unit), and the deviations of these baseline power levels from those of the calibration are used as correction factors when determining the distances (or relative distances) of the mobile device to the local transmitters/transceivers. In one embodiment, during calibration of the transmitters/transceivers, the output signal power levels of local transmitters/transceivers are measured at some predefined distance(s) to the transmitters (e.g., 2 feet and 4 feet), in addition to the measurements at the output signal power levels by the other local transmitters/transceivers. This measurement aids in determining more accurate measurement of the distance to each transmitter by providing direct sample point(s) linking the transmitter output power to the distance.

Figure 3B:
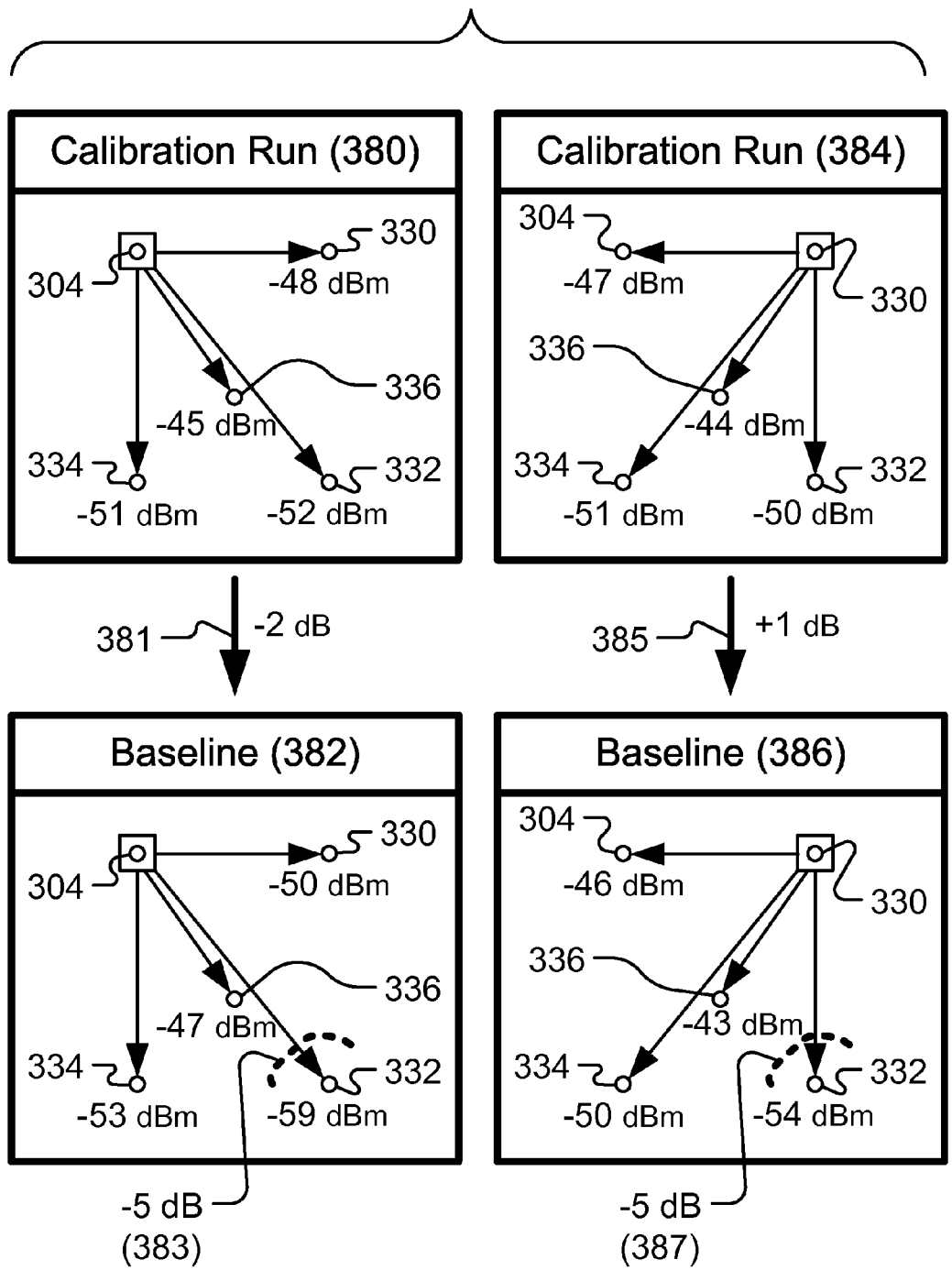
FIG. 3(b) illustrates a hypothetical example of calibration and baseline measurements of output signal power among localized transmitters/transceivers, in an embodiment of this invention.

For a (hypothetical) example in an embodiment, as illustrated in FIG. 3(b), assume that during a calibration run, the values of output signal power level (see Block 380) of transceiver 304 as measured by transceivers 330, 332, 334, and 336, are −48 dBm, −52 dBm, −51 dBm, and −45 dBm. Further assume, the values of output signal power level (Block 384) of transceiver 330 as measured by transceivers 304, 332, 334, and 336 during calibration run are −47 dBm, −50 dBm, −51 dBm, and −44 dBm. Assume that during a baseline measurement at a later time, the output signal power level (Block 382) of transceiver 304 as measured by transceivers 330, 332, 334, and 336, are −50 dBm, −59 dBm, −53 dBm, and −47 dBm, and the output signal power level (Block 386) of transceiver 330 as measured by transceivers 304, 332, 334, and 336, are −46 dBm, −54 dBm, −50 dBm, and −43 dBm. In this example, comparison of the signal power measurements indicates that the power output of transceiver 304 has likely dropped (381) by 2 dB since calibration, and the power output of transceiver 330 has likely increased (385) by 1 dB since calibration. This, for example, can occur due to drift in the transmitter power output over time. The data also indicates that the transceiver 332 consistently measuring 5 dB less than expected when measuring the signal output power of transmitters 304 and 330. This, for example, can occur due to an obstacle (383, 387) blocking the signal received at transceiver 332. Another measurement to confirm this conclusion is the output signal power measurement (not shown) of transmitter 332, by other transceivers and comparing those measurements with those of calibration. In such a case, it is likely that all other transceivers (assuming not individually blocked) would show about the same measured power level drop (e.g., 5 dB) since the calibration of transmitter 332. In one embodiment, the power level measurements from calibration and baseline are compared to determine the transmitters or receivers that are potentially blocked.

In an embodiment, the analysis considers/assumes n number of transceivers (e.g., n=5, in FIG. 3(b)). For each transmitter calibration (e.g., Block 380 or 384), there are (n−1) measurements. Therefore, there are n. (n−1) calibration points for all transmitters power measurements. Likewise, there are n. (n−1) baseline measurements (e.g., Blocks 382 and 386). In one embodiment, the analysis assumes that the transmitted power may drift for each transmitter; and therefore, there are n variables representing power drifts ($D_i$, e.g., expressed in dB, $1 \leq i \leq n$). In one embodiment, the analysis assumes that there may be a blockage close to each receiver which attenuates the received power (as well as the transmitted from the same transceiver). Therefore, there are n variables representing power attenuation due to proximity blockage ($B_i$, e.g., expressed in dB, $1 \leq i \leq n$). One embodiment uses the deviation in power level between the calibration and baseline measurements; therefore, there are n. (n−1) power deviation data points corresponding to the deviation from the calibration data points and the baseline data points. In one embodiment, there are 2n variables representing both $D_i$, and $B_i$ values. This indicates that for $n \geq 3$, with n. (n−1) deviation data points, there will be the same or more number of data points available than the number of variables, providing a redundancy for cross checking or averaging the results. (For example, for n=5, there are 10 variables and 20 power deviation data points.)

In one embodiment, the analysis assumes a blockage between the individual transmitters and receivers (i.e., not specific to individual receivers or transmitters). In an embodiment, the blockage matrix $B_{ij}$ ($1 \leq i, j \leq n$ e.g., expressed in dB) would represent the blockage between the ith transmitter/transceiver and the jth receiver/transceiver. In one embodiment, diagonal terms are set to zero (i.e., $B_{ii}=0$). In such embodiment, there are n. (n−1) variables in the blockage matrix. In one embodiment, the off-diagonal terms are symmetric, i.e., $B_{ij}=B_{ji}$, reflecting an assumption that the signal attenuation is symmetric with respect to the direction of signal propagation between transceivers. In such an embodiment, there are n. (n−1)/2 blockage variables. In one embodiment, there are n number of transmission power drift variables, with $D_i$ representing the power drift for the ith transmitter (e.g., in dB) since its calibration. In one embodiment, there are n. (n−1)/2 blockage variables $B_{ij}$ and n number of transmission power drift variables $D_i$. Therefore, in such an embodiment, there are n. (n+1)/2 number of variables. In one embodiment, there are n. (n−1) power deviation data points (as explained above). Therefore, for $n \geq 3$, there will be the same or more number of data points than variables, providing a redundancy for cross checking or averaging the results. (For example, for n=5, there are 15 variables and 20 power deviation data points.) For n<3, in one embodiment, other estimations, assumptions, diagnostic information (e.g., the input/settings/readings) from transceivers are used to estimate the variables. In one embodiment, given that all the values of power drift and blockages can be increased by same factor without affecting the perceived power measurement, there is an additional normalizing equation (constraint) that would supplement the number of power deviation data points. In another words, the values of the blockage variables and power drifts may be normalized, e.g., based on the smallest blockage value. In such an embodiment, for n<3 (e.g., n=2), instead of just assuming two power drift variables ($D_1$ and $D_2$) and one common blockage variable ($B_{12}$), the additional normalization constraint provides that $B_{12}$ be zero if both $D_1$ and $D_2$ have the different signs (in dB), or one of $D_1$ or $D_2$ be zero if they have the same sign in dB. In one embodiment, the values or allowed/estimated ranges for $D_i$s are determined based on preconfigured values/limits, and/or readings/settings/input to the transceivers. These would provide additional constraint to reflect more accurately the determination of the power drift and/or the blockage in the system.

In one embodiment, if the power output of the local transmitters/transceivers, their receiving antennas and power measurements, and their propagation obstacles are similar, the ratio of measured signal power level (by the other local transceivers) should track as expected with the distance to each transmitter. In one embodiment, a consistent large deviation (e.g., drop) in the power measurement by other transceivers indicate that the transmitter is not working properly or it is blocked by an unusual obstacle. Therefore, in one embodiment, the user is notified via communications from the localized unit to the mobile device (or the vehicle's computer system) in order to notify the user through a user interface (e.g., audio and/or visual) about the issue. In one embodiment, the blocked transmitter is identified to the user by its location on the vehicle, e.g., by matching its identifier with its location using a query on a preconfigured table(s) having the transmitters/transceivers IDs and their installed locations and/or description. Such table(s) is stored/maintained on localized unit, the mobile device, and/or a remote server accessible via the mobile device and/or the localized unit (for example through its own communication device, the vehicle's computer/communication system or the mobile device).

In one embodiment, the blockage variables and/or power drift variables are calculated based on the calibration and baseline data measurements. In one embodiment, the user is notified about abnormal blockage or power drift via a user interface (e.g., on the mobile device or car computer/control system) or by email, SMS, or other communication means/mediums. In one embodiment, identifying data and information are sent from the localized unit to the vehicle computer/control or the mobile device. In one embodiment, if the blockage amount is more than a preconfigured threshold, the user is warned about the blockage and/or its location based on the identity of the transmitter(s)/transceiver(s). For example, the user may be warned that there is an object blocking the transceiver on the right side of the back seat (e.g., 332 in Blocks 382 and 386). Or the user may be warned that there is a blockage, between front passenger and left back seat transceivers (i.e., 330, and 332). This could occur when for example a large metallic object is placed on the front passenger side seat. In one embodiment, if the calculated power drift and/or the amount of blockage are more than their respective thresholds, those measurements affected by the power drift and/or blockage are disregarded when estimating the distance of the mobile device to the transmitters/transceivers. In one embodiment, if the amount of power drift is less than a threshold, the localized unit adjusts (e.g., increases or lowers) the power output setting on the particular transmitter (e.g., in multiple steps with baseline re-measurements). In one embodiment, the statistics of the adjustment and/or power measurements are kept in memory/storage or sent to a server or the mobile device, for further analysis such as identification of degradation in the system.

In one embodiment, the vehicle sensors, such as weight monitoring on seats (e.g., as used to detect a seated passenger), are used to estimate the approximate blockage expected from the passenger(s), or used to check/validate the blockage variables obtained, e.g., from baseline measurements. In such an embodiment, the sensor data may be used directly or via the vehicle's computer system. In one embodiment, the vehicle/sensor status and data is sent to the localized unit or to the mobile device (e.g., after determining that the mobile device corresponds to the vehicle, via e.g., owner, or a family plan).

In one embodiment, the power drift and blockage factors are used to adjust the measured transmitted signal power of the localized transmitters/transceivers at the mobile device. The output power transmitted by the local transmitters/transceivers may be different even during their calibration; therefore, the output signal power of the local transmitters/transceivers (during calibration) measured at some predefined distance(s) to the transmitters (e.g., 2 feet and 4 feet) are used to better estimate the mobile device distance (or relative distances) to the transmitters. For example, in one embodiment, assume that it is estimated that the output power of transmitters 304 and 330 have drifted by −2 dB and +1 dB, respectively (e.g., FIG. 3(b), 381 and 285), while the power output of other transmitter have not changed. Furthermore, assume that there is an estimated blockage of −5 dB (e.g., FIG. 3(b), 383 or 387) associated with transceiver 332. Also, assume that during the calibration, the output power measurement taken from transceivers 304, 330, 332, 334, and 336 at e.g., 2 feet and/or 4 feet distance(s), (by a specialized power meter, or a typical or the same mobile device) provided the following measurements −39 dBm, −38 dBm, −39 dBm, −39 dBm, −34 dBm, at e.g., 2 feet, respectively. Based on the estimated power drift and blockage, the adjusted power levels from transceivers 304, 330, 332, 334, and 336 (measured by the same tools) at 2 feet away from the transceivers would be −41 dBm, −37 dBm, −44 dBm, −39 dBm, −34 dBm, respectively, during the time of baseline measurement.

In one embodiment, as illustrated in FIG. 3(a), when the mobile device is at location 326, it is closer to transceivers 304, 330, and 336, than transceivers 334 and 332 with its separation distance indicated by 340, 342, 350, 344, and 346, respectively. Also, when the mobile device is at location 324, it is closer to transceivers 334, 332, and 336, than transceivers 304 and 330, with its separation distances indicated by 345, 347, 351, 341, and 343, respectively. In contrast, when the mobile device is outside of vehicle, its separation distance to transceiver 336 grows even longer (353). As an example, having the mobile device located at 326, assume the output signal power measurements by the mobile device for the transceivers 304, 330, 332, 334, and 336 are −45.5 dBm, −43.7 dBm, −47.8 dBm, −52.3 dBm, −37.1 dBm, respectively (e.g., during the same time or close the time of the baseline measurement). In one embodiment, the distance of the mobile device to the transmitters is determined by comparing these values with the adjusted power levels (adjusted for power drift and blockage) from transceivers measured at a certain distance (e.g., 2 feet) to the transmitter. For example, in one embodiment, the power ratio is attributed to the separation distance of the mobile device from the transceiver (compared to e.g., 2 feet). For example, in one embodiment, for transceiver 330, the ratio of the local transceiver output signal power measured by the mobile device (e.g., −43.7 dBm) to the adjusted power level (at 2 feet) (e.g., −37 dBm) is −6.7 dB. Attributing this ratio to the spatial attenuation, in one embodiment, the distance of the mobile device to transceiver 304 is determined by $\Delta \text{Attenuation} = -20 \text{Log}_{10}(r/r_{ref})$, where r is the distance to the transmitter and $r_{ref}$ is the referenced distance used during calibration (e.g., 2 feet). This estimates that the mobile device is about 4.3 feet. Applying similar procedure, the distance of the mobile device to the transceivers 304, 330, 332, 334, and 336 are estimated to be 3.4', 4.3', 5.5', 5.8', and 2.9°, respectively, which places the mobile device close to the driver's seat toward the center line of the car, as demonstrated by FIG. 3(c). For the purpose of illustration, in this figure, the distance from 304 to 330, 336, 334, and 332 was set to 4', 6', 8', and 9', respectively, and 336 was set on long axis of vehicle with each of (304, 330) and (334, 332) pairs arranged symmetrically with respect to long axis.

Figure 3C:
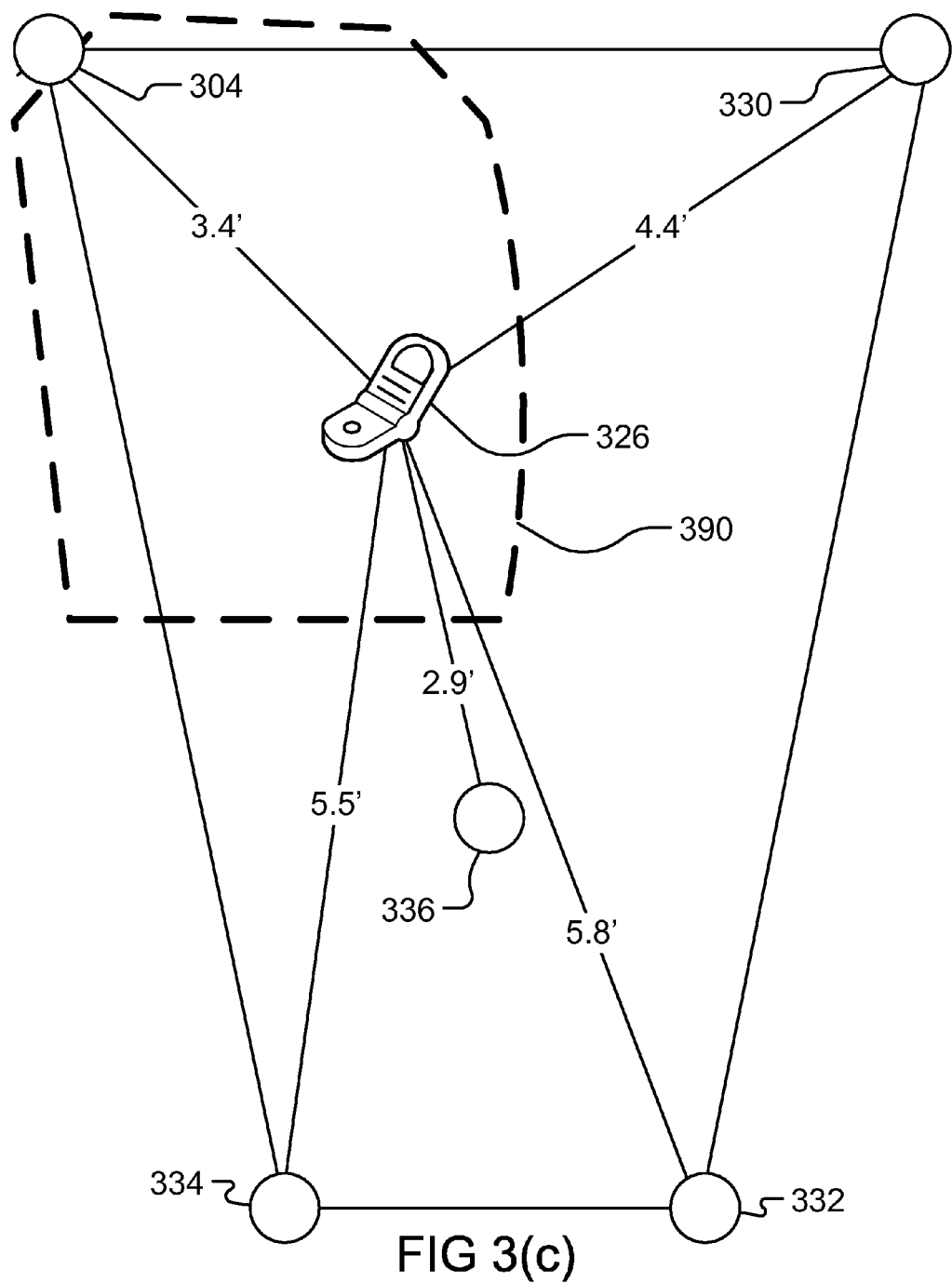
FIG. 3(c) illustrates locating a mobile device via multiple transmitters/receivers/transceivers, used in an embodiment on this invention.

In one embodiment, once the distances of the mobile device are approximated with respect to the local transmitter/transceivers, a triangulation technique is used to map the location of the mobile device compared to features of the vehicle, based on the locations of the transmitters/transceivers with respect to the vehicle (e.g., see FIG. 3(c) and FIG. 3(a)). In one embodiment, by mapping the position of the mobile device, it is determined whether the mobile device is located in certain regions within or close to the vehicle. In one embodiment, the predefined regions are stored as polygons, multi-sided geometrical objects with curved sides (e.g., FIG. 3(c), 390), or free-hand drawn (digitized) geometries, in the same coordinate system as the mapped location of the mobile device. Known mathematical technique can be used to determine whether the mapped location of the mobile device is in a particular region and/or its distance to any similarly defined object. For example, if region 390 is defined to represent the normal reach of the driver in a vehicle while driving, in an embodiment, the mapped location 326 within the region indicates that the mobile device is in a triggering region, and a device feature should be modified (e.g., SMS capability should be disabled).

In an embodiment, the accuracy of locating the mobile device is enhanced by using the same mobile device or similar tool to measure the transmitted output power of the local transmitters/transceivers at certain distance(s) from the transmitters, during the calibration. This is because, in the embodiment, the measured power levels by the mobile device (e.g., at or about the same time as the baseline measurements) is compared with the calibrated values to attribute the deviation to the spatial dependence of the wave form attenuation. If the device(s) used during the calibration phase is different from the mobile device in measuring the transmitted signal power of the transceivers (e.g., due to the antenna size, other calibrations, or internal power gain/amplification), the difference in the power readings between two devices (i.e., calibrating device and the mobile device) can cause an offset in the perceived distance from the transmitter. For example, if the power readings differ by 3 dB (i.e., about twice as much), the offset in the distance estimation would be about 41% (=10^(3 dB/20 dB)). Due to the logarithmic dependencies, small deviations in power readings do not significantly impact the distance estimation. For coarse measurements and location of the mobile device within or about a vehicle, in an embodiment, the tolerances can also be applied when defining the triggering regions (e.g., 390), for example, by expanding/inflating its boundaries.

In one embodiment, the power measurements of the transceivers output signal by the mobile device and the calibrating tool(s) are converted to power density measurement, based on the rating and specifications of the measuring tools and device. By normalizing the power values to power densities, in one embodiment, the peculiarities of the measuring devices are effectively masked from the analysis. For example, instead of measure the output power as dBm, in one embodiment, the measured value is converted to, for example, $dBm/cm^2$ to reflect the power density. In an embodiment, the measured power densities are similarly adjusted for power drift and blockage estimations. In one embodiment, the transceivers' measurements of other transmitters/transceivers transmitted output signal power during calibration or baseline measurements are also similarity done based on power density.

In one embodiment, the output power transmitted by a local transmitter is estimated by utilizing the circuitry and meters on the transmitter itself. A prior calibration and rating can also be used to estimate the transmitter output power based on the settings and/or input to the transmitter. In such an embodiment, the measurement of the transmitter's output at predefined distance(s) from the transmitter (during calibration) may become optional or require less number of measurements, as an alternative way to measure and monitor the transmitter's output power is provided by the transmitter itself. In an embodiment, the output power levels (and/or the settings and input parameters) of the transmitters/transceivers are stored during the calibration phase. In one embodiment, the transmitted signal output power of a transmitted is converted to a power density value at a given distance (e.g., 2 feet) from the transmitter based on the type of the transmitter and/or known or estimated theoretical/empirical power density vs. distance relationships.

Figure 3D:
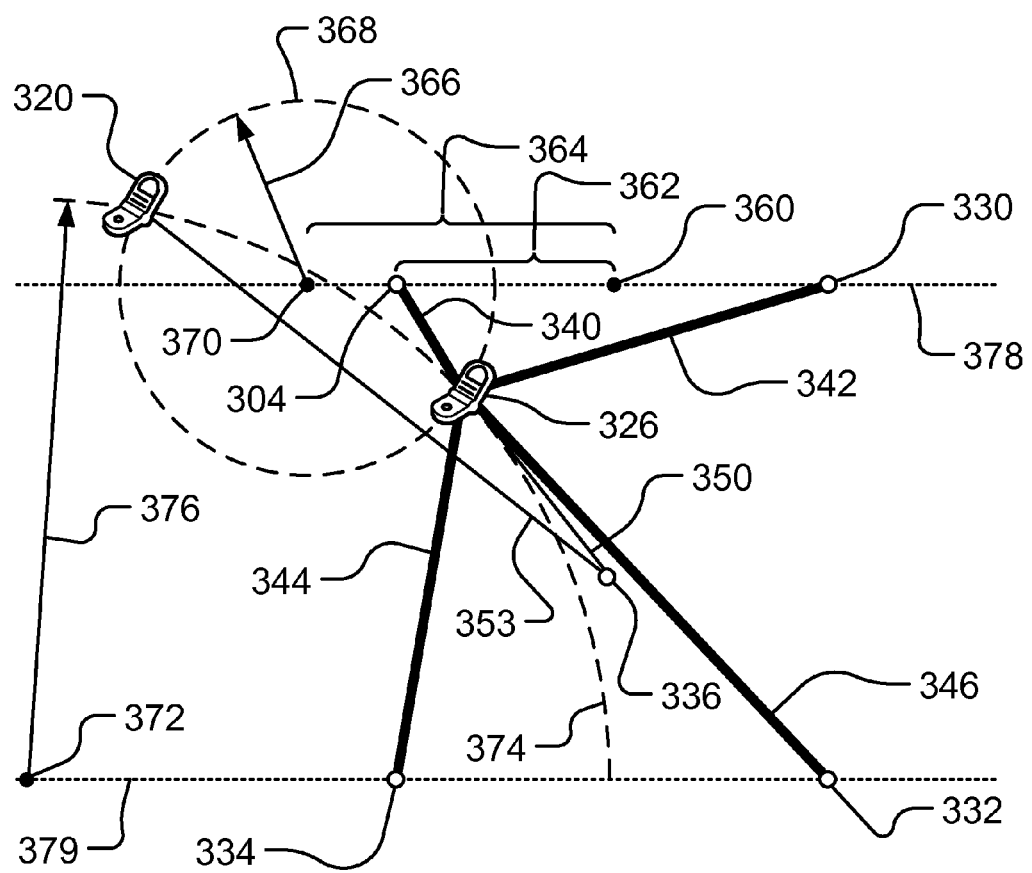
FIG. 3(d) illustrates locating a mobile device via multiple transmitters/receivers/transceivers, used in an embodiment on this invention.

In one embodiment, the mobile device distances to the local transmitters are estimated based on the power ratios received from multiple local transmitters. In one embodiment, as illustrated in FIG. 3(d), the distance of the mobile device (at 326) to transmitters/transceivers 340, 330, 332, 334, and 336, is indicated by 340, 342, 344, 346, and 350, respectively, and the output signal power levels transmitted from the transmitters/transceivers to the mobile device depend on the respective distances. In one embodiment, the measured power levels are adjusted for estimated power drifts in the transmitters and/or blockages, as described earlier. In one embodiment, the power level measurements are normalized to power densities at the mobile device and/or calibrating device(s). In one embodiment, the transmitters/transceivers output power is determined, e.g., by a prior calibration or by using the transmitters circuitry/settings/input. In one embodiment, the measured power (or power density) of each transceiver at the mobile device is corrected/normalized using the determined the transmitters/transceivers output power. This correction/normalization estimates the power levels as if the transceivers had the same output powers, therefore, in an embodiment, the normalized measured power (or density) level is expressed in dB. In one embodiment, the adjustment and correction factors are applied to the transceiver's transmitted power level (or power density) as measured by the mobile device. In one embodiment, the variations (e.g., ratios) in values of the corrected/adjusted power readings at the mobile device are attributed to the spatial attenuation of the wave form transmitted to the mobile device from the local transceivers. Therefore, in an embodiment, the ratio of the corrected/adjusted power (or power density) from two transceivers are dependent on the distances to those transceivers. In one embodiment, the dependency is logarithmic, and for example, it is expressed as $(P_{c2}/P_{c1}) = -20 \, LOG_{10}(r_2/r_1)$ (in dB), where $P_{c2}$ and $P_{c1}$ are corrected/adjusted power (or power density) measurements at the mobile device from transmitter 1 (e.g., 304) and transmitter 2 (e.g., 330), respectively, and $r_2$ and $r_1$ are the mobile device distance to the transmitters (e.g., 340 and 342, respectively). If expressing the normalized powers in dB, in an embodiment, the relationship becomes $\Delta p_{21} = -20 \, LOG_{10}(r_2/r_1)$ (in dB), where $\Delta p_{21}$ is the difference of the corrected/adjusted power (or power density) levels expressed in dB. In an embodiment, the ratio of the distances from a mobile device to two transmitters are determined, e.g., based on $r_2/r_1 = 10^{\wedge}(\Delta p_{21}/-20 \, dB)$. (Note that a^b indicates a to the power of b). Therefore, as an example illustrating an embodiment, assume the measured output signal power from transceivers 304 and 330 (FIG. 3(d)), at the mobile device are −45.5 dBm and −43.7 dBm, respectively, and also assume that since the calibration, the transmitted power drift ($D_i$) of the transceivers were −2 dB and +1 dB, respectively. In addition, assume that output power of the transmitters (during calibration) were −0.2 dBm (0.95 mW) and 0.8 dBm (1.20 mW), respectively, (or assume that the measured power at e.g., 2 feet distance during the calibration were −39 dBm and −38 dBm, respectively). Therefore, the measured power levels are adjusted to −43.5 dBm and −44.7 dBm (to pre-power drift levels), respectively. The adjusted power levels are normalized to take into account that the output power (at calibration) of the transmitters were different by 1 dB (=0.8 dBm−(−0.2 dBm)=−38 dBm−(−39 dBm)). For example, normalizing/correcting relative to transmitter$_1$, the corrected/normalized power levels would become −43.5 dBm and −45.7 dBm, for transmitter$_1$ and transmitter$_2$, respectively. Alternatively, to normalize, the ratio of the (adjusted) power levels to the calibrated power output of the transceivers or (the calibrated power measurement at e.g., 2 feet from the transmitters) may be taken. The results will be the same in this example, because the normalization results in a relative correction of 1 dB. Then, the ratio of the corrected/adjusted output signal power levels (i.e., $\Delta p_{21}$) for two transmitters (304 and 330) as measured by the mobile device becomes −2.2 dB (=−45.7 dBm−(−43.5 dBm)). Therefore, the distance ratio to the transceivers become $r_2/r_1 = 10^{\wedge}(-2.2 \, dB/-20 \, dB) = 1.29$. This is the same ratio of the distance from the mobile device (326) and the transceivers (304 and 330) as illustrated in FIG. 3(c), i.e., $r_2/r_1 = 4.4'/3.4' = 1.29$.

In one embodiment, the location of the mobile device is determined by using the calculated ratio of the distances of the mobile device to the transmitters/transceivers. For example, as illustrate in FIG. 3(d), the locus of points on the plane (or in 3 dimensional space) having the same ratio (k<1) of distance to two fixed points (e.g., 304 and 330) is a circle (e.g., 368) (or a sphere in 3D), with its center (370) located along the line (378) joining two fixed points (304 and 330) and located at a distance (364) $l_c$ from the midpoint (360) of the segment joining the fix points (304 and 330). The center of circle is outside of the segment joining the fixed points and it is closer to the one (304) whose distance to any point on the circle (368) is smaller than that of the other fixed point (330) (i.e., length of 340<length of 342). If a (362) denotes the distance of the fix points (304 or 330) to their segment midpoint (360), the radius R (366) of circle 368 as and its location of its center $l_c$ (364) are given by:

$$R = a \cdot \sqrt{\gamma^2 - 1}$$
$$l_c = a \cdot \gamma$$

Where $$\gamma = \frac{1 + k^2}{1 - k^2}$$

Note that since here k<1, then γ>1 and a<$l_c$ and 0<$l_c$−R<a.

In special case where the distant ratio is 1, both $l_c$ and R tend to infinity, as γ tends to infinity and k tends to 1. In this case, the locus of points having same distance to the fixed points simple becomes the perpendicular bisector of segment joining the fixed points.

Similarly, the ratio of distance of the mobile device (326) to another pair of transceivers (e.g., 332 and 334 pair) is used to determine the corresponding locus of points having the same distant ratio to the fixed points (332 and 334). The locus of these points, as depicted in FIG. 3(d), lie on a circle (374) having a center (372) on a line (379) joining the fixed points (332 and 334) and a radius (376).

In one embodiment, intercepting a circle (e.g., 368) associated with a pair of transceivers (e.g., 304 and 330 pair) with another circle (e.g., 374) associated with another pair (e.g., 334 and 332 pair) narrows and limits the possible locations (e.g., 326 and 320) of the mobile devices with respect to the transceivers, as the intercept points of the circles. For example, considering 4 transceivers (FIG. 3(d): 304, 330, 332, and 334), there are 3 pairs of independent power ratios, and three independent circles. For example, two of the three independent circles could be 368 and 374. The third circle could be associated with any of the remaining pairs (304, 334), (332, 330), (334, 330), or (304, 332). The third circle associated with any of the third pairs would limit the location of the mobile device to one of 326 and 320. An additional transceiver (e.g., 326) would provide additional power ratio (with any of the other transceivers) and would provide an additional independent circle (associated with it and one of the other transceivers), which potentially validates the determination of the location of the mobile device based on 4 transceivers. In one embodiment, the independent circles are identified by numbering and sequencing the transceivers, and selecting (i, j) pairs where i<j and i and j are associated with ith and jth transceivers. In an embodiment, the transceivers are sequenced and numbered based on their corresponding transmitted output signal power measurements at the mobile device, so that the generated intercept points more accurately reflect the potential locations of the mobile device. In one embodiment, more weight is given to the circles associated with pairs of transceivers having higher combined power measurements at the location of the mobile device. In one embodiment, the weight is expressed in dB, while in another embodiment, the weight is expressed in linear scale (e.g., mW), in order to drastically reduce the weight of the pairs having one (or both) transceiver whose signal power level measured at the location of the mobile device is relatively low.

In one embodiment, a hybrid approach is taken to determine the location of the mobile device. For example, two (or three) circles associated with two (or there) transceiver pair are intercepted to determine a narrowed potential locations for the mobile device. Then, a transceiver (e.g., 336) is used to determine the distance to the mobile device using a power level approach. This way, for example, one embodiment discriminates between the potential locations of the mobile device (e.g., 326 and 320) by comparing the estimated (based on power level) distance from the mobile device to the transceiver (336) to the distances (350 and 353) from the transceiver (326) to the potential locations (326 and 320, respectively) of the mobile device.

In one embodiment, the power levels (or density) transmitted by the local transceivers are mapped for each transceiver on and/or around vehicle, e.g., by using actual measurements during calibration, empirical results, simulation, and/or estimations, with/without passengers or with different arrangements of passenger seating. Based on this power level mapping, a set of contour maps are generated to reflect a loci of points having the same ratio of the power (or density) between the two transceivers (pair) for a set of ratios (e.g., expressed in dB). Then, in an embodiment, the contours are used to map, e.g., by interpolation or extrapolation between contour lines, to determine a contour representing the determined distance ratio corresponding to the transceiver pair. Then, in one embodiment, such interpolated/extrapolated contour lines from multiple transceiver pairs are superimposed to determine their intercept points as potential location of the mobile device. In previous examples, the contour lines were represented by intercepting circles. In one embodiment, the location of the mobile device is estimated as an average location of a cluster of intercept points that are closely located with each other. In one embodiment, if the contours (or circles) do not actually intercept, a stand-in pair of intercept points which define the shortest segment connecting the contours (or circles) are used instead.

Similarly, in one embodiment, the signal power levels are measured and calibrated under various occupancy of the vehicle and this data is used later to determine the location of the mobile device by looking up the determined power levels/ratios in the gathered data and performing interpolation/extrapolation on the gathered data points.

In one embodiment, for example using BLUETOOTH®(A wireless technology protocol) or similar technology (e.g. picocell), for establishing the transceiver rangers (e.g., 102) or used to locate the mobile device within a vehicle (e.g., FIG. 3) based on the transceiver's output power level, the output power level of the transceivers are prevented from varying during the communication setup with the mobile device, or they are set back to their original calibrated levels for the purpose of establishing range(s) and determining distances from the mobile device.

Generally, when a transceiver attempts to participate in a power-controlled link with another transmitter, it needs to measure its receiver signal strength and determine if the other transmitter should modify its output power level. This is achieved for example via Receiver Signal Strength Indicator (RSSI). The instructions for modifying the transmission power are provided by the LMP (FIG. 12, 1206). Therefore, in one embodiment, the transceivers are modified to not change their output power level due to such requests from other transceivers, or alternatively, store their calibrated setting and restore to those settings before performing their baseline measurements or providing a limited range to the mobile device. This modification may be done by configuration, additional software hooks to modify/supplement the code behavior, or additional logic at the RF power control module to determine if it should respond to request for power level change.

In one embodiment, directional transceivers/transmitters are used to tailor the ranges (e.g., 102) and coverage. Due to its angular dependence of their signal power, the distance of the mobile device to the transmitter may not be accurately estimated in all directions only based on the measured power level measured at the mobile device. In one embodiment, the transmitted power is lowered to limit the size of range. In one embodiment, overlapping (directional) ranges are established (e.g., in a checkerboard pattern) by multiple transceivers, so that by identifying which transceivers cover the mobile device, it is effectively determined in which overlapped portion of the corresponding ranges, the mobile device is potentially located.

In one embodiment, as illustrated in FIG. 7, the Localized Unit (702 and 752) is includes the transmitter/transceiver. In other embodiments, the localized unit is not tightly integrated with the transmitter(s)/transceiver(s), e.g., because of the physical installation/location and/or size.

As shown in FIG. 7, in one embodiment, the modification of the feature of the mobile device (704, 754), is affected by one or more contextual/environmental variable/parameter/ signals, such as the status of the vehicle (760) (or a subset thereof).

Figure 8:
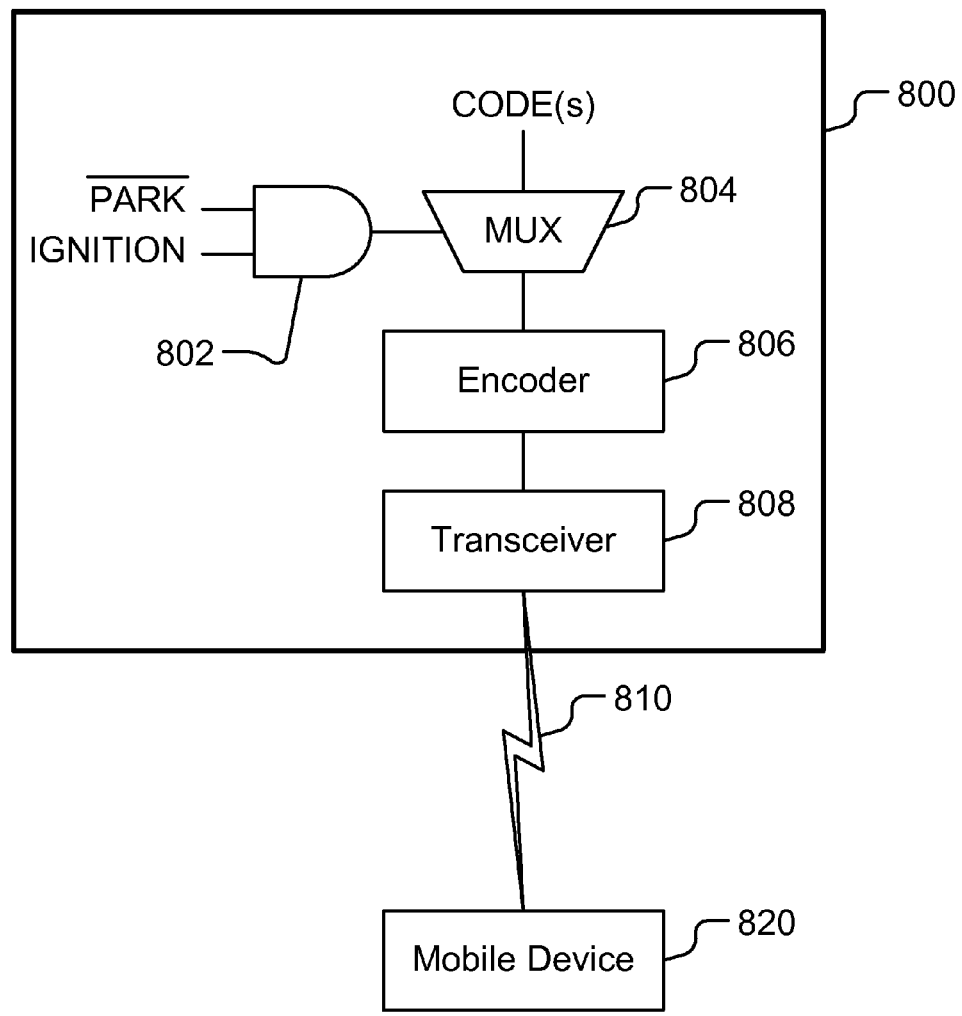
FIG. 8 illustrates a schematic of communicating a code to a mobile device based on, for example, a vehicle's status, in an embodiment of this invention.

FIG. 8 shows an example for illustrating this concept, in an embodiment of this invention (however, any codes or similar input can also be used, as a substitute). As illustrated, for example, "not-PARK" variable/signal/input is AND-ed (802) with IGNITION variable/signal/input, and the (logical or physical) result is used to select among multiple codes (804), for example, via a logical or a physical multiplexer (MUX). In one embodiment, code(s) are universal codes or unique codes, e.g., predefined, for feature activation or deactivation tasks. Another code for identification of transmitter/transceiver or vehicle can be sent separately or in combination with the code(s) mentioned above at 804, e.g. added, concatenated, or mixed/coded together. In one embodiment, the localized unit (of 752) is represented by the system shown at 800. In this embodiment, units 806 and 808 are integrated within 800. However, they can be separated, as located outside of system 800, in another embodiment. The system 800 communicates (810) with mobile device (820) wirelessly or via a connection through a wired network, cradle or a plug. In the logic demonstrated by FIG. 8, the feature modifying code (which triggers the modification of the feature at the mobile device), is sent to the mobile device when the vehicle is on (ignition is on) and the vehicle is not in PARK mode (e.g., in Drive gear). This logic may be implemented in software, firmware (e.g., FPGA), and/or hardware (e.g., ASIC) within localized unit and/or transceiver(s) in an embodiment of this invention. In one embodiment, the car status is sent from the localized unit and/or transceivers to the mobile device and the above logic is implemented in the mobile device by a program running on the mobile device. Similarly, in one embodiment, the vehicle status may be communicated to a remote server/service (via for example vehicle's communication system, localized unit communication system, or the mobile device) and similar logic is performed by a remote entity/server, followed by the mobile device receiving a notification from a remote entity/ server (directly or via computer system in vehicle or localized unit) whether to modify a feature on the mobile device or take other actions.

In an embodiment, other or additional vehicle status (e.g. speed), road status (e.g., rainy), passenger status, and/or information (e.g., from vehicle's sensors such as outside lighting) are used to send an appropriate code to the mobile device. In an embodiment, where only one code is sent to the mobile device (e.g., indicating modification of a feature), logically or physically, the selection step (e.g., via MUX (804)) may be implemented differently or eliminated.

Figure 9:
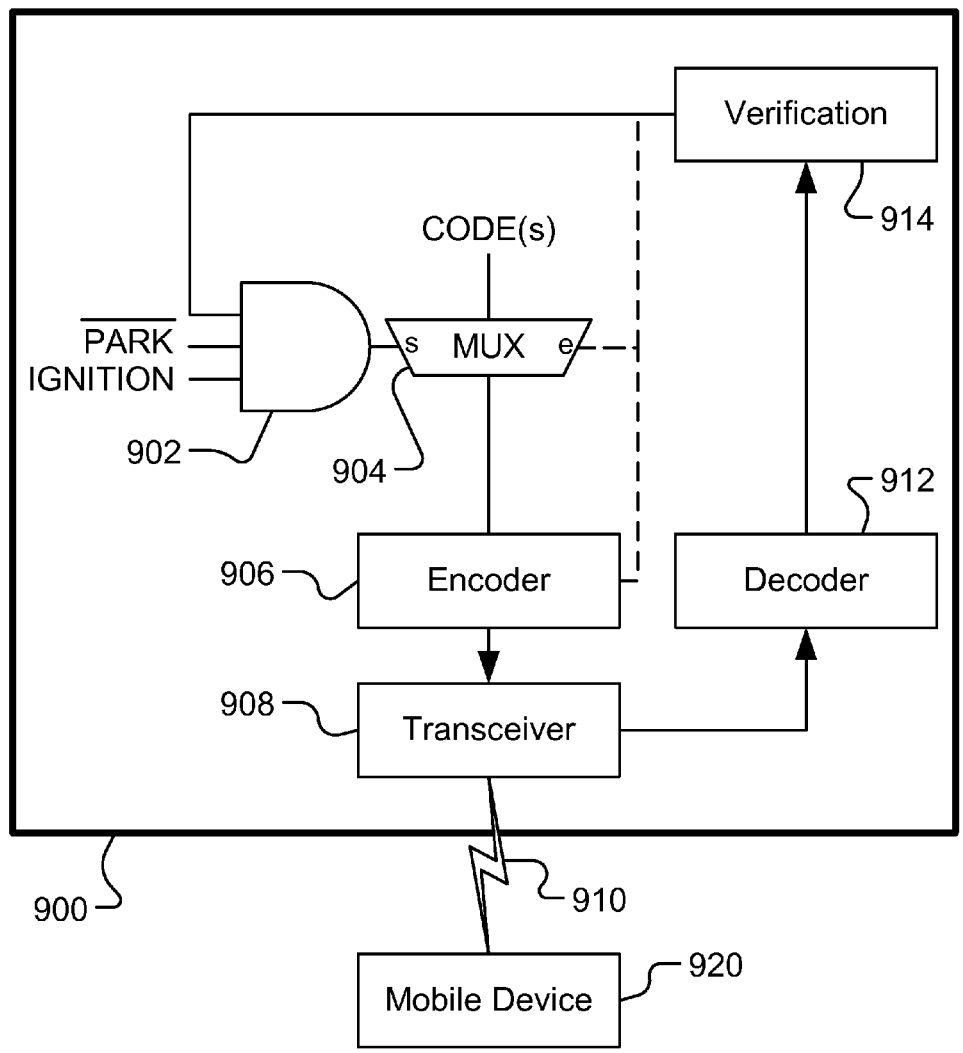
FIG. 9 illustrates a schematic of communicating a code to a mobile device based on, for example, a vehicle's status and the validation of a code from the mobile device, in an embodiment of this invention.

Similarly, as shown in FIG. 9, in an embodiment, system 900 (e.g., representing a localized unit) communicates (910) with the mobile device by sending one or more codes. In this embodiment, the mobile device (920) communicates with a transceiver (908) in its range, sends the system (900) a code (e.g., indicating that a mobile device is capable of modifying its feature). Upon receiving the signal/message by the transceiver, the message is decoded (912) and the transmitted code is verified by the system (914) to check for the validity of the received code, e.g., using a preconfigured stored code(s). Based on the verification, the code(s) (e.g., feature modification/activation indicating code(s), e.g., as discussed earlier in context of system 800) is sent to the mobile device based on car status/parameters/sensors (e.g., whether the vehicle is out of PARK and (902) the engine is on). The lines (solid and dotted) from Verification module (914) to the logic (902), code selection (904), and Encoder (906) indicate some of multiple ways that the system can be implemented in various embodiments in order to send the feature activation/deactivation code(s) after the system has already received and verified the initial code from the mobile device. For example, Verification module can effectively nullify the logic (e.g., by sending a logic "0" to an AND gate (902)), disable the code selection unit/process (e.g., by disabling MUX (904)), and/or disabling/preventing Encoder (906) or Transceiver (908) to receive the code(s) in the first place (e.g., by modifying the output at their previous stages (904 or 906)). In an embodiment, Verification module can similarly enable these modules/processes when the verification is successful, e.g., by sending a logic "1" to the logic module (902), enable code selection module by enabling MUX, enabling Encoder (906) to receive selected code, and/or modifying the output at stages at 904 or 906 (as indicated by dotted lines in FIG. 9). FIG. 9 is provided for illustration purposes of the concept, as there are multiple ways to implement such embodiment known to one skilled in the art.

In one embodiment, the mobile device sends a message to a remote server/service when modifying a feature. For example, in one embodiment, when disabling SMS feature on the mobile device, the mobile device sends a message to SMSC to store (i.e., to hold) the incoming messages, until the hold is removed, e.g., by sending another message to SMSC to forward the messages to the mobile device.

Figure 10:
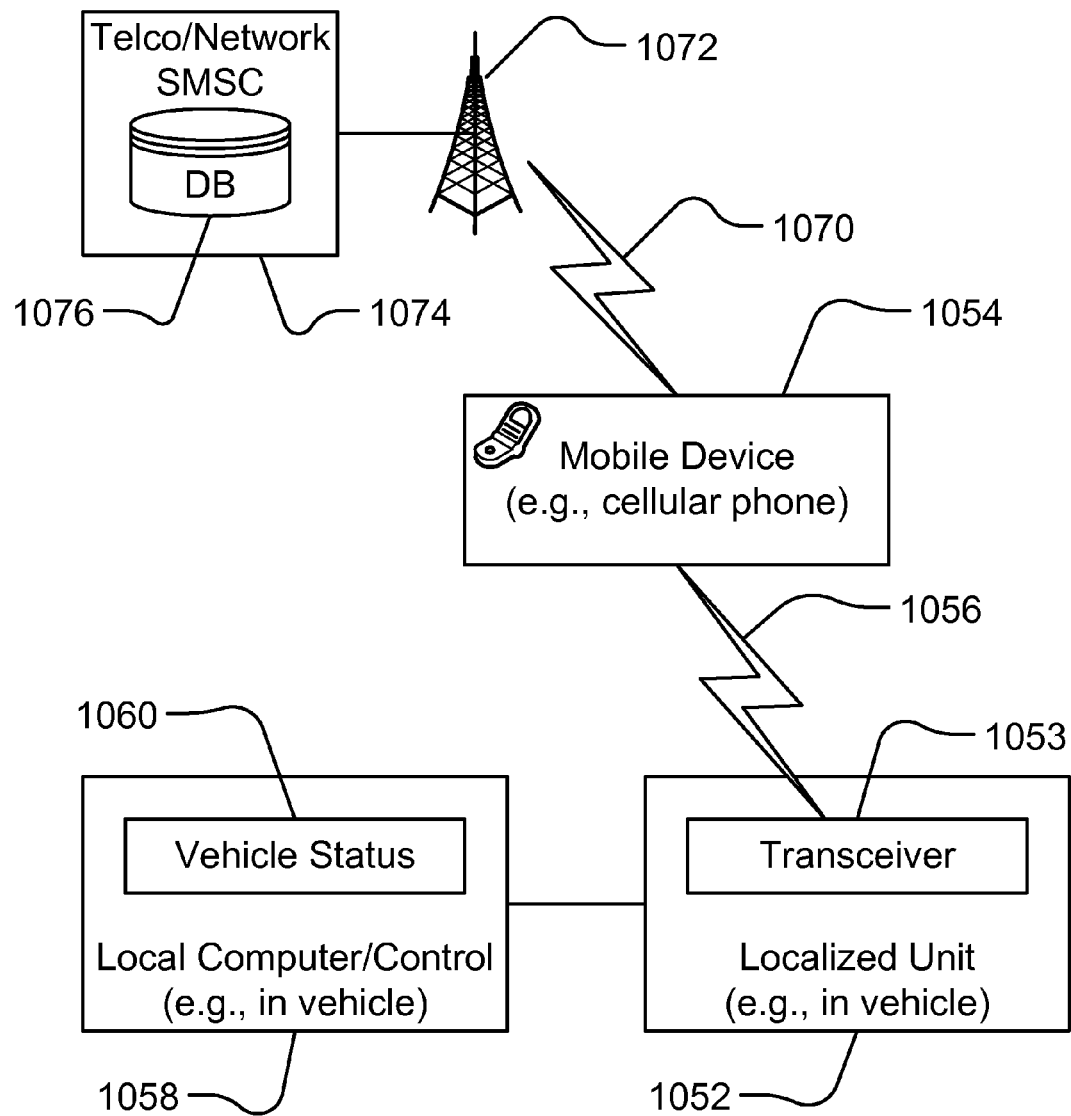
FIG. 10 illustrates a communication path between a local computer/control (e.g., in a vehicle), a localized unit, a mobile device, and a SMSC, in an embodiment of this invention.
Figure 11A:
FIG. 11(a)-(d) illustrate interaction between a local device (e.g., in a vehicle), a mobile device, and a feature server/entity (e.g., SMSC) in an embodiment of this invention.
Figure 11B:
Figure 11C:
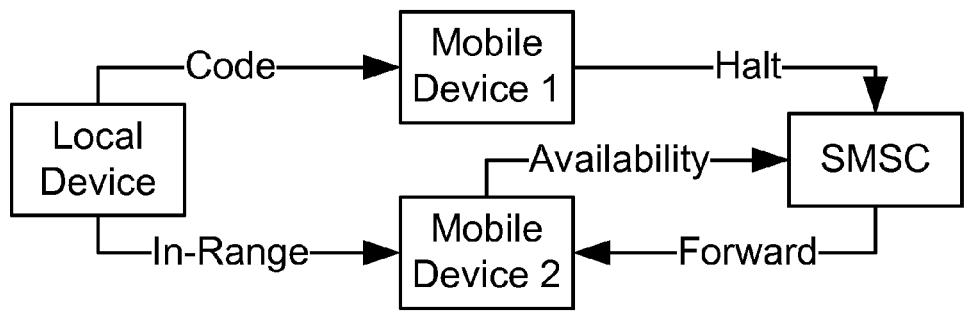
Figure 11D:
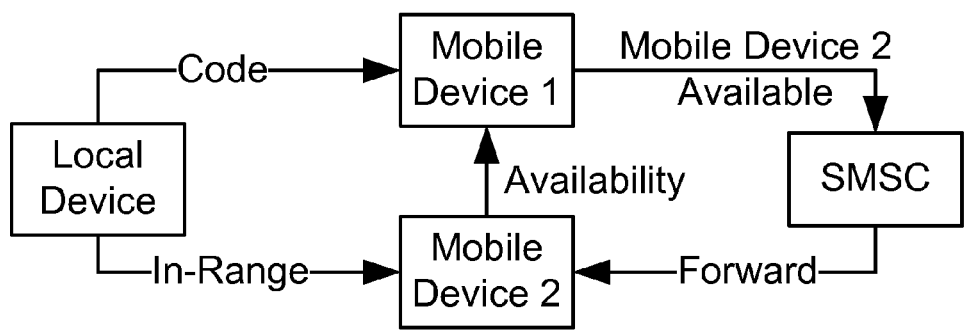

FIG. 10 illustrates an embodiment where the mobile device (1054) communicates, for example, with Telco (1074)/network/SMSC and/or its database/remote service or server (represented by 1076), for example through an intermediate cell phone tower antenna 1072. In one embodiment, when a feature of the mobile device (e.g., SMS) is disabled, a message is sent to 1074 to indicate this change. For example, in one embodiment, a message is sent to SMSC to indicate that the mobile device (1054) should not receive SMS. This indication/flag is stored and maintained at SMSC (1074) and/or a corresponding database (1076). In one embodiment, the indication to disable/limit the feature is stored/linked/associated with other information, such as the vehicle ID/localized unit identification/transceiver's identification. In one embodiment, additional information about the car, 1st telephone, 2nd telephone, transfer rules (e.g., FIG. 5), forwarding rules, family plans and their connections together for conference calling or forwarding the calls/text messages, storage schemes and plans, delay plans for storage and forwarding the message/ text, configurations, parameters, logical and conditional rules and statements, information about passengers, and/or similar information are stored at and accessed from DB (1076). The database (1076) and all the data above can be distributed in one or more databases, or at one or more locations, and offered by one or more businesses, independently.

In one embodiment, the communication can go between 1058 and 1074 (or between 1074 and 1052), instead of (or in combination with) communication between 1054 and 1074.

Figure 5:
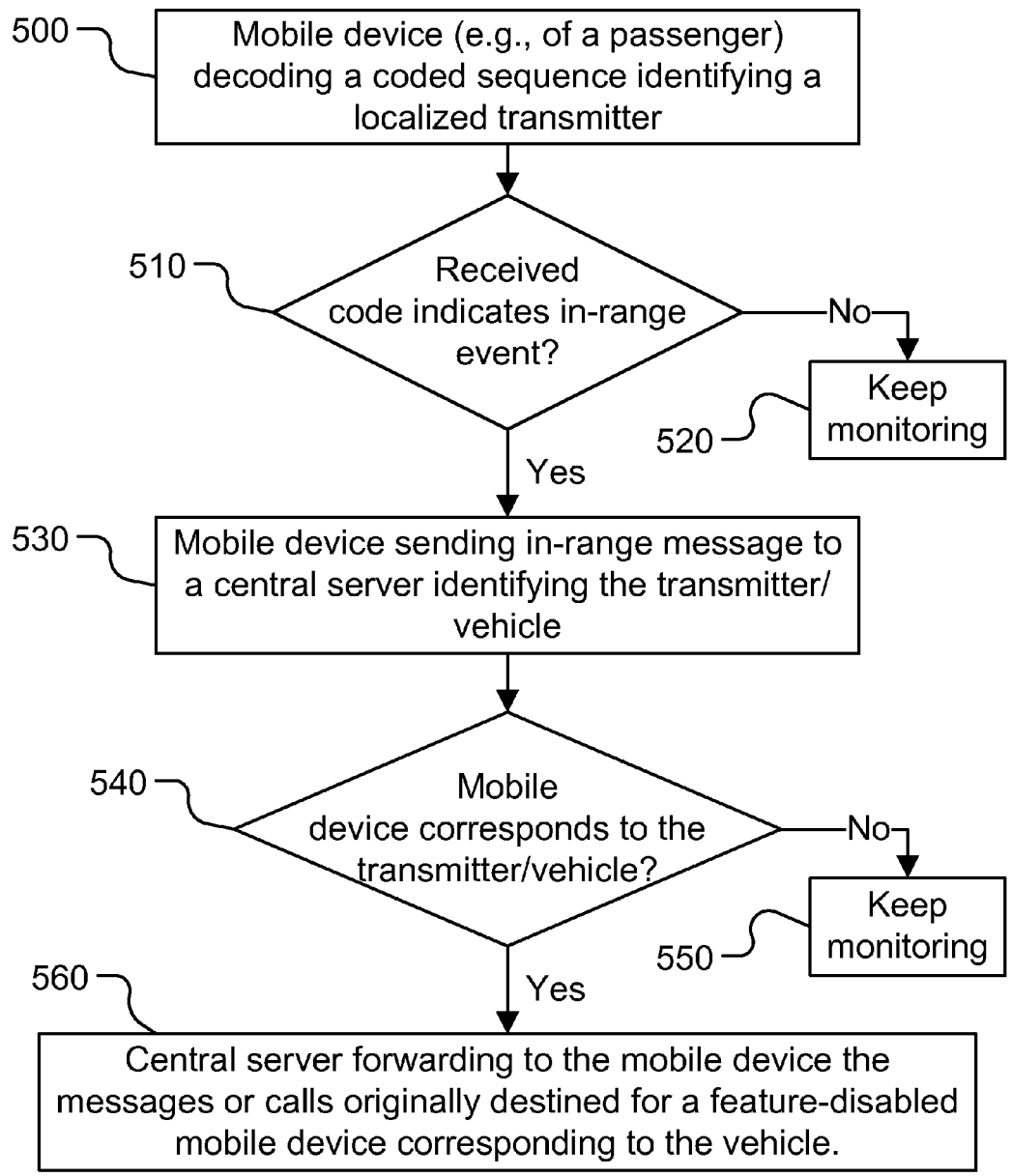
FIG. 5 illustrates steps in forwarding messages or calls to a mobile device in an embodiment of this invention.
Figure 6:
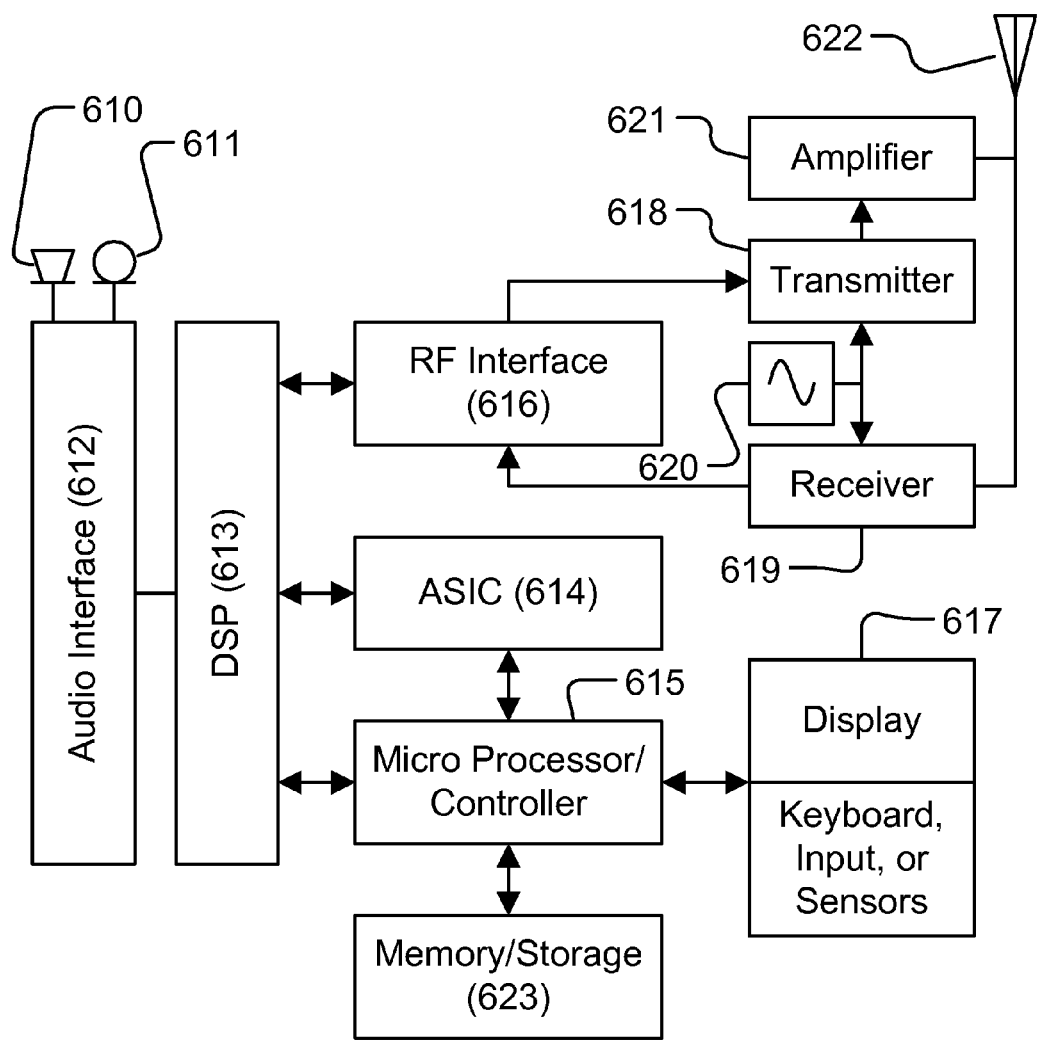
FIG. 6 illustrates typical components of a mobile device, known in prior art.

FIG. 5 illustrate steps related to an embodiment with multiple mobile devices (e.g., cellular phone), corresponding to, for example, the driver (FIG. 2, 226) and one or more passenger(s) (222 or 224), for example, occupying seats 212 and 214 (or 216), where one of the methods of this disclosure is used to determine that each mobile device is within a range of, for example, deactivation/disabling/modification (202) or activation/enabling/in-range (231), so that, for example, the SMS functionality in the first mobile device (e.g., 226) gets modified/disabled and the SMS function or messages/calls is forwarded to the second mobile device (e.g., 222), so that the mobile device at 222 is enabled to do the same function, by the passenger on seat 214 (instead of by the driver at 226).

In one embodiment, a first mobile device (e.g., 202) functionality is limited/disabled/modified due to its entrance in effective range of transceiver 204 (close to the driver's side). As the result a message is sent to, for example, a remote server/service/SMSC to flag the first mobile device as modified featured. In addition, the vehicle/transceiver ID associated with the first mobile device is also sent and stored at the remote service (e.g., in a database), as described earlier. As shown in FIG. 5, in one embodiment, a second mobile device (simply denoted as mobile device in FIG. 5, 500), for example, located at (222) receives a code from a local transceiver (e.g., 230) and determines that it indicates an in-rang event (510), i.e., the second mobile device (222) is in effective range (231) of transceiver 230 (or it is determined that the second mobile device is located at or near the front side passenger seat (214)). In one embodiment, the mobile device sends (530) a message to (for example) the remote service/center/server/SMSC, identifying the second mobile device, the vehicle/transmitter ID (230), and in-range event (or its availability to assume another mobile phone functionality/feature). In one embodiment, the remote service (or SMSC) attempts to match the first mobile device with the second mobile device. For example, in one embodiment, the remote service queries the vehicle ID to find matching mobile device(s) that are currently have modified-feature attributes (e.g., by looking up a database). In this example, the query result would include the first mobile device as it was tagged as feature-modified and it was linked (e.g., by an entry in a database) to the unique vehicle/transmitter(s) ID. In one embodiment, it is determined that both first and second mobile devices are associated with the same vehicle. In one embodiment, the remote server (or the first mobile device) determines whether the $2^{nd}$ mobile device can assume the modified/limited functionalities/features of the first mobile device. As an example, a predefined table is queries that provide the identities of the mobile devices having such authorization. An example would be a set of mobile devices that belong to a family plan or a business plan, etc. In one embodiment, the service provides an interface for users to configure/update/maintain the list. If the second mobile device can stand-in for the first mobile device (e.g., per list), then the second mobile device corresponds to the correct vehicle (540), and the remote service (or SMSC), e.g., forwards the text messages that were destined to the feature-modified mobile device (i.e., the first mobile device) to the stand-in mobile device (i.e., the second mobile device) (560).

Similarly, in one embodiment, the status of each mobile device (e.g., 226 and 222) are determined, and the function or message tasks are forwarded to 222, by the central server. Mobile device 226 is deactivated, partially or fully, e.g. at least for the functions that were forwarded to mobile device 222. The identification steps are done at steps 500 and 530, and the decision steps are done at steps 510 and 540, with decisions to keep monitoring at steps 520 and 550, and final step of forwarding the tasks at step 560.

In an embodiment, where one mobile device is shared between the driver and one or more passengers, (e.g., a mobile telephone belongs to the driver originally), and it is within the feature deactivation/disabling range of the driver seat, as determined by any of the methods mentioned in this disclosure, such as using items 204 and 230 for transmitter/transceiver (as an example), or ranges 202 and 231, for the driver and passenger, and a mobile device, e.g., item 226 in FIG. 2. However, when the phone is given to a passenger, in another seat, e.g., moving from seat 212 to seat 214, the signal goes to the center, a server, or SMSC, to update that the phone is now within an activation/enabling range, for the current location, to update the status to the activated or enabled device. Then, the passenger can use the feature, e.g., act on it and talk or text on the phone, back and forth.

In one embodiment, when the phone moves back, from range 231 to range 202 (e.g., handed from a passenger on seat 214 to the driver on seat 212), then a message is sent to the center, a server, or SMSC, to update that the mobile device (e.g., a cellular phone) is now within a feature deactivation/disabling range, and thus, the system does not let the driver use e.g., the texting functionality from then until the situation changes again, in the future.

In FIG. 11, there are some examples of communications, notification and/or forwarding from one device (or another device, or more devices, or in combination). However, these can be generalized to any number of proxies or intermediate devices, for storing, notification, forwarding, instructions, rules, controlling, and replacing. The SMSC can be generalized to any server, central place, or any other data center/processing center.

FIG. 11(*a*) shows one embodiment of the local device or localized unit (752) (maybe, located in the car, for example) sending a code to the mobile device, which, in turn, sends a Halt signal to SMSC, to stop sending any message or text, for example, to the user.

FIG. 11 (*b*) a local device (e.g., car communication system) acts as a proxy, and takes over. (The mobile device sends a proxy message to the local device.) Then, the local device acts as an intermediate device, and sends a Halt signal to SMSC.

In FIG. 11(*c*), we have multiple mobile devices, for the same local device, for which the availability of the second device is announced by the 2nd device, directly to SMSC, and the function for device 1 is halted, by the Halt message from device 1 to SMSC. Then, the message/function is forwarded to the second device, from SMSC.

In FIG. 11(*d*), we have multiple mobile devices, for the same local device, for which the availability of the second device is announced by the 2nd device to the device 1, which will notify SMSC about the availability of device 2 (indirect notification to SMSC, in contrast to FIG. 11(*c*)). Then, the message/function is forwarded to device 2, from SMSC, instead of device 1. (The code transmission and in-range verification are already taught by other examples in this disclosure.) Note that the teaching in this disclosure also applies to any wavelength, RF, infrared, X-ray, microwave, radio waves, laser, other parts of electromagnetic spectrum, visible, or invisible parts, plus sonar, radar, Doppler effect, sound waves, shock waves, or ultrasound waves. In one embodiment, an array of antennas is located on the top of the roof of the car, or inside the door of the car. The teaching in this disclosure also applies to the reflection, transmission, refraction, or emission, by/from/deflected by/through antennas, objects, human, users, drivers, passengers, telephones, tags, smart cards, IDs, RFID, or mobile devices, either active or passive (no battery or power, for example), and detected or received by some other dishes, antennas, detectors, sensors, CCDs, sensitive films, sensitive transistors or diodes, recording media, storage media, counter, accumulator, lenses, or semiconductor layers, to find/determine the location of users, telephones, and other objects, in the car or at other places.

In one embodiment, the sensor/transceiver or multiple sensors/transceivers are placed in a vehicle (moving object, or any object, in general). In one embodiment, the RFID (active or passive) technology is used, and RFID transceiver(s) are placed at the steering wheel, dashboard of the car, roof, door(s), mirror (center one, or on the side of the car), sunvisors, or other locations in the car. In one embodiment, the one or more sensors or detectors are placed near the driver or closer to the driver of the car. In one embodiment, a range threshold (e.g., FIG. 1, 102) is the maximum effective length/distance of the operation for this current device/system (or sensors) (i.e., within the range of operation of this current invention). In one embodiment, the mobile device is equipped with RFID transceiver/tag.

In one embodiment, an array of antennas is used, to make the signal directional. In one embodiment, the transceivers are placed at the ceiling of the vehicle or close to the floor (e.g., under the seats).

In one embodiment, the driver is excluded, but others on the car are not excluded, to perform a task (or have an option or functionality on the mobile device) or send/receive some signal or information. In one embodiment, some locations in the car are designated as hotspots, to be excluded, or to be included, to perform a task or receive some signal or information. In one embodiment, some locations in the car are designated as hotspots, in combination with a context (for example, the type of message, the sender, the identity of the receiver, the time of the message, the length of the message, or the content of the message, such as Private Message, Emergency Message, Financial Message, or "For The Person Named Joe Smith Message"), to be excluded (e.g. cannot do it), or to be included (e.g. can do it, or vice versa), to perform a task (or receive some service) or receive some signal or information.

Note that "can-do-it" situation can be generalized to all these situations. The user (limiting in terms of time or number of functions and tasks):
can do it,
or partially do it,
or with limited option do it,
or sometimes can do it,
or conditionally can do it,
or can do it as a group,
related to a task, sending or obtaining an information or warning message, or disabling or enabling some functions, options, displays, turning on devices or circuits, or menu.

In one embodiment, a context alone (or in combination with the other parameters) is the deciding factor for the determination, to be excluded, or to be included, to perform a task or receive some signal or information. In one embodiment, the identity (e.g. by name, subject to verification, by biometrics, PKI/private/public key, symmetric encryption, smart card, PIN/code, personal ID/password, or their combinations), or the position of the person (e.g. parent (of the driver or user), mother, father, guardian, owner of the business/car, boss, family member, an adult, police, authority figure, owner of the car, power-of-attorney, proxy, or court-appointed person), is the determining factor (alone, or in combination), to be excluded, or to be included, to perform a task or receive some signal or information.

In one embodiment, the biometrics includes the conventional identification methods, such as face recognition, knuckle recognition, eye recognition, iris recognition, fingerprint, finger recognition, signature, voice recognition, handwriting recognition, or pattern recognition, for identification or verification of the presence of the user/driver/passengers in the car, located at various point(s) in the car, for various seats/user(s), with one or more sensors or cameras in the car, and a central processing unit, in the same car, or in a remote location.

In one embodiment, for train, metro, or any public transportation means, the operator's usage can be blocked, and at the same time, a message/warning will be sent to the main station about the attempt or the actual usage of the operator, with proper recordation in a central server, with a time-stamp and number of occurrences. It can cause the emergency brake, disabling the control from operator side, or transferring the control to the headquarters.

In one embodiment, the message or warning can go to the same user, and/or his/her parents, his/her boss, third party (e.g. police), or anybody designated by the user or others. It can be in the form of each or combination of the following: text, telephone call, ring, audio, multimedia, movies, video, siren, vibration, light, flashing light, smell (e.g. releasing/spraying a sharp smell, from a chemical reservoir, container, or box, to warn or shake the user), voice message (standard or customized warnings, by user's voice or others'), predetermined message, customized message, real-time message, automatically conference call initiation, giving options on the user's telephone or computer/computing device, giving options on another person's telephone or computer/computing device, and/or specific music, song, sound, or note, for a specific situation, customized or assigned to, by the user or a third party, to remind the person or user about the specific situation. For example, a specific sound or music may/can/will remind or signal the boss (e.g. owner of the shipping company) that the user/driver/operator number 5 (e.g. among/out of his 25 drivers) has activated the warning or message.

In one embodiment, the following one or more conditions (or their inverse or negative logic counterparts) must be met, to activate the warning or message, to cause an action or task, or to start, enable, stop, or disable a function or task (e.g. stop getting and/or sending text messages and/or voice messages, or both, except, e.g., for to/from emergency numbers (911) or parents' number(s), or alternatively, with no exception, as another embodiment), for user or a third party, determined in real-time or pre-determined before, by user, system, government, laws, rules, or third party:
ignition is on,
the key is in ignition slot,
the car is in the Parking mode,
the car is in the Drive or Reverse mode, but otherwise stopped by applying brakes,
the car is moving,
the car is slowing down (or deceleration),
the car is speeding up (or acceleration),
the hand-brake is applied,
the car is stopped, but the engine is running at idle,
the tires or wheels are sliding or rotating,
the speedometer shows a non-zero value,
the engine speed (RPM, round per minute) shows a non-zero value, and/or
the car is in the Drive or Reverse mode, and also moving.

The conditions above can be AND-ed, OR-ed, NOR-ed, XOR-ed, or logically combined in other forms, to set more or fewer constraints or conditions on the user or driver, in terms of functions available to the user, regarding his mobile device, PDA, laptop, computer, GPS system, multimedia display, DVD player, CD or CD-ROM player, radio, cell or mobile phone, pager, walkie-talkie, computing device, communication device, or any other device or appliance available as mobile or in the car (or even limiting the functions of the car, such as limiting the gears on the gearbox or stick shift, stopping or slowing the engine, stopping the gas supply, turning off the radio, or similar functions in the car). One can customize the conditions above, for example, one can set the following, as the condition (rule-based condition can be downloaded automatically or pushed from a server maintained, e.g., by a government entity/agency):
IF
(The speed of the car is more than 3 miles per hour, AND
(the handbrake is not applied, OR the car engine is running, OR the car is not in the "Parking" mode, OR the car key is in the ignition OR activated remotely (for keyless ignition systems)))
THEN
(Disable the texting function in the phone,
AND send a message to the central location, informing the parents,
AND turn off/disable the radio, DVD player, and TV in the car,
AND turn on the headlights on the car, automatically.)

Thus, any kind of condition and restriction/consequences can be applied in the logic of the operation, as long as there is a sensor or device to detect that condition, and there is a switch or controller to disable/enable/control/adjust the outcome, equipment, or parameters. One CPU, server, or central computer in the car (or remotely) can control and adjust all parameters and equipment, sending multiple signals and warnings to different locations for various tasks and acknowledgements (as an example).

In one embodiment, the choices or options are all disabled, partially disabled, all enabled, partially enabled (e.g. disabling text, but still enabling voice functions, or hands-free options), or time-delayed (for example, after the car and/or engine stops (either or both, for different embodiments), enabling the text functionality, delivering the message, or turning on the telephone).

In one embodiment, the BLUETOOTH®(A wireless technology protocol), using a universal code, can be used for transmission and communication between the devices and the telephone. The application can run in the cell or mobile phone, or alternatively, in a central place or server, as a remote location, for example. In one embodiment, the application can run in the background, and checking periodically for the status, to activate or deactivate some function(s)/option(s) or do some task(s). In one embodiment, the telephone is a "smart" device, i.e. all or most of the decisions and processing units are in the handset, itself. In one embodiment, the telephone is a "dumb" device, i.e. all or most of the decisions and processing units are in the central location, e.g. on a server, or at the headquarters, e.g. in a remote place, such as at the telephone company. In one embodiment, the software or updates are pushed from carriers, telephone, car, rental, or service companies (or local/state/federal governments), to individual devices or telephones. In one embodiment, the user downloads the codes or execution software, using hash function or encryption, for security, from a web site or a central place/server.

In one embodiment, the command or the signal from the processing unit forces the engine or car to stop, or put on the brakes for the car, slowly or immediately, or prevent/restrict texting or telephone functions, partially or fully (e.g. turn off the texting unit, or the phone altogether, on the first try, or on the second/third try, by the user, for example, or restricting more on the subsequent tries, for the functionality of the phone or texting, as another example, which requires a counter to count the number of attempts).

In one embodiment, the system is in an enclosure which is tamper-proof. The state or the federal government can check the functionality of the system, on a yearly mandatory basis, so that nobody can open the enclosure or change any settings or parameters within that.

The ID/verification for a person and phone can be obtained from the phone, in one embodiment. In one embodiment, the ID of a person can come from a separate tag, driver's license, key chain, magnetic strip, RFID (passive or active), or smart card (or similar or conventional method/source), while, as a separate (different) source, the telephone ID comes from the telephone (or yet another/third source).

In one embodiment, if the unit is functioning or malfunctioning, the indicator on the car shows to the user, using lights or LEDs, or sound/voice. The police can monitor the status of the unit, or if it functioning properly (e.g. if it was tampered with), using the sensors or signals monitoring the doors, seals, or caps, on the box or enclosure, to find such a status, whenever the car goes for yearly inspection or stopped for any traffic violation, in the close proximity with the police detector or police car. This can be done using, for example, a complete circuit going through the door of the disclosure. So, whenever somebody opens the disclosure, the circuit becomes open, and that can trigger a magnet/wire coil (that feeds from the same circuit) to stop working, causing a metal rod or bar to move a certain direction or drop, by gravity, after the magnet ceases its support or pull on the metal bar or rod, and also, causing some other circuit sending a signal, indicating such tampering and action, to a detector or a central location, such as police. Similar types of tamper-proofing and/or detection have been done by others, and we incorporate any conventional tamper-proofing art here.

In one embodiment, the authorities or authorized personnel can check whether the transceivers are turned on by measuring residual signal power levels around and in proximity to the vehicle.

In one embodiment, tamper proofing is applied to the software modules running on the mobile device and/or localized unit. The tamper checking is performed, for example, when connecting to the service provider/carrier, by downloading a tamper checking software/code/script from the carrier to the mobile device. In one embodiment, the tamper checking software when running on the mobile device checks the feature limiting features of the mobile device (e.g., the triggering program) by use of methods such as determining hash representation of the code and comparing with that from the remote server.

In one embodiment, for the parents, the restriction can be higher than those imposed by the states or federal government, for the children under 18, or above age 18, to drive the car, based on the age and experience, as set by parents. This can also depend on the range of driving, distance from the house (e.g., determined by using GPS), mileage per day (e.g., by using a counter), time of day (more restriction at night), maximum speed, and maximum weight for the cargo for the car. For example, the younger the driver, the more restrictions on the driver, and the less functionality of the telephone, in addition, to limiting the speed of the car, or at least, warning the kid or parents about the high speed (or recording those events with timestamp for future inspection by parents, for exceeding age-related speed limitations or local speed limits).

The cars nowadays have a sensor, based on the weight or pressure, or temperature, which can detect the presence of a person on a seat. In one embodiment, this can be used for detection of the passengers, i.e. the number and positions. For example, if a kid (the driver of a car) has a passenger in front, then if that passenger is identified as a parent/guardian (e.g., based on biometrics or smart card), then he has fewer restrictions, but if that person is not his parents, he will have more restrictions on his telephone functionalities, compared to that of driving alone. In one embodiment, in order to identify the passengers, their mobile devices and their locations are recognized via the local transceivers, the localized unit, and the mobile device(s). Based on the identifications of the mobile devices (e.g., cellular telephone numbers or other identifying features such as SIMS), the identity of the holders are determined. In one embodiment, this method is combined with other identification methods for additional checks.

The rules and restrictions can be updated crossing state lines or boundaries for local governments/cities, downloaded on a kiosks or terminals, remotely, in proximity of the kiosks or terminals (while stopping or moving), by radio signals or magnetic/optical transmission of data (or even cable connections, if the car is stopped to update from those kiosks or terminals). Those rules can also be updated at the yearly inspection stations by the local governments, for all cars.

In one embodiment, the busses and trucks have more restrictions than cars for texting or telephone functions. At dark or night, there are more restrictions than during the daytime. In one embodiment, the family plan for telephone company dictates the rules, or who can change them (rules and restrictions on the usage of phones), with some password or other ID verification techniques. In one embodiment, this system can be integrated with GPS, satellite transmissions, and emergency road services, such as On-Star service. In one embodiment, the settings are done at the factory, based on destination market, according to local rules.

In one embodiment, the following is disabled/enabled/modified, as one feature or combinations:
  keyboard,
  text processing unit,
  text display unit,
  text storing unit,
  text receiving,
  text sending,
  voice receiving, and/or
  voice sending.

In one embodiment, the drunk driver detection, already on the market, can be combined with our system, to report sick, drunk, sleeping, or texting driver, based on the breath analysis/chemical analysis, eye patterns, blinking patterns, breathing patterns, and position of the head for the driver, using face analysis and various pattern recognition methods in the market.

In one embodiment, if the driver receives the text, it will automatically go to one of the passengers, or a designated one(s), based on the identity, telephone ID or number, or the position of the passenger in the car, or the combination of the above. These rules can be predetermined, or set real-time, during driving, by one of the passengers, for example.

In one embodiment, the system periodically searches/detects to see if it is within the range or not, to turn it back on again. For example, after disabling the text earlier, when the car is stopped, or the driver or telephone is removed from the car (when the system detects such a status), the system turns on the texting functions back on again, so that the telephone is fully functional again.

In one embodiment, the presence/identity of the user is determined by triangulation from multiple sensors, or multiple directive antennas, or RFIDs, or magnetic tags, or smart phones, or smart cards, or multiple antennas. In one embodiment, the face recognition or conventional feature/pattern recognition techniques are used for identification of all passengers or driver.

In one embodiment, using multiple sensors, detectors, antennas, tags, reflectors, dishes, transmitters, or receivers, at different locations (in the car, boat, airplane, train, or other vehicles, for personal or commercial use), one can determine the locations of the multiple users/phones in a car (for example). The intensity measurement and/or distance measurement are applied here.

In one embodiment, in each region of the car, there is a set of sensors or transmitters, to detect the presence of a passenger on that area or seat. That will give a binary (Yes/No) answer for the "presence" variable for each seat. This way the passengers for each seat are determined locally. In one embodiment, the passengers for each seat are determined globally, from all the sensors in the car, using the distances or ratios, for example, for intensities, to determine who is in what seat, or which seats are unoccupied.

In one embodiment, 2 kinds of triangulation methods are used, each or both together: (1) based on the relative intensities, (2) based on the delays and timings. When one has the extra points of reference (or redundant antennas or detectors/transmitters/receivers or directional antennas or array of antennas), the extra information can be used to interpolate or extrapolate the other data, to check the validity of the other data, or to average the data, to reduce errors or get a better location or relative position information.

In one embodiment, the microprocessor or controller periodically reads the decoded sequence from the receiver/decoder, and compares it with a stored code. If the decoded code matches a predefined correct code, the microprocessor or controller performs one or more of the following operations:
  Inhibits the display from displaying any sent texts.
  Inhibits texting operation, by disabling the texting function of the mobile device.
  Sends a signal to SMSC to withhold sending text messages to the mobile device, until further notice, and meanwhile, to store the incoming text messages, as one option, if the user desires.

As soon as the mobile device is out of transmitter range and receiver fails to detect the transmitted signal, the microprocessor or controller resets mobile device's texting operation back to normal.

In one embodiment of the invention, the transmitter encodes a predetermined sequence and transmits it through inductive antenna to transceiver unit located in front of steering wheel of the vehicle, the vehicle ceiling over driver's head, or the dashboard section in front of the driver. As the mobile device comes within the reception range of transceiver, transceiver receives the transmitted signal through inductive antenna, decodes the transmitted sequence in the decoder block, and after verification of the decoded sequence, for example, by comparing with a replica of the sequence in its memory, generates a logic 1 bit, to logically AND it with ignition and not-park signals, to enable a transmitter. The transmitter encodes a second predetermined sequence, different from the first predetermined sequence, and transmits it through inductive antenna block to transceiver. Receiver block in transceiver decodes the second sequence, which in turn is read by microprocessor/controller, to disable the display/keyboard, for the user.

Another embodiment employs BLUETOOTH®(A wireless technology protocol) technology operating either over a dedicated channel or a plurality of channels. A transmitter transmitting a dedicated code is installed, as in previous embodiments above, within the steering wheel of vehicle or in another location in the vehicle, in the close vicinity of the driver's seat. Similar to the previous embodiments, when a mobile phone device comes within the reception range of the BLUETOOTH®(A wireless technology protocol) transmitter, the BLUETOOTH®(A wireless technology protocol) receiver of the mobile phone device receives the transmitted code, decodes it, and subsequent to verification, initiates a command sequence in the microprocessor or controller, to disable texting operation, and in addition, to send a message, through the control channel to SMSC, to store and withhold sending the messages destined for that mobile phone device.

In one embodiment, where the speed information is not directly available from the vehicle, the speed dependent rules related to the feature modification may be applied by directly/indirectly estimating the speed of the vehicle. For example, in one embodiment, a GPS or a triangulation technique is used to estimate the location of the vehicle (e.g., using the mobile device being carries in the vehicle) at various times (e.g., sampled every 10 seconds). The speed of the car and/or the direction (vector) is determined by comparing the consecutive location of the vehicle and elapsed time between their sampling using known methods. In one embodiment, the sampling time is reduced if the speed increases or variation in speed along the consecutive points are beyond a threshold.

Figure 14:
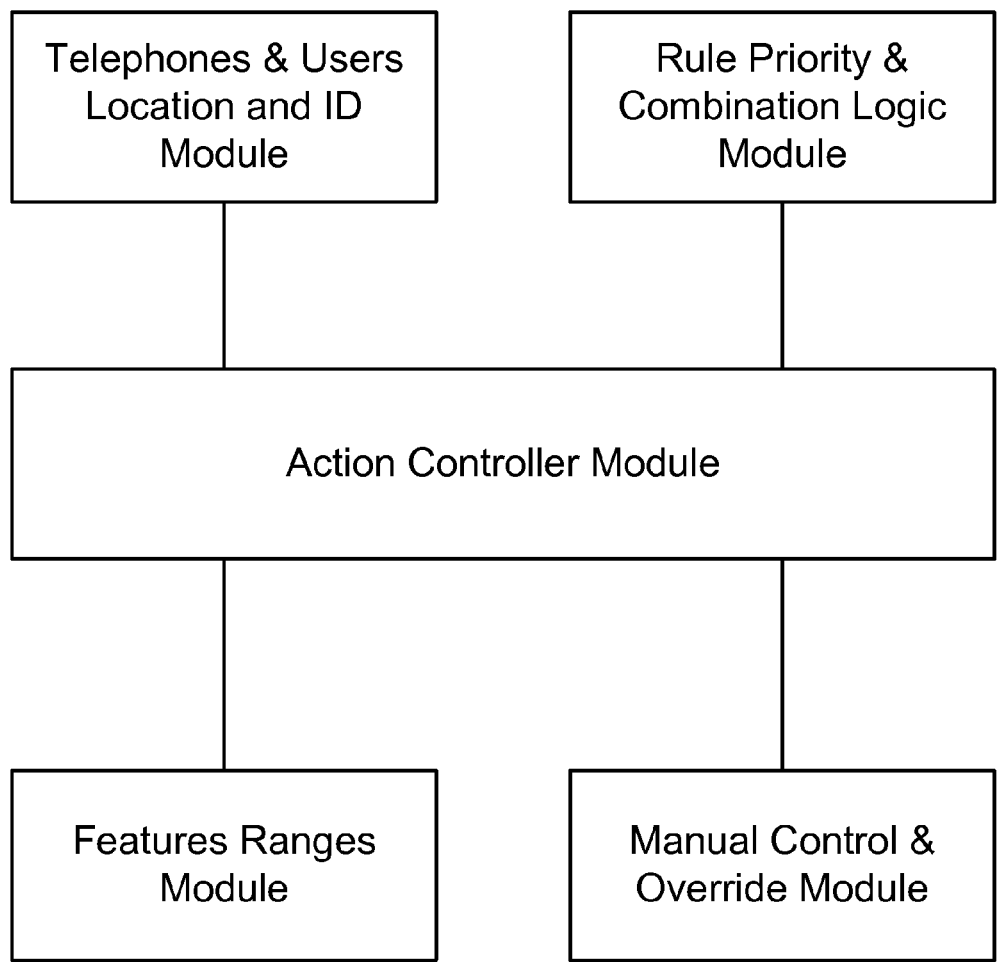
FIG. 14 illustrates an exemplary system with an Action Controller module, used in an embodiment of this invention.
Figure 15:
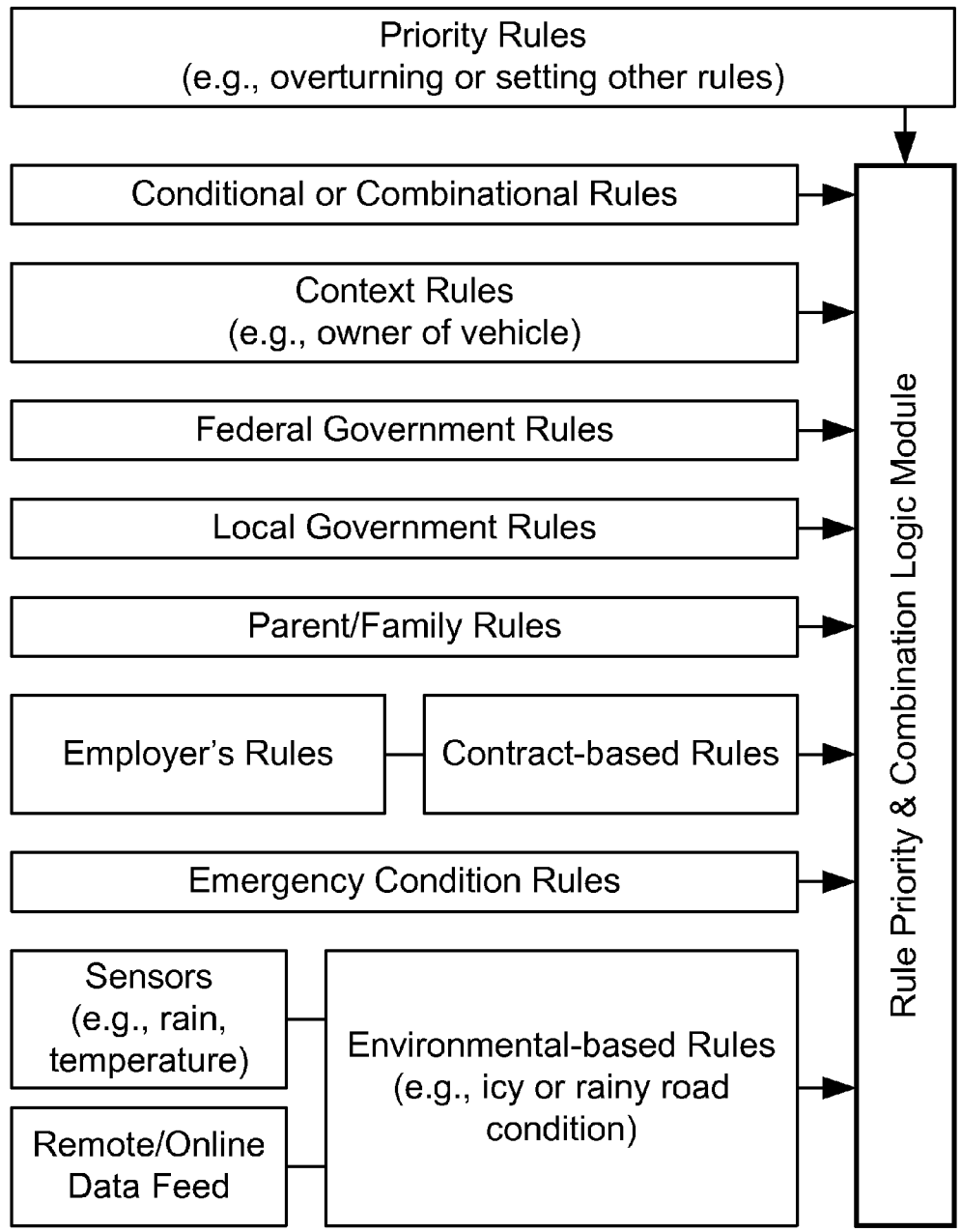
FIG. 15 illustrates exemplary rules input to a Rule Priority and Combination Logic module, used in an embodiment of this invention.
Figure 16:
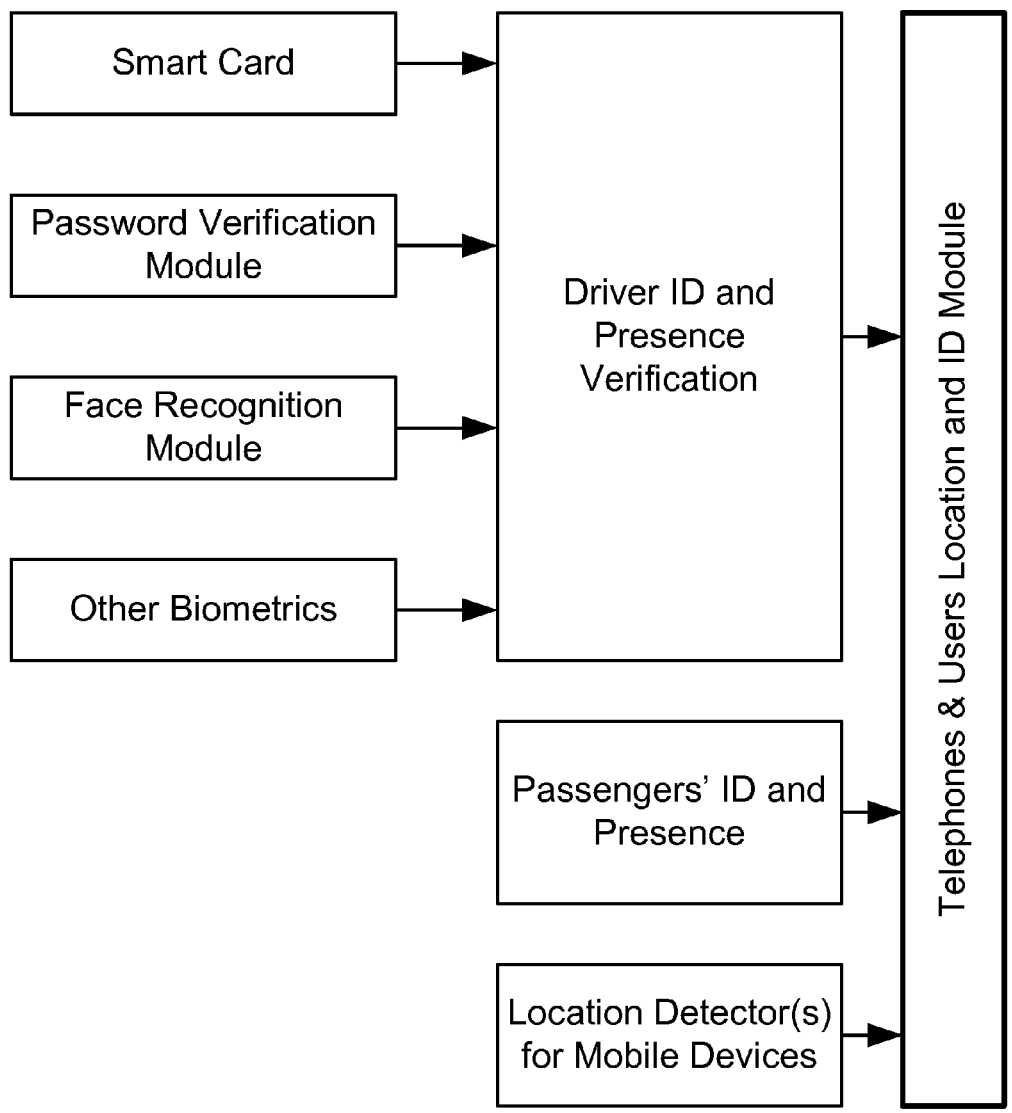
FIG. 16 illustrates exemplary input to a Telephones & Users Location and ID Module, used in an embodiment of this invention.
Figure 17:
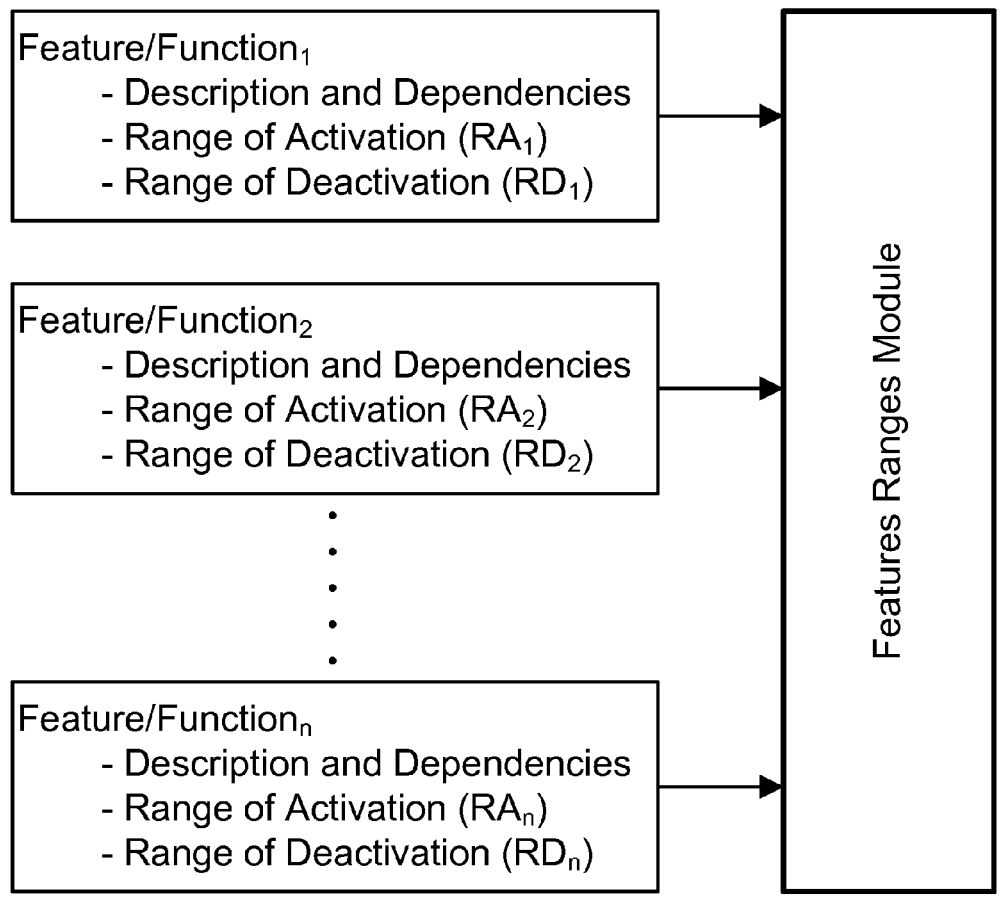
FIG. 17 illustrates exemplary input to a Features Ranges Module, used in an embodiment of this invention.

As one embodiment, FIG. 14 shows the inputs from 4 modules going to the Action controller module, with a possible feedback from the Action controller module to those 4 modules. The Telephone and users location and ID module is shown in FIG. 16 in more details, as one example. The Rule priority and combination logic module is shown in FIG. 15 in more details, as one example. The Features ranges module is shown in FIG. 17 in more details, as one example. There is an optional Manual control and override module, which a user can interfere, change parameters, or stop the operation at different authority levels, if desired, as an example.

FIG. 16 shows different rules and parameters from different modules contributing to the Rule priority and combination logic module. Priority rules describes who and how an entity can overturn another entity or rules, or set the rules. So, in one embodiment, it is a priority listing and ranking, of all members and entities, with higher ranks outweigh/overturn/veto/cancel/modify the lower ranks' votes in the listing. It can also, in one embodiment, include a voting scheme for entities of the same rank, in which a majority, e.g. 51 percent, or super-majority, e.g. 75 percent, can win/vote, collectively as a group. In one embodiment, it specifies which entity can change what parameters and rules, in what condition, and with what credentials. For example, a parent showing the correct identification card, to establish the name and identity, and referring to a database, showing the relationship between parents and kids (and their names), on the weekends, can/has the authority to set the parameters and constraints for the driving of the kids and their telephone usages, during/for the following week.

In FIG. 16, Conditional rules can be, in one embodiment, IF statements or UNLESS statements, such as:

IF the time is after 9 pm,

THEN the telephone voice function is deactivated;

UNLESS the call comes from the parents cell number or home number.

The Combinational Rules can be any logical combinations, such as the following, as one condition:

((a OR b OR c) AND (d XOR e)), where a, b, c, d, and e are the statements, such as:

"The road is dark."

or

"The road is wet." (e.g., wet and slippery, due to rain)

Federal government rules can be set up to override local rules, and vice versa, according to the laws enforced. Contract-based rules can come directly from a contract, specifying the time of restrictions, the range of restrictions, distances, and other parameters, which is spelled out in a contract between a business owner and the hired drivers for his trucks, as an example.

Emergency condition rules may override all others, in terms of police calling or 911-calls, or any forward calls, showing the Context or Content flag (as a header information) as being the emergency type.

Sensors to measure the temperature and humidity/rain, inside and outside of the car, or current information/forecasts from web sites or Weather Channel can be fed into the Environment-based module, to find the corresponding rule(s) for that specific weather condition, as an example, and supply that rule(s) to Rule priority and combination logic module, as shown in FIG. 15, as an input.

In FIG. 16, different methods are used to verify the identity of a person or show the presence of the person, as the driver, passenger, or other users. The location of a person can be detected by antennas, reflection, transmission, detectors, or receivers, and analysis of the relative timing and intensity, to locate a person in the car or on specific seat, e.g. before biometric identifications. All of the obtained information is then supplied to the Telephone and user's location and ID module.

In FIG. 17, for each function and feature on the phone, for example, for n features (going from 1 to n, where n being a positive integer), we have the description of the feature/function, such as text messages sending or receiving. We have also dependencies, e.g. "text function disabling" which has a relationship with "disabling text message receiving". That is, "text function disabling" is a superset of "disabling text message receiving". That is, whenever the text function is disabled, the text message receiving is also disabled, but the reverse is not always true.

In FIG. 17, whenever an object comes within a range to trigger the function to be modified/disabled, called Range of Modification/Deactivation, or $R_D$, which (in general) may not be exactly the same as the range for the reverse situation, to make the same function restored/activated again, within some range, or Range of Activation, or $R_A$. (The activation or deactivation can be interpreted both for enablement and disablement, respectively, or vice versa.) However, for most cases, the two ranges/radiuses/distances are the same, with the same boundary/border/threshold, for the activation and deactivation process to be triggered, i.e., $R_A = R_D$.

In one embodiment, some or all the information from the modules above will be input to the Features ranges module, as shown in FIG. 17.

Figure 18:
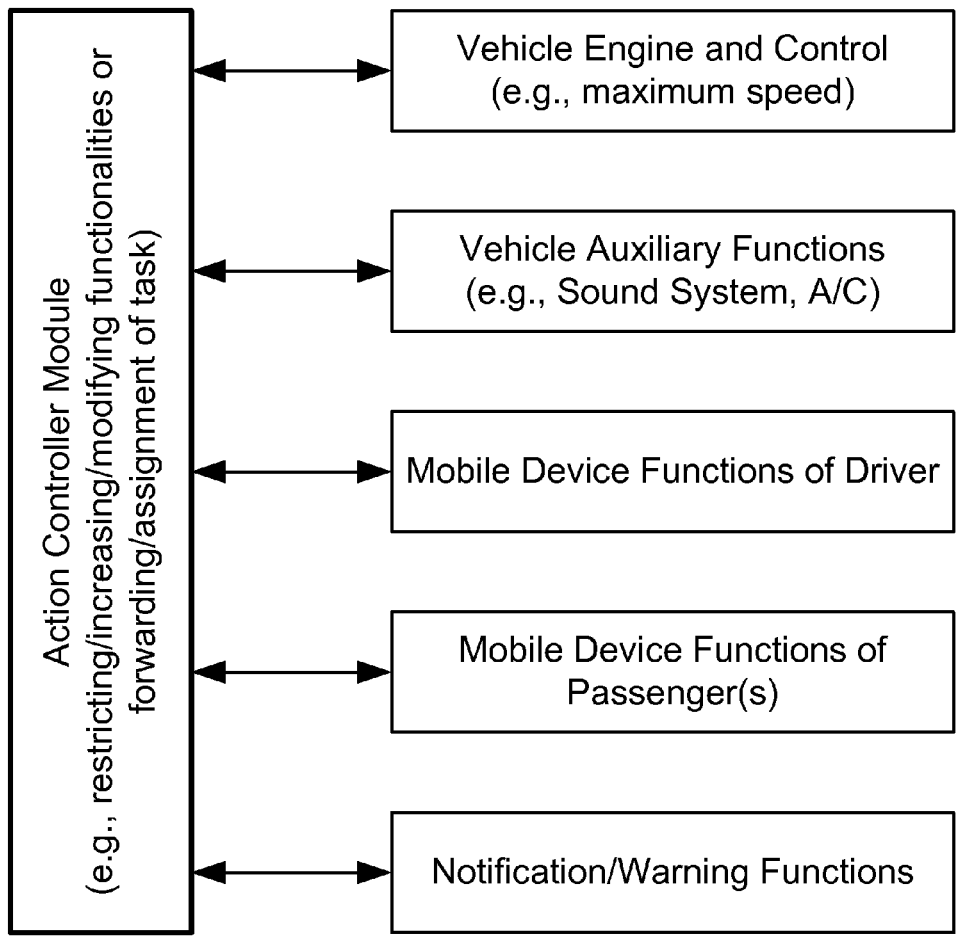
FIG. 18 illustrates exemplary components/features/functions affected by an Action Controller Module, used in an embodiment of this invention.

In FIG. 18, we have Action Controller Module, which may increase, decrease, or modify the scope, the number of available functions, functionalities, choice list, or menu list of the possible actions for a given device. Alternatively, it may forward the function or task to another entity or user, or re-assign the task(s), partially or fully, e.g. transferring the text message intended for the driver to a passenger in the car, i.e. to a second phone, as a forward message, so that the passenger can respond/listen/talk to the phone/text message/voice message, in real-time, or as stored message, with an optional copy stored for the driver for his later review, with an option for the driver to also review the response of the passenger, as well, in terms of recorded voice or text, at a later time, e.g. when he is not driving anymore, and his telephone is activated again.

This can be extended to a conference call for multiple users and multiple drivers/multiple passengers, all at the same conference call, using voice and/or text.

In FIG. 18, Action Controller Module can control engine speed, car speed, car acceleration (e.g. amount of gas and air supplied), the max or min gear functional (on gear box), or amount of current or voltage supplied (e.g. for electric cars); equipment in the car, such as sunroof and radio (e.g. on/off switch, and volume for sound adjustment, based on a maximum level); type of functions available for mobile devices and communication/personal/computing gadgets, for different users at different locations and with different responsibilities, such as driver and passenger(s), in front and back seats, for example.

In FIG. 18, Action Controller Module can control type and method of delivery, plus the frequency of delivery, of messages, notifications, and warnings, in addition to who gets it, in what order. For example, Action Controller Module sends a warning message to a father, every minute, or in higher frequency later on, with a special ring and follow up recorded voice message, first, about the receiving text message by a teenage driver (his son). Then, later, it would send a second message to his mother (of the driver), with text message, only, every 5 minutes, warning about this incident, with no or different ring tone. There is a list of recipients, with the order of receiving, in one embodiment. In one embodiment, there is a forwarding list, and there is another list for when/in case the father and the mother cannot answer the phone, as the emergency backup numbers, or the list of people to contact later on.

In one embodiment, biometrics or other types of identification is used to identify the driver (e.g., by using a finger print scanning device located at or near the steering wheel, ignition button or other controls). Based on the driver's identification, information such as rules/configurations are queried from a database(s) in one embodiment. The associated mobile devices are identified (e.g., by their service carrier and cellular telephone number) based on the driver's identification, e.g., by querying the identification database(s). In one embodiment, the gathered information is provided to an Action Controller module to effectuate modifications on features/functionalities of vehicle and/or the mobile device(s) based-on rules and environmental context.

One can use a separate code for personal identification of the user, as an example. Each telephone can have a universal or a unique code for identification of the telephone. The user code and telephone codes can be added or combined. In one embodiment, the directional antennas are used, for detection of the location of the users or phones. In one embodiment, the messages are re-routed or stored in a remote place. In one embodiment, multiple points/transceivers of the car are used for sending signals, and also multiple points are used for receiving the signals or reflections of the signals. In one embodiment, the software and instructions/codes are stored on a magnetic or storage media, such as hard drive or memory stick, to be run by a computing device or processor, to implement the methods and steps taught in this disclosure.

In one embodiment, the signal or task or message is forwarded to multiple users, who may in the car, or may be outside of the car, away from the driver of the car, e.g. in another car. In one embodiment, for position detection, for user or phone, one can use a beacon using sound, light, or flashing light, or tags using RFID, to find and identify the objects. The range for detection can be expressed as length, e.g. feet or meter, or as voltage or current for the threshold of the detected signal, as detected by the detectors, sensors, or receivers, based on their prior calibrations, so that it can be mapped to corresponding distances, in terms of meter or feet, for the thresholds, for the detection purposes, for users or phones.

In one embodiment, GPS is used to find the relative or absolute positions of objects. In one embodiment, one can turn off or on a device, such as phone or a module in the phone, or with a timer, with delay, or gradually reduce the voltage or current to zero, e.g. using a slide or variable resistor. In one embodiment, the monitoring is done using a continuous or periodic schedule, triggered by a clock, for example, or manually, by a user or third party, so that if the phone is in/out of the range, or crosses the boundaries, it can be detected in its new status and position.

In one embodiment, RF communication is used between components, or any other parts of spectrum. In one embodiment, the restriction on speed of car is applied for the young driver. In one embodiment, the notifications can go from the reverse directions as well, based on teachings above, i.e. from device A to B, as an example, rather than device B to A, as in the teaching above, or going through a proxy, sending a notification to the server or central location, e.g. for status/location of the phone, e.g. notification that if the phone is in the range, or if it is outside the range.

In one embodiment, a time difference between 2 or more reflected signals, with respect to a base time of another signal, e.g. original signal, can be used to find the time delay, or distance differences between different objects, based on the speed of light or sound, as the source, to pinpoint different objects in the car, and find/independently verify the position of users and phones.

In one embodiment, the features to be disabled or modified/limited are speed dependent (i.e. the speed of the vehicle), or based on the age of the driver. In one embodiment, the expiration time or extension time periods for modifying a feature can be speed dependent, for example, for different ranges of speed, different ranges/classes of features are disabled/modified, e.g. for low speed range, sending SMS is disabled, and at higher speed range, receiving SMS is disabled, as well.

In one embodiment, Multimedia messaging service (MMS), movies, video, songs, lectures, books, text, and recorded voices can also be applied to this teaching here. In one embodiment, a computer readable media is used to store the data or executable codes to run the software for the implementation of the methods and steps of this invention.

In one embodiment, when a user plugs the phone to a battery charger at a vehicle, the mobile device recognizes the power plug attachment event and inquiries the user to indicate whether the current location is in a vehicle (on mobile device user interface or on the car user interface, for example), and/or whether the user intends to drive. If the user indicates YES, the mobile device modifies the features, such as disabling SMS and/or a message is sent to SMSC or a remote service to withhold messages and/or calls. In one embodiment, the mobile device user interface does not let the user proceed, until the user answers the inquiry, or the power cord is unplugged.

In one embodiment, once the mobile device receives a message indicating total shut-down from the localized transceiver, it turns itself off, after e.g. verifying the associate ID with the transceiver. For example, this is used in a theater setting, to reduce the unwanted/disturbing calls during presentation.

In one embodiment, instead of the SMS messages at SMSC, the SMS messages are stored on the mobile device, and the response that the user cannot respond in person is sent to the sender. In one embodiment, SMSC sends similar message to the sender, when storing and not forwarding the messages to the mobile device, due to modification of the feature on the mobile device. In one embodiment, the SMSC keeps track of the enablement and modification times of the mobile device and the senders, so that it would send the automatic response to a sender only once, if the feature has not since been enabled. This prevents a possible infinite loop of messages between disabled senders and receivers.

In one embodiment, when the modifying feature is receiving telephone calls, special answering reply is used at the answering service, to indicate to the caller that, e.g. "The callee is currently driving, and cannot accept a phone call.". In one embodiment, once the mobile device features is being modified, the mobile device (or localized unit) sends a message to a service at the telephone service provider with a code indicating e.g. to modify the reply message, in answering service and/or hold incoming calls and direct them straight to the answering service. In one embodiment, the telephone service sends a message to the mobile device, indicating that a call went straight to the answering service, e.g. indicating to the user with a special audio tone/sound.

In one embodiment, when the modifying feature relates to phone calls or messaging, and a car is equipped with hands-free telephone and messaging features, then messages and/or calls are forwarded to the hands-free device, for example, by forwarding the messages/calls from the service provider/carrier, to the phone number or SIP address or other identifications, associated with the hands-free device.

In one embodiment, when modifying a feature on a mobile device, if a 2nd mobile device is available, the limited functionality is used on the 2nd mobile device, by forwarding calls and/or messages to the 2nd mobile device, directly, from the limited mobile device, e.g. via a communication link, such as BLUETOOTH®(A wireless technology protocol). In one embodiment, when the limitation is lifted, the on-going calls remain connected on the 2nd mobile device, for continuity, by e.g. continue to forward voice data from the 1st mobile device to the 2nd. On the completion of the phone call, the new calls would not be forwarded to the 2nd mobile device. In one embodiment, the limited feature mobile device recognizes other mobile devices, e.g. in a piconet, established via BLUETOOTH®(A wireless technology protocol), and queries a preconfigured list of trusted mobile devices to determine whether the calls or messages can be forwarded to the 2nd mobile device. In one embodiment, there is a priority settings used to determine which mobile device among available ones in the piconet should get the forwarded messages/calls. In one embodiment, the forwarding number/person's name/ID, corresponding to the 2nd mobile phone, is entered/specified on-demand in real-time, by the user or authority, e.g. on 1st mobile device, or from a car/vehicle. In one embodiment, the proximity (the nearest phone to the driver, or the closest passenger detected, for example, based on the RF power level, or based on location determination by other methods, mentioned here in this disclosure) is used to identify/assign the 2nd mobile phone, for this purpose.

In one embodiment, the sound goes from top speakers in the car for telephone voice or music to speakers on the foot-level, underneath, or transfer the sound to speakers on the back seats, to focus/de-focus and alert the user or listener/driver about the telephone, or put more focus on the road, to prevent accidents.

In one embodiment, the smart cards or tags/magnetic IDs are read by a reader, in contact or remotely, to identify the person, or role, e.g. parent, based on a connected database, e.g., to show the relationships between people, e.g. names of children and parents, connected/referred to, in the database, or otherwise, found on the smart cards or tags of the parent or child, e.g. mentioning the ID card or number/code for the other person, i.e. the child or parent, respectively, pointing to the other person, as a method of verification or locating the other person, to activate the rules and proximity conditions, e.g. when the passenger is the parent, and the driver is the kid, in which case some restrictions on the kid is relaxed, or e.g. the calls are forwarded to the parent's phone automatically. In one embodiment, when two cards are in the vicinity of each other, they signal each other, to recognize each other (having antennas, and also power source, at least on one of them), for the conditions mentioned above, to recognize that the parent is sitting next to the kid/driver.

Wherever a vehicle is used in this disclosure, the teaching may be generalized to other enclosures such as train, metro, tram, streetcar, trolley, airplane, boat, ship, balloon, hot air balloon, air ship, kite, glider, metro-rail, bus, truck, air-borne or sea-borne vessel, or air-traffic controller or un-manned airplane controller seating areas. The teaching can also be generalized to a non-mobile setting (e.g., a air traffic controller) where it is desired to have the operator's attention be on the operation of the business, job, or apparatus, instead of for example, texting via a mobile phone. In such a circumstance, the transponder(s) may be located at the vicinity of the operator station to enable the detection of in-range/out-range events.

The tasks in this disclosure can be implemented/performed by software/hardware/firmware or a combination, in a local, central, or remote location, partially or fully.

This invention can apply to any functions for any mobile device. It does not have to be limited to a vehicle or car. The driver can be generalized as the user. The passenger can be generalized as the $2^{nd}$ class of users. The parents can be generalized as authority, police, owner, boss, or government.

All data information including executable codes/scripts/programs/tasks are stored in one or more storages in various modules and systems described in this disclosure. In addition, the systems and modules have various processing units/CPUs to execute/run such executables. The communication and data transfers are performed via wireless/wired/optical/sound/voice medium and devices. For example, using voice recognition and pattern recognition devices can be used to recognize an individual's voice or sounds (e.g., notes, whistles) commands or statements to for example initiate an event to be performed by various devices and processes running on those devices (e.g., SMS forwarding).

Figure 19:
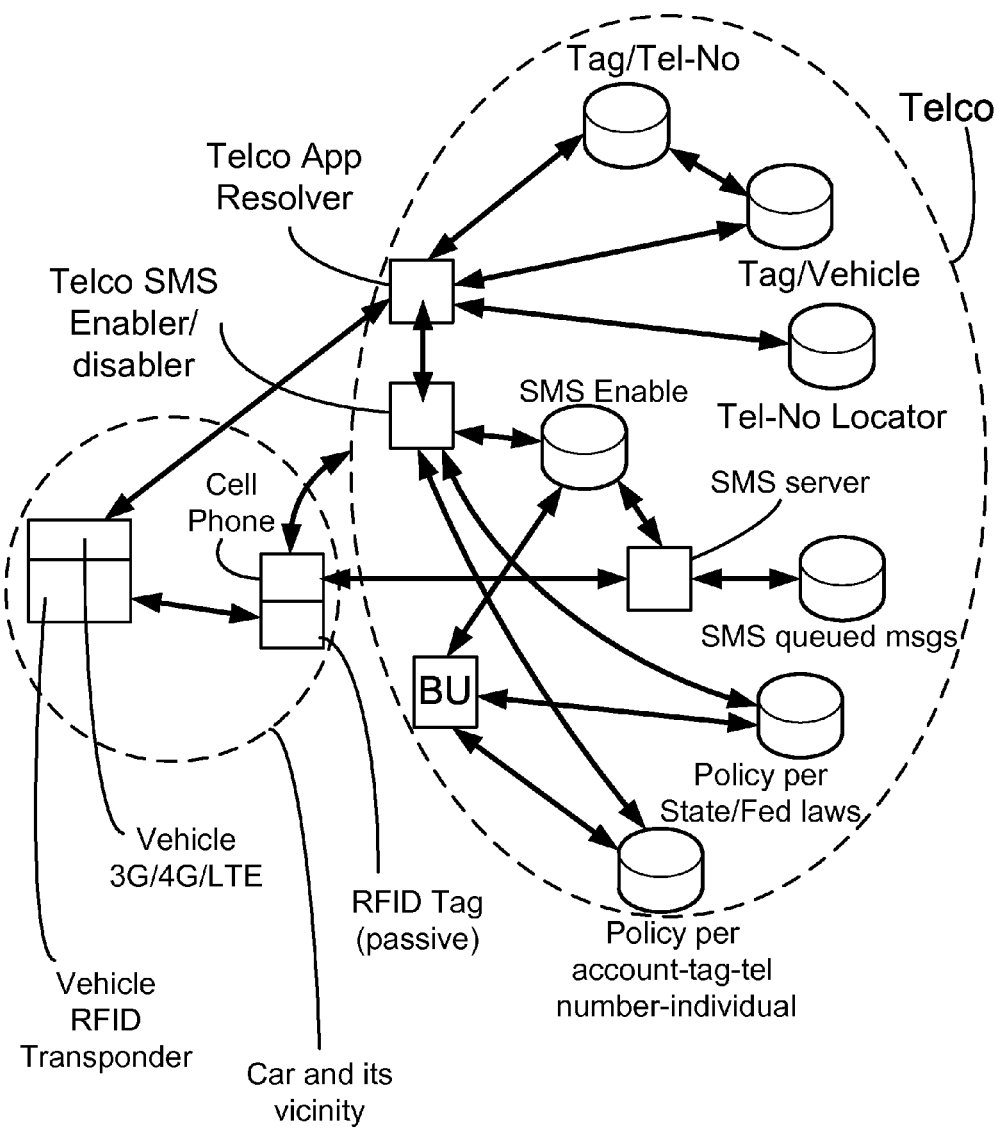
FIG. 19 shows an example of a system of our invention.

Some examples of the system of our invention are given below, using the figures to better illustrate the examples:

In FIG. 19 illustrates an embodiment with a communication device, such as a cell phone, with an RFID tag, attached or embedded in it, as passive or active tag, e.g. with or without battery power supply. This is located in a car or at its vicinity. The other device in the car is located e.g. at the steering wheel or glove box (e.g. embedded, attached, or inside), which comprises of communication device(s) and/or antenna(s) for vehicle's 3G, 4G, LTE, BLUETOOTH®(A wireless technology protocol), WiFi, or similar communication technologies or formats, plus a vehicle RFID transponder(s) (or similar unique tag(s) or identifier(s)).

The tag is unique in terms of software, hardware, or both. For hardware, the unique ID can be embedded (or installed, initialized, activated, programmed, set, prioritized, listed, or priority-listed, permanently or temporarily or periodically or at specific events or instances of time or conditionally or sequentially) in the factory, or by telephone company, telephone company web site, authorized dealer, reseller at the mall, service provider, ISP (Internet service provider), user, administrator, employer, bus company, trucking company, parents, guardians, court, judges, police, insurance company, security company, Federal government, state or local governments, MVA (motor vehicle administration), car manufacturers, telephone manufacturers, cell phone companies, network companies, computer companies, computer manufacturers, GPS manufacturers or service providers, satellite companies and service providers, or other authorities or providers.

The hardware number can be used for uniquely identifying or confirming the user, or the possibility of the right or correct person or user, for a cell or tel. number, for the communication to a car. The "ID number changing station" is the device for changing the ID number set (on hardware or by software), e.g. when changing the car for the user (e.g. for a new company truck, a new car purchased/added, a new car replaced with an old one, somebody with multiple cars, a car with multiple users or drivers, or a rental car used by a new or multiple driver(s)). The association between the vehicle, user, mobile device's cellular number, RFID tag on cellular telephone, RFID tag of transponder, vehicle's communication device's number can be entered, updated, or maintained in one or more tables (e.g., in one or more relational databases).

A database or table or relational database or logical flow chart manages/lists (under the microprocessor or server control) the relationship/correspondence between:

(1) the drivers/users/kids/employees, (2) owners (e.g. people authorized to change the data in database, administrators, police, parents, trucking company, metro or rail company, or authorities), (3) their level of activities and permissions (e.g. driving permission in a rainy day, e.g. as the rain is detected on the windshield by a sensor, or by weather forecast or channel, e.g. as a live feed or information or data), (4) versus the constraints or conditions (such as time of the day (e.g. daylight, e.g. 11 am), or age of the driver (e.g. between 16 to 18, or 16.5 years old), or having a passenger other than parents in the car (which can be more limitations on the young driver, on driving permits or privileges, under the age of 18, in some states or jurisdictions, by law), or having the alcohol level in the blood or breath not legal for driving, or being too tired or sleepy as a driver), e.g. causing the car or telephone to stop, or to reduce the functionality, or alarm the user, or alarm the parents, police, insurance company, or third party, or just record the condition of the user for future reviews (by e.g. police or parents), or adjust the speed, or put a cap/maximum on the speed of the car, or set similar limitations on the car, user, telephone, or all of the above, (5) environmental parameters and conditions (such as icy road or speed of rain/wind or temperature on the surface of the asphalt/road), (6) car tag numbers or engine numbers or ID mapped to the name or ID or biometrics of drivers, (7) ID or biometrics or passwords or other identification information of the drivers, (8) ownership of the phones or handsets, (9) ownership of the tel. numbers,

(10) multiple users of the phone, e.g. may be separated by IDs and passwords. (Or, in another embodiment, they may be not separated at all, under the same account number),

(11) multiple users of the car,

(12) multiple users of the cars, versus phones, versus conditions of usage of the cars and phones, versus tel. numbers,

(13) current car used, history, or most likely to be used in the future (e.g. using neural networks or fuzzy logic, e.g. to train or predict the future usage or probability of usage a specific car), and

(14) current phone or phone number used, history, or most likely to be used in the future.

Alcohol level and being sleepy can be recognized by iris or eye recognition/pattern recognition software on eye/iris/eyelid or head movements or speech patterns or speech recognition module in the car, installed in front of the driver. The breath analyzer for the alcohol level measurements can be installed as well, in the car near the driver seat. The size of the person (e.g. kid as a passenger or driver) can be guessed or estimated using the pressure on the seats measured by the sensors in the seat, or the total weight of the passenger, or pressure/tension/force measured on the seat belt, as an indication of the weight, height, and size of the person. That helps to distinguish between the driver and passengers, as e.g. if there is no passenger in the car (e.g. using the seat belt or seat weight information, as an added info), the accuracy of the driver's determination is much higher, for a given analysis.

The identification of the passenger as being a parent or authorized person (e.g. for a young/kid driver) can be done or verified using the cell number of the parent detected, or the telephone set ID/hardware number detected, or the badge or smart ID card detected, or password entered or verified by the parent (e.g. on his or her own phone, or in the car keyboard, or user input or GUI or user-interface or UI or computer on-board), or biometrics (e.g. parents' fingerprints, as detected by a line scanner or a full scanner, on his or her phone or in the car, or by voice recognition or speaker recognition modules, such as saying a password with specific voice of the parent, to increase the security level).

FIG. 19 illustrates an embedment, with the vehicle RFID transponder communicating with RFID tag (e.g. passive or active), attached or corresponding to the cell phone in the car/vehicle (or on/for a person (or located) near the car (e.g. in a neighboring car, or walking outside in the street, for which each has to be distinguished as/versus the right tel. set, to be limited in functionality, e.g. by Telco, controller, processor, authorities, car, or others, as taught in this disclosure)). In one embodiment, RFID tag responds back to the vehicle RFID transponder.

In one embodiment, the vehicle communication device (e.g. communicating via a 3G/4G/LTE network) communicates with Telco's (e.g., through one or more gateways) App. Resolver module, device, or subsystem (e.g., located at a tel. company site), to resolve the real user, versus, for example, the passengers or driver in the neighboring car. The Telco App. Resolver module accesses the tag-tel. number and/or tag-vehicle table, database, listings, or relational/cross databases, using keys, flags, tags, IDs, or tables, located in one or more databases or tables. The various databases can also communicate/query or relate or refer/link or map to each other, internally or externally, directly or indirectly, in one or more steps, to find, refer, correspond, or map to a specific user, car, phone, phone number, driver, permission, or function (or lack of function, or limited function).

In one embodiment, the App. Resolver module communicates with tel. number locator (e.g. to check the right phone is about to be disabled), and/or access multiple databases, which uses history data, or last position, e.g. GPS data or triangulation data or cell antenna/tower data, to find the last position of the car/vehicle or cell phone, to calculate or estimate or guess the current position of the cell phone, to e.g. distinguish, find, verify, or certify the right phone/user, to e.g. disable the functionality for right phone/user, e.g. while roaming or driving between cell towers or antennas. In one embodiment, location indicators are used to resolve the right cell number/user as among multiple matches based on queries where identification numbers such as tag IDs on mobile communication devices and/or vehicle transponders may not be unique (e.g., issued on rotating basis).

In one embodiment, the Telco App. Resolver module communicates with Telco SMS enabler/disabler (or other function enabler/disabler module(s) for other formats or devices), to set or adjust a parameter or a function, e.g. in the cell phone or for a user. In one embodiment, the Telco SMS enabler/disabler communicates with SMS enable database for the (current) state (or history of state) of the specific device or user, e.g. as currently-disabled, e.g. for a function of a cell phone, e.g. texting-disabled.

In one embodiment, the vehicle's RFID transponder takes the RFID tag identification of the mobile device that is within its in-range vicinity. In one embodiment, the vehicle's communication unit (e.g., communicating via a 3G/4G/LTE network) transmits the acquired the RFID tag identification of the mobile device to a service provider, e.g., tel. company. In one embodiment, the transmission from the vehicle is done wirelessly. In one embodiment, the App Resolver receives the RFID tag identification of the mobile device, and a query is performed against one or more databases or tables to determine an associated cellular telephone number with the RFID tag identification in question.

In one embodiment, the vehicle's communication unit transmits the RFID tag identification of the vehicle's transponder or an associated identification code to the service provider. In one embodiment, this RFID tag identification of the transponder or the associated identification code is transmitted along with the RFID tag identification of the mobile device. In one embodiment, the RFID tag identification of the transponder or the associated identification code is used in a query to determine the vehicle(s) and/or users/owner of the vehicle(s) associated with the RFID tag identification of the transponder or the associated identification code. For example, such query may be an intermediate step in a more complex query or a result set. Based on the identification of user/owner or account holder, the corresponding mobile device identifier(s) (e.g., associated cellular telephone number(s)) is (are) determined via querying one or more table or databases with data relating mobile device identifiers and users/owners/account holders.

In one embodiment, the vehicle's transponder receives the mobile device's identification code (e.g., cellular tel. number) from the RFID tag attached or associated to the mobile device or to its user. In one embodiment, the vehicle's communication module transmits the mobile device's identification code to the service provider (e.g., a tel. company).

In one embodiment, the vehicle's transponder receives an identification code from RFID tag attached or associated with the mobile device (or its user). Such a code may be the RFID tag identifier of the RFID tag itself. Then, the unit in the vehicle resolves the identification code received from the RFID tag attached to associated with the mobile device or its user, to an identification code associated with the mobile device (e.g., the cell. Tel. number). In one embodiment, the resolver module in the vehicle uses a local database, table, memory/storage to query for the associated mobile devices' identification code, matching with identification code received from the RFID tag. In one embodiment, the resolver module in the vehicle uses a remote application/database (e.g., by communicating with a server on a network via the vehicle's communication's module) to transmit and resolve the identification code received from the RFID tag, and to receive the identification code associated with the mobile device (e.g., the cell. Tel. number). Then, the vehicle's resolver module transmits the identification code associated with the mobile device to the service provider (e.g., tel. company) in order to modify the functionality of the mobile device (e.g., disabling the SMS capability of the mobile device).

In one embodiment, the vehicle's unit transmits its GPS data indicating its location to a remote resolver (e.g., in a tel. company), e.g., via the vehicle's communication module.

In one embodiment, the vehicle's unit receives an identification parameter from the remote network (e.g., the tel. company) after transmitting data such as the tag ID associated with the mobile device and/or the tag ID of the vehicle's transponder. The vehicle's unit uses the received identification parameter in its later communication to the remote network to identify the events/status related to the mobile device coming in-range or out of range of the transponder. In an embodiment, the vehicle's unit communicates or transmits data to the resolver module (e.g., at tel. company), and receives an identification parameter from the resolver. Then, the vehicle's unit sends/communicates/transmits information, such as, the in-range or out of range or periodic signals about the status of the mobile device to enabler/disable module (e.g., in tel. company) along with the received identification parameter. In one embodiment, a module such as the resolver generates the identification parameter and communicates that parameter and the resolved identification of the mobile device (e.g., tel. number) to the enabler/disabler module and/or store in a session database/table/storage accessible (directly or indirectly) to enabler/disabler module for later access. In one embodiment, when the enabler/disabler module receives a relevant event transmitted from the vehicle's unit (or from the resolver) tagged with the identification parameter, the enabler/disabler unit determines the resolved identification of the mobile device (e.g., tel. number) by querying the session database/table/storage for matching received parameter. In such an embodiment, the resolver is used at the beginning to resolve the mobile devices' identification number, and the enabler/disabler unit is used to modify the status of the functionality of the mobile device as the vehicle's unit transmits relevant messages. In one embodiment, the identification parameter includes the identification of the mobile device (e.g., tel. number). In one embodiment, the identification parameter, as a generated code, masks the identification of the mobile device (e.g., tel. number) from the vehicle's unit.

In one embodiment, a BU (batch updater module) updates regularly (or based on a trigger or central processor or control unit) the status or states of functions, parameters, or cell phones. (Note that the order of applying these steps can be mixed or reversed for the same purpose or result. Thus, the method described here is just one example for the illustration of how a typical system works.)

In one embodiment, the SMS enable database(s) or storage(s) communicates with the SMS server (which can be from outside), which communicates with the cell phone in the car/with the user. (This can be conditional or dependent on other parameters or events or triggers, controlled by a controller unit or module.) The SMS server communicates with the SMS queued messages database or storage(s), to get or store them for now or future access, e.g. if the texting is not allowed for 2 hours, or while driving (to store or hold the incoming messages for that period of time). In one embodiment, after the permission is given, the messages can be delivered to the user, or the user be alarmed or notified, e.g. by a text message or a special ring tone, for the stored messages or files, to be viewed or downloaded or transferred, automatically, or by user. In one embodiment, the indication of the permission is provided by resetting the status associated with the mobile device in Enable/Disable database/table by a module such as batch updater and/or enabler/disabler.

In one embodiment, the SMS server (e.g., an SMSC) checks the full policy and constraints or conditions, from scratch, to see if e.g. it should disable the phone, in one embodiment. However, in another embodiment, to speed up the process, the full policy check up can be done in another module or processing unit, separately, and then, the result can be accessed by SMS server, as a simple flag or status lookup/checking (e.g., in a Enable/Disable table/database), to make the task less time consuming for the SMS server, to help the scalability of the system.

The policies, rules, tel numbers, vehicle information, and tags (or other data) can be stored in one or more databases, lists, tables, or relational databases.

The policies per state/local/Federal laws (conditions or constraints) are e.g. for age of the driver, e.g. maximum or minimum age limits, which may be different in each region or jurisdiction, as matched to a database, using a table or listing or logical relationships, e.g. to find the age limit, or speed limit for a specific stretch of a highway. This can be done using e.g. GPS, satellites, or triangulations, using multiple cell towers or antennas or other users or cars nearby, to find or locate the car, user, or phone set, to match to the coordinate of a road or jurisdiction, to specify the road or jurisdiction, e.g. for speed limit or age limit, or combination of them (as a conditional basis, e.g. speed limit based on the age (of the driver) schedule or table or formula or relationship or condition).

The policy for account/tag/tel number/user/individual, e.g. custom-made or set by the user or user's/driver's parents, can generally be different per person. It can be checked regularly, e.g. every hour. This can be updated or checked at some frequency, regardless of connection to a car (or triggering). This is useful for the case that the system is hung up on a limbo (in-between or vague or unstable) state or status, so that the system can come out of that state, and function normally after that.

The Telco SMS enabler/disabler module and BU (batch updater) unit or module regularly access policy per state or Fed law unit or database and policy per account/tag/tel number/tel set/individual database, to process and update the new or updated policies and conditions, to reevaluate or reset the parameters.

The enabler/disabler unit can reset/set based on some events (e.g., received from the vehicle's unit and/or the mobile device), but if the enabler event does not happen for some reasons (e.g., vehicle's unit is turned off prior to transmitting an enablement event), then updater unit (e.g. periodically) comes by and sets the status to enable status, so that the functionality status of the mobile device does not get stuck in an undeterminable, locked out, or in-between status or state. In one embodiment, the batch updater examines the current time, the timeout (or an expiration) field, and a timestamp associated with the status of the functionality of the mobile device in the Enable/Disable database/table. In one embodiment, if the expiration time is passed, the batch updater unit enables the functionality (or restores the functionality) on the status entry for the mobile device.

In one embodiment, the vehicle's unit sends periodic in-range messages associated with a mobile device in its in-range vicinity, to the service provider. In one embodiment, the period of transmitted in-range messages is shorter than the expiration period of the status entry associated with the mobile device in Enable/Disable database/table. In one embodiment, the expiration period is determined by static or dynamic policies. In one embodiment, the period for transmission of the in-range messages from the vehicle is determined based on the expiration period associated with the status entry for the mobile device. In one embodiment, the period for transmission of the in-range messages is communicated to the vehicle's unit from a module (such as enabler/disabler).

One embodiment, e.g. depicted in FIG. 19, comprises 3 basic parts or steps or subsystems: (1) initiating section; (2) updating section (e.g. to come out of the lock-out or limbo situation, e.g. using time-outs, to come out of an infinite loop, to reset the phone or system); and (3) behavior or instructions of SMS server, based on policies and constraints, explained above. These can be done by any methods or formats of communications between cell phone, vehicle/car, user, and service provider/Telco, similar to the methods explained above, to e.g. start, stop, enable, disable, limit, or expand a function or action or ability or module or unit of a car, phone, or combination of both.

In one embodiment, an optional emergency number or web site is provided to access to unlock the SMS or texting function, e.g. parent's phone number. In one embodiment, if one dials 911 or police or fire department or hospital or doctor's office (e.g. stored in a separate database or list as exceptional or emergency number or contact), the lock is automatically removed, without further action by the user. The list of emergency people or locations can be stored on one's tel set, or in service provider's site or server, or Telco's site or module or database (or customized by parents, or factory-installed e.g. in memory unit(s), e.g. RAM or ROM or disk or hard drive). Note that each database or processor or controller in our teaching can have optional memory units or data storages. In one embodiment, upon receiving an emergency number, a module (e.g., in tel. company) sends a message to enabler/disabler and/or batch updater to enable the functionality of the mobile device. In one embodiment, further messages from vehicle's unit to disable the functionality of the mobile device are not made effective by the system. For example, the entry associated with the mobile device on the Enable/Disable database/table is tagged by an emergency flag/number/code to indicate that this mobile device should not lose its functionality. In one embodiment, further messages from the vehicle's unit are disregarded by the enabler/disabler module for disabling the functionality of the mobile device when the query of entry shows the presence of the emergency tag indicator. In one embodiment, the SMS server disregards the disabled status entry in Enable/Disable database/table associated with a mobile device when the entry is tagged with an emergency tag indicator. In one embodiment, a batch updater clears the emergency tag indicator on the status of the mobile device's functionality, based on factors, such as, policies, expiration time of emergency period, and whether the mobile device is still in use in emergency mode.

In one embodiment, as depicted e.g., in FIG. 19, the service provider/Telco communicates with the cell phone in the car/vehicle, with client command, for commands, instructions, or flags, transmitted to the cell phone, as described elsewhere in this disclosure.

In one embodiment, as depicted in FIG. 19, a tel can be associated with multiple cars/vehicles, as noted in a database, but the exact position (or which car) at a given moment can be found by GPS on the phone or car or user, or triangulation by towers or cell units or antennas. This can be verified on a lookup table or the history or the recent tracking of the car or phone or user, to guess or estimate the current position of the car or user, from e.g. the vector velocity for the car and the road last traversed (or vicinity of location last detected, as a circle or radius, with a lower probability of the current location, as further it gets away from the last location/3D-coordinates detected).

Note that the velocity or speed and direction of the car or the pattern of acceleration or speed of the car and the time intervals between different detections of the car determine the range or general vicinity of the possible current car location(s), as a set of ranges or coordinates or regions in the 2-D or 3-D/dimensional maps (e.g. with the help of beepers, beacons, sensors, satellites, airplanes, aerial flying devices, global positioning systems, or GPS).

In one embodiment, multiple cars or drivers (e.g., a rental car situation or truck company), the resolution of the ambiguity between one-to-many tags-tel numbers is achieved as described above. For example, in one embodiment, for rental cars, the assignment of the car or driver is temporary, and the assignment will be changed by the rental car company, whenever the car is given to a new driver. In one embodiment, the assignment is determined by the corresponding data from the rental agreement, and/or set to expire at the end of the agreement period. In one embodiment, the association of the users and the vehicles are updated by the rental car company through an interface to the service provider (e.g., database/tables).

In one embodiment, the telco or service providers or network owner can charge the user or users on each side, e.g. per changing status, per storage of messages, per size of messages, or per transactions. It can be a fixed amount per month, per plan, for a maximum allowance per month, in one example. In one embodiment, there is a charge per resolving, per setting/resetting the status of the functionality, and/or per SMS server accessing Enable/Disable database.

The assignments of tel numbers/tags/hardware ID or numbers to users can be at different levels and multiple ways. For example, it can be done by the tel company or tel set manufacturers. Blocks of numbers or tags or IDs are assigned to manufacturers, or on a rotating basis, or using a prefix number to designate a firm or company, using e.g. field-programmable devices or factory-set. It can also be set or read from the telco offices or databases, when programming or initializing the tel sets or devices. The updates can also be fed to databases or through batch processing, in one embodiment.

Note that in FIG. 19, as different embodiments, the cell phone (or communication or computing gadget or smart phone or tablet) or vehicle RFID transponder (or both) can communicate back and forth with telco (or service provider), to provide information and/or receive instructions or commands from telco. In addition, the policy databases and analyzer and controller can all be in the car or cell phone, instead of telco or remote place, as other embodiments. However, the decentralized policy databases require further work to update individually for so many users and cell phones. In some embodiments, the modules or databases/data stores may be on different networks, and/or servers/computers. In some embodiment, various modules may be integrated on the same platform/server/computer. In some embodiments, various modules may be integrated as machine readable code within the same code, executing on a server/computer.

Figure 20:
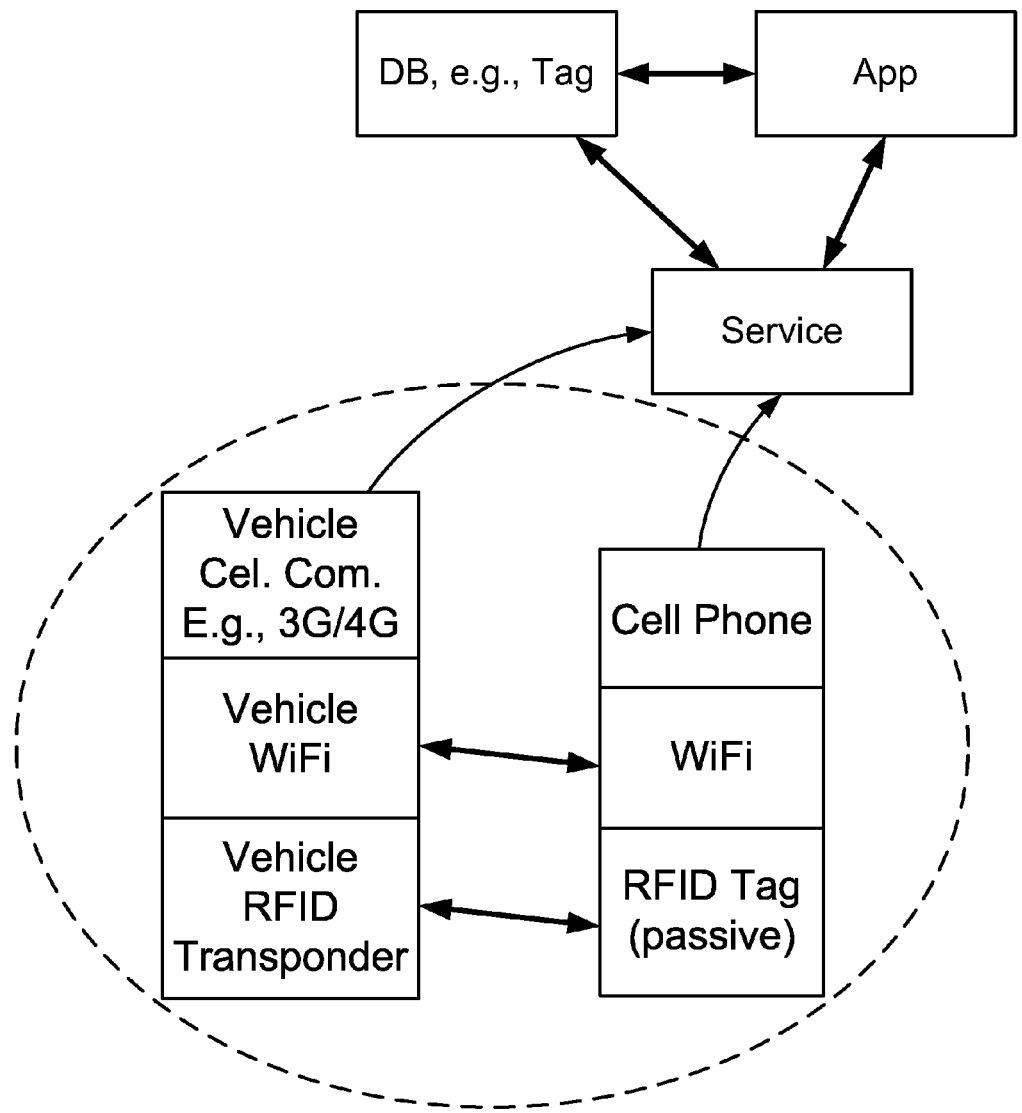
FIG. 20 shows an example of a system of our invention.

FIG. 20 depicts an embodiment where a vehicle sends a message to the mobile device (e.g., cell phone), e.g. locally, e.g., via Wi-Fi (or any a format or convention or a mode of communication), to have the cell phone turn off its SMS (or Short Message Service, or text communication service) capability temporarily. In one embodiment, such signals are sent periodically. In one embodiment, the decision making to disable functionality (i.e., smarts/brain/microprocessor/controller) reside mostly in the telephone (set or mobile device), so that the reset action is performed by the mobile device, and not necessarily by the vehicle, as it may not be too reliable, when it comes to turning functionality (e.g., SMS) on. But some other embodiments have different allocation of controller functionality and resources between the car, telephone, and telco or service providers, and more responsibilities and decisions or hardware/software may be allocated to other entities, e.g. telco or car.

In one embodiment, as shown for example in FIG. 20, message(s) may be sent to the telco/service provider to prevent SMS messages coming (or going), as well, and/or to store them, to have less possibility of circumvention by the user.

In one embodiment, as depicted for example in FIG. 20, the vehicle RFID transponder communicates with RFID tag (e.g. passive or active) attached or associated to the mobile device or its user, to get an ID (identification) or identifier associated with a tel/cell phone, corresponding to or attached to or inside or embedded in the cell phone (e.g. loosely-connected, e.g. not directly or electrically, but may still physically attached). In one embodiment, the RFID tag responds back to the vehicle RFID transponder, which is a device located in the car/vehicle. In one embodiment, the vehicle Wi-Fi unit (attached/corresponding to the vehicle RFID transponder, the device located in the car) communicates with WiFi with the cell phone, to transmit an indicator/instructions for the cell phone to disable a functionality (e.g., SMS), as described elsewhere in this disclosure. In one embodiment, the mobile device has a service/background process listening on messages from the vehicle's unit, and receives the ID (e.g., RFID tag identification) through the WiFi channel. In one embodiment, the mobile device's process compares that ID with the RFID tag identification associated with that mobile device to determine whether its RFID tag had entered within in-range vicinity of the vehicle's transponder (as opposed to another RFID tag associated with another mobile device). In one embodiment, the transmission from the vehicle's WiFi communication is transmitted or broadcast to multiple WiFi enabled mobile devices.

In one embodiment, the vehicle's unit transmits its own identifier (e.g., the transponder's RFID tag identification, or its cellular/satellite communication identifier or number) to the mobile device via a communication means such as WiFi or BLUETOOTH®(A wireless technology protocol). In one embodiment, the vehicle unit's identification is transmitted to the Service (e.g., in Telco) by the vehicle's communication unit or the mobile device via a network (e.g., a wireless network such as a 3g/4 g/LTE network). In one embodiment, a secondary communication means (e.g., WiFi) between the vehicle unit and the mobile device provides a reliable mode of communication, compared with a weaker communication link such as RFID which may be tailored to be limited in its extent or coverage.

In one embodiment, the vehicle's unit communicates with other mobile devices in its WiFi range. In one embodiment, unique (or semi-unique) identifiers are obtained from one or more of the mobile devices (for example by the vehicle unit). In one embodiment, these identifiers are matched against a group plan database/tables to determine whether any one of these mobile devices may be used for forwarding messages (or functionality) destined for the mobile device identified to be in-range (i.e., with functionality disabled). For example, a phone call or an SMS message may be forwarded to another mobile device that is not within in-rage vicinity of the transponder. In one embodiment, such matching and resolution is done by the service provider, e.g., after the data is communicated to the service provider by the vehicle unit or the mobile device. In one embodiment, such matching or resolution is performed by a module in the vehicle unit locally (or via a remote network), and then the forwarding information is provided to the Telco, by the remote network, the vehicle unit, or one or more of the mobile devices.

In one embodiment, as for example depicted in FIG. 20, a service/module, for example at telco, gets transmission or communication from the vehicle unit or the mobile device. In one embodiment, the service provider comprises databases and/or applications to resolve the mobile device's identification, enable/disable functionality for the mobile device, and/or update the status (e.g. based on the time-out or expiration), e.g. to turn the SMS on, as the mobile device goes out of in-range vicinity. In one embodiment, the Service communicates with a Tag database, which is accessible by the App (application or module which can do read/write), which may also be communicating with the Service. This is for setting/limiting the functions of the cell phone, as described above in more details. The above can be programmed by telco or user. In addition, Telco can turn off the SMS capabilities and store the messages for future transmission or view.

The communications can be based on any format or convention, e.g. 3G or 4G (3rd generation mobile telecommunications or the fourth generation of cellular wireless standards), WiMAX (Worldwide Interoperability for Microwave Access, a telecommunications protocol that provides fixed and mobile Internet access), or LTE (Long Term Evolution, a standard in the mobile network technology).

Figure 21:
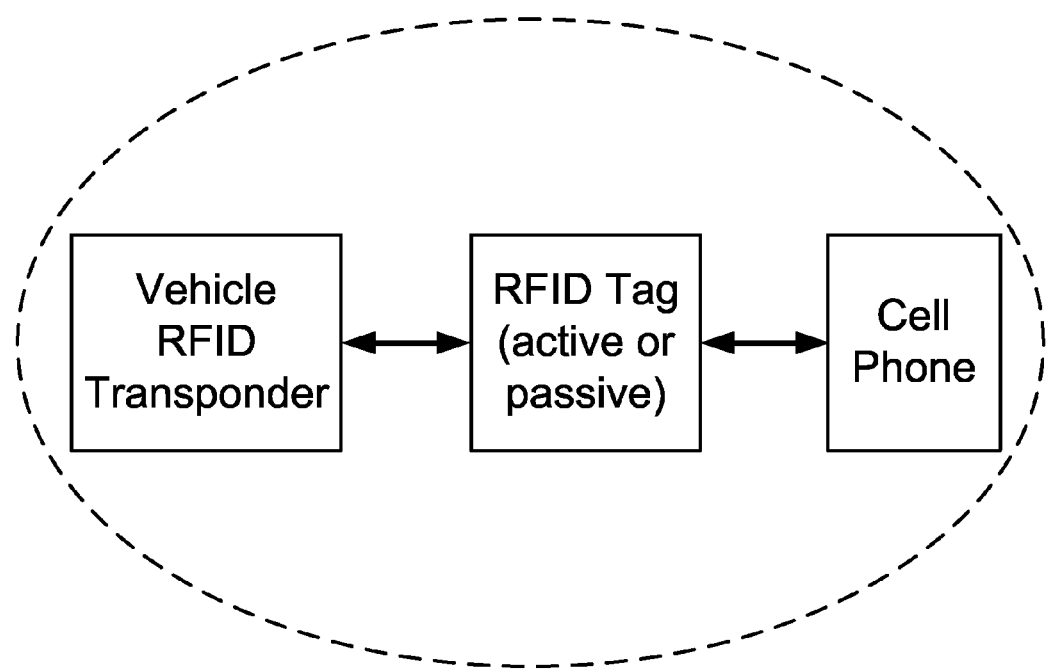
FIG. 21 shows an example of a system of our invention.

In one embodiment, as depicted for example in FIG. 21, the RFID mechanism itself is used to communicate and indicate to the mobile device (e.g., cell. phone) to disable the functionality (e.g., SMS), directly. In one embodiment, an analog/digital (A/D) interface is used at the tag or at the mobile device. In one embodiment, the connection/communication between RFID tag and cell phone is a base-band signal (from RFID tag to cell phone), when A/D is at Cell Phone. In one embodiment, that communication (between RFID tag and cell phone) is digital data/signal, when A/D is at the Tag. In one example, the frequencies/range of values used are 13.5-15.5 MHz. In one embodiment, a mixer is used at the RF frequencies to recover data.

In an embodiment, as depicted for example in FIG. 21, the vehicle RFID transponder communicates with RFID tag (passive or active type). In one embodiment, the RFID (Radio-frequency identification) tag responds back to the vehicle RFID transponder. In one embodiment, the RFID tag communicates with cell phone, for the instructions, e.g. to limit the functionality of phone, as described above. The tag in this case is connected to the cell phone directly, for direct communication with the mobile device.

Figure 22:
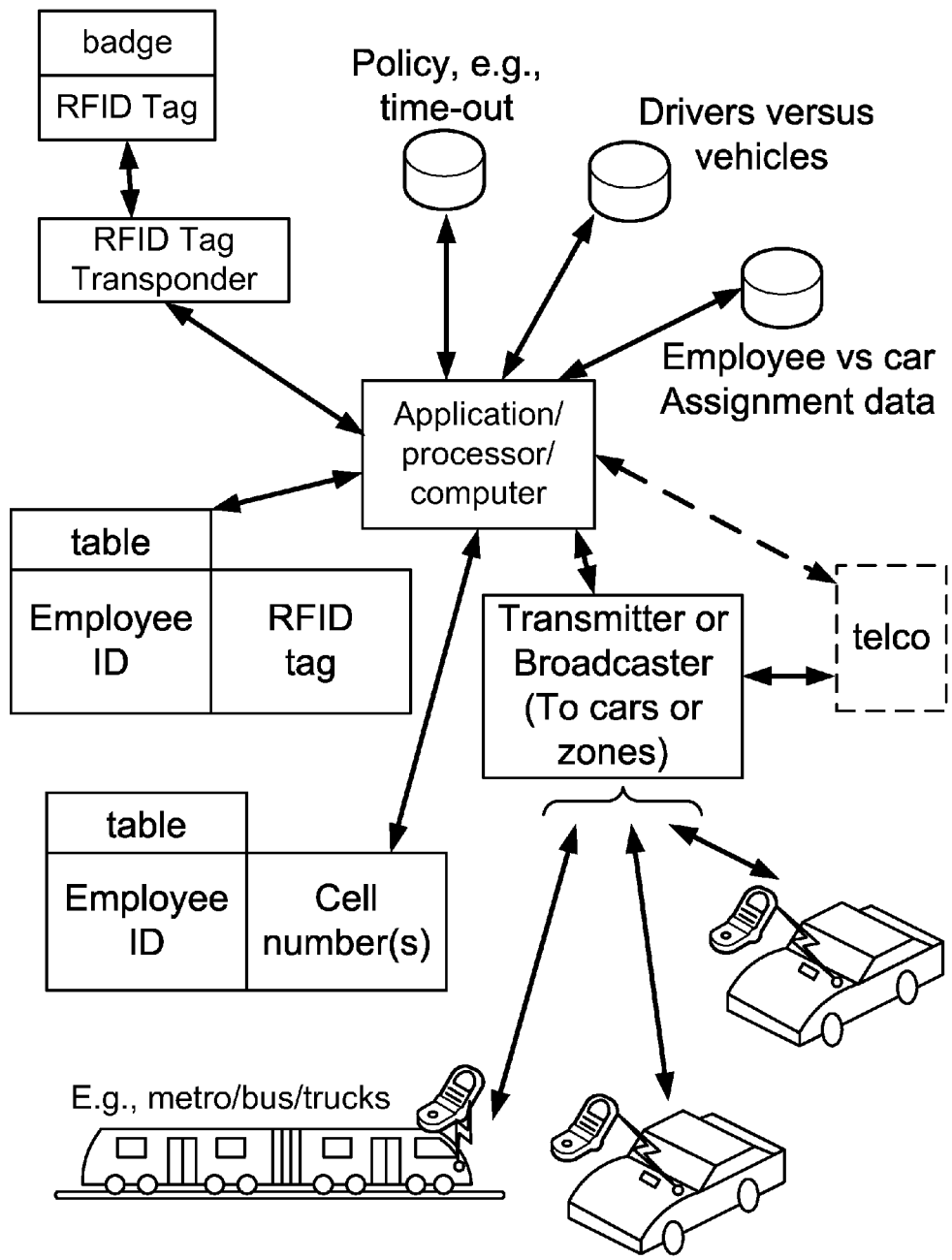
FIG. 22 shows an example of a system of our invention.

FIG. 22 depicts another setup/system configuration/application, for our invention described above:

This setup is useful for e.g. the trucking or bus or delivery or metro/rail company, with multiple cars and drivers, e.g. each identified with a smart card (e.g. embedded chip, antenna, processor, memory unit, and/or beacon), or a badge worn by the driver or attached to him/her (e.g. carried on the user, to enable the system to work). In one example, it has an RFID tag (in the badge, embedded or attached) (e.g. passive).

In FIG. 22, RFID tag transponder (located at metro car driving cabin or near bus driver's seat) communicates with the badge, and the badge responds back to the RFID tag transponder. In one embodiment, the RFID tag transponder communicates with processor or central server or controller (decision maker) unit (for the car ID). The event of interest is whether the badge is in or is out of the zone of interest (near the driver seat, for example), to indicate the location of the driver or phone/mobile device.

In one embodiment, as depicted in FIG. 22, the processor/management application communicates with database(s) and queries/uses the tables for employee ID vs RFID tags and tables for employee ID versus cell numbers. The processor also communicates with the tables or database(s) for driver versus vehicles (as an optional embodiment), or it can communicate with employee vs car assignment database (as an optional embodiment). Like Telco, described above, processor can communicate with policy database or rules tables (e.g. time-out situation resolution).

In one embodiment, as depicted in FIG. 22, the processor communicates with the transmitter or broadcaster unit or module (as an optional way or method/system), which broadcasts to the cars or different zones, which connects inside the cars, using different protocols, such as WiFi. Alternatively, in another embodiment, the broadcaster or processor connects to telco, to communicate to the telco, about the instructions e.g. to turn off the messaging capability of the cell phone (or e.g. deal with the time-out issues). Alternatively, in another embodiment, the broadcaster is replaced by a transmitter, to transmit directly to specific car or metro rail unit.

In one embodiment, as depicted in FIG. 22, the tag does not have to be placed or attached on the cell phone or mobile device, which may be easier to manage for the organization, and it reduces the risk and liability for the organization (e.g., a bus, truck, taxi, or rail company).

In one embodiment, as depicted in FIG. 22, the detection of in-range event (e.g., between the transponder and the RFID tag, e.g., attached to a badge or a key/switch e.g., for operating a vehicle) does not necessarily entail that the mobile device(s) associated with the (badge) holder is within the in-range vicinity of that transponder. For example, the mobile phone might have been lent out to a family member and not carried with the (badge) holder at the time the in-range event occurs. In one embodiment, for example, the exception entry may be used in a database for the holder (e.g., for a period of time), in order to prevent disabling of the associated mobile device via one or more transponders (e.g., associated with the organization or holder). Conversely, if the holder obtains a temporary mobile device (e.g., with a different identification number), a temporary or additional entry (e.g., set to expire at a certain duration or event) may be made in a database/table to disable the functionality for the temporary mobile device upon such in-range event, in an embodiment.

Figure 23:
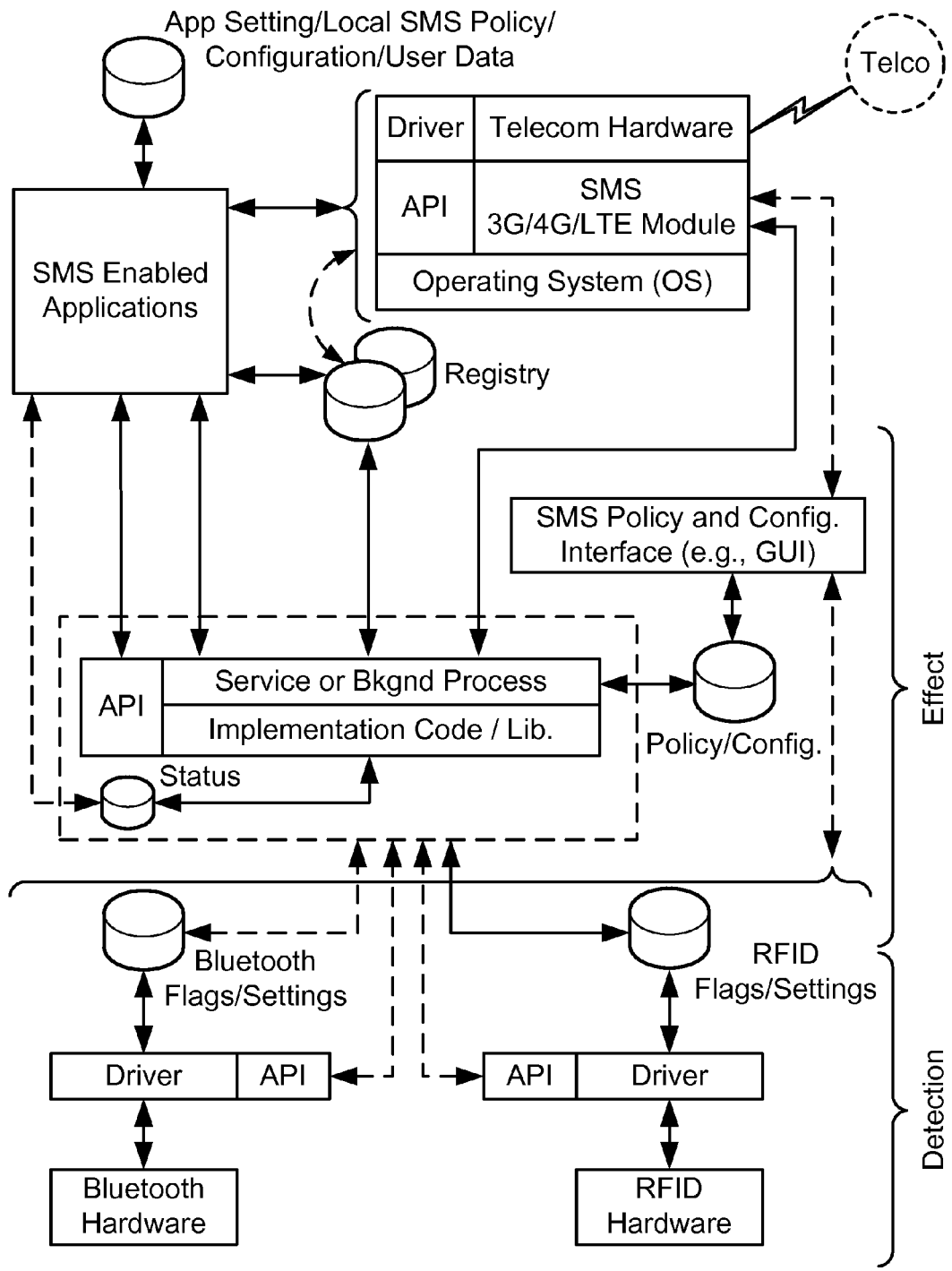
FIG. 23 depicts relationship between SMS applications and RFID on a communication device (e.g., smart phone) in an embodiment of this invention.

In one embodiment, e.g. in FIG. 23, the RFID hardware/circuitry connected to the communication device (e.g., smart phone), is accessed via a software driver to control and communicate with the RFID hardware. In one embodiment, the RFID hardware includes a firmware that accesses memory locations on the communication device to read/set values and flags related to the operation and settings of the RFID hardware/firmware. In one embodiment, software driver accessing the RFID hardware sets/reads from memory locations on the communication device. In one embodiment, the RFID software driver is provided with Application Programming Interface (API) to allow other modules/programs/services to access and communicate with the driver, e.g., by calling driver's public methods/functions/procedures.

In one embodiment, RFID settings and flags are kept in memory locations on the communication device. In one embodiment, RFID settings and flags include settings such as power levels (e.g., in case of active RFID), threshold power level, RFID tag setting, RFID tags of the communicating transponder(s), in-range/out-range status and/or timestamps for in-range/out-range events.

In one embodiment, in FIG. 23, the codes/data are essentially organized into modules used for in-range/out-range detection and modules for responding or affecting such events based on policy and/or configuration. In an embodiment, such policy and/or configuration is partially or wholly kept on memory locations on the communication device. In one embodiment, such policy and/or configuration include the policy and configuration with respect to SMS service response and function of the communication device with respect to in-range/out-range events and/or status, as well as timeout settings, for example, for turning on the SMS functionality, if in-range signal/data/event is not received.

In one embodiment, an interface module/application is provided to set, maintain, and/or view one or more policies and settings. In one embodiment, the interface provides a graphical user interface (GUI) to set, maintain, and/or view one or more policies and settings. In one embodiment, a service or a background process is provided to affect the policies and settings (including those for SMS) when for example in-range/out-range events are detected, and/or timeout has reached. In one embodiment, such service is provided with an API and implementation code/library for other modules/applications access and call its public methods/functions/procedures. In one embodiment, an SMS enabled application discovers the process by interrogating a registry directly or via the operating system. In one embodiment, the service provider or the network uses the SMS module on the mobile device to interface with policies/configurations data store in order to set, read, update the configurations and policies on the mobile device.

In one embodiment, e.g. in FIG. 23, an SMS enabled application registers itself with a registry as an application that requires receiving SMS related events such as disablement/enablement due to in-range/out-range status/events. In one embodiment, an SMS enabled application is registered with the registry, by calling an API (e.g., associated with a module in the operating system or a telecommunication module) which in turn registers the application with the registry. In one embodiment, the change in SMS status related to in-range/out range events or timeout is sent/pushed to the SMS enabled applications.

In one embodiment, the service or background process affecting SMS events, periodically and/or upon change in status/events, interrogates the registry and sends/pushes messages to the SMS enabled applications/processes that are registered with the registry. In one embodiment, a SMS enabled application pulls/gets SMS status related to in-range/out range events or timeout from the service or background process by calling its API or sending an inquiry message to the service or background process.

In one embodiment, a SMS enabled application pulls/gets SMS status related to in-range/out range events or timeout by interrogating or querying those events from database/data store/memory locations.

In one embodiment, an SMS enabled application provides a visual or audio feedback and/or enables, disables, and/or alters access to SMS functionality, upon the change in the SMS status with respect to and related to in-range/out range events or timeout expiration.

In one embodiment, e.g. in FIG. 23, the service or background process communicates SMS status related to in-range/out range events or timeout, to SMS module (e.g., for 3G/4G/LTE or operating system) to enable/disable SMS capability on the communication device. In one embodiment, even if an SMS enabled application does not directly communicate with the service or the background process, the SMS capability of the application is effectively disabled, when the SMS module (e.g., for 3G/4G/LTE or operating system) disables the SMS capability.

In one embodiment, the SMS module disables or causes to disable the communication device's SMS capability by sending a corresponding message to the telephone company. Upon receiving the message, the service provider (e.g., the telephone company) disables the SMS capability for that mobile device. In one embodiment, the mobile device will not be able to transmit an SMS message to the service provider. In one embodiment, the service provider rejects the sent SMS message. In one embodiment, the service provider, stores the sent SMS message, until the SMS capability is resumed.

In one embodiment, the transmission of short messages between the SMSC (or a network element) and the mobile device uses the Mobile Application Part (MAP) of the SS7 protocol. For example, the Messages are sent with the MAP MO- and MT-ForwardSM operations.

In one embodiment, e.g. in FIG. 23, the enablement or disablement of the SMS function for a mobile device is initiated from the service provider or the network. In one embodiment, the SMS module on the mobile device receives the corresponding message (signaling enablement or disablement of SMS service) from the network, and it calls/signals/or sends a message to a service or a background process to update the SMS capability status on the mobile device. In one embodiment, the SMS status (update/change) is pushed to SMS enabled applications. In one embodiment, the SMS enabled applications are notified about the SMS status by an API call to the operating system, service/background process/or SMS module, or via an error/status code returned from an API call. In one embodiment, there is no direct connection between the service/background process and the detection modules (e.g., RFID hardware, driver, or data stores). The change in the SMS status is sent via the network (e.g., the telephone company) or update via the service/background process at a timeout expiration.

The antennas for transmissions or receiving signals and data can be embedded in the smart cards, ID cards, badges, phones, or car sections or panels (e.g. windshield or glove box). The antennas can be 2 dimensional flat or 3-dimensional circular or helix or spiral or spring shaped, as an example. The antennas can be directional, as an example. The antennas can be ring or multiple-rings shaped, as an example.

The detection program can run on the background, and e.g. when GPS data or triangulation analysis indicates that the car or phone is moving at speeds higher than S (e.g. 7 miles per hour, e.g. driving in the road), then the controller decides that prevention software kicks in or gets activated, to stop or limit the phone calls or texting, as described elsewhere in this disclosure.

In one embodiment, the distinction is made between riding a metro or train versus driving a car. For riding a metro (other than the operator of the metro), the passengers should not have any restrictions on their cell phones, but driving a car may cause accidents in the highway, requiring restrictions on use of the phone, according to the rules, conditions, and laws, as described elsewhere in this disclosure. Thus, using the GPS and mapping information/coordinates, from a database, the controller or processor distinguishes between the route taken by the rider in those 2 situations, to distinguish between riding metro and driving a car, which have 2 different consequences: In the first case (riding metro), there is no limitations on the use of the phone or texting. But, in the second case (driving a car), there are some or total limitations and restrictions, as explained above.

The new maps are updated centrally through e.g. service provider central feed database for download or automatically and periodically. Alternatively, they can be read through the local posts and antennas or towers, located and distributed throughout a jurisdiction boundaries or region, which are fed and updated by local businesses and governments, e.g. restaurants or museums, for passing cars nearby to handshake and acknowledge and automatically download wirelessly the new mapping or city information, about the constructions and new roads or detours or any new businesses in the region, e.g. to encourage tourism and direct people correctly based on the new updated maps, e.g. to gas stations. The synchronization of the version of the local map for updating the map can be based on the version number of the map, e.g. "Washington D.C. Map Version 3.12.134", or just focusing on smaller regions or streets or maps, for faster download of the data. The update of the map can be done at home, as well, e.g. by cable, through a user's computer, before the trip to a new city, e.g. through the city's web site, as an example.

Dialing 911 (or other emergency numbers or parents or bus company manager) can override the software that controls the restrictions on the phone, to allow the call or text go through. The system goes back to restriction mode, after the emergency call is over, to restrict the phone use or functions again, in one embodiment. But in another embodiment, the emergency mode stays on, and the restriction software/mode is disabled, until the administrator or authorized entity removes that lock or latch from the emergency mode (later on). In addition, any emergency call can be broadcasted or forwarded automatically to designated people, such as police or parents or e.g. ADT security company.

The solutions above can be client-centric or network-centric. For example, in one embodiment, all the calls can go to a central location or center for storage and delay transmission, until the driver ceases to drive, and the caller can get an automatic message (voice or text) from the central location or controller or processor that the driver cannot take/answer the phone, due to driving/law, or the message can be custom-made by the user, as a pre-recorded message(s), e.g. for specific people or person or caller's tel number(s).

Text-to-speech technology can also be added to the above solutions, for more safety, e.g. using BLUETOOTH®(A wireless technology protocol) technology for communication in the car, to hear the voice rather than reading the text, or talk on the phone as hands-free, or use voice-commands to do the functions in the car or for phone (to convert the voice commands to the text or computer or device or phone commands or codes or instructions). Or, alternatively, the controller communicates with a tag or dongle or card or removable memory unit or memory card or badge or key chain, so that if the key chain is located within the driver's zone (near driver's seat), or is attached to a hardware in the car, it causes that the restriction software gets activated and limits the phone or text usage.

This invention can also apply to laptops or other musical or entertainment or computing devices or any electronic gadgets, in the car or plane or train, which some entity wishes to restrict or turn off, during some time or specific operations.

The specific state or jurisdiction or authority can go and access the database or rules for that jurisdiction, and update laws, rules, and restrictions, based on the new laws passed e.g. from local congress or legislation or executive branch of the government. This way, there are no interruptions in the systems described above. The same can be done by parents, on the restrictions custom-made for their kids, through the database of the rules that they own and control, e.g. from their PC or computer at home, with an easy user-interface, to change the rules, as they wish. Of course, parents cannot change/access/override the rules or databases controlled by the government, as they kept and accessed separately and securely, and cannot be accessed without proper authority and identifications. Regular biometrics and security technologies can be added to our system here, such as hand, fingerprint, face, eye, iris, voice, signature, and any pattern recognition schemes or methods or modules, added and communicated to the processor or central controller, through the devices in the car or on the phone for detection or recognition, such as line scanner for fingerprint scan, connected to or communicating with a recognition analysis module and database in the car or phone set or telco.

As described above, the position of the phone in a car can be found by triangulations by sensors placed in the car, or by power detected from the phone, as they receive less power, as they are farther away, for a given power (or energy or voltage or current measured) at the source. This can be based on transmission or reflection of the signal from the source. The array of signal generators and array or matrix of detectors or sensors can be used to get the angle of signal received to pinpoint the position of the phone in the car, with respect to the driver's zone (near driver's seat). Multiple RFIDs and tags can be used with this setup, as well, to increase the accuracy of the detection of the location. The same concept can be used for the position of the car in the city, versus the map.

For directional detection, one uses the overlap of 2 detections, or intersection of 2 circles or spheres, to find the location of the object, as it belongs to two or more regions or satisfies two or more mathematical equations, for which the overlap or common answer results in the exact current location/coordinates of the object of interest, e.g. tel./cell telephone set. Phase array antennas or dipoles can be used for detection of the objects. Or, the antennas (or signal source) can be rotated, and the result being analyzed, versus the angle of the rotation, for the position determination of the object/phone.

The neighboring car passenger or a person walking outside of the car is distinguished from the real driver/user the same way as described above, using the car ID, GPS location, tel set ID number, tel. number, or history/pattern of locations/speed of the user, which gives a probability of a location of the user/phone at a given time, compared to others around him/her, for pinpointing the driver's location (or real user of the interest, versus neighboring car passengers, who should not be affected at all, in terms of disabling their phones and putting constraints on them).

Another method of finding the position of a phone set is the delay in the time of arrival from a signal, relative to a fixed time or time zero as the reference time, or the differences in time delay as relative delay periods or traveling periods. The speed of signal in the medium (V) times the time delay (delta (t)) produces the difference/delta in length or distance the signal traversed (delta(L)):

$$\text{delta}(t) * V = \text{delta}(L)$$

This can be used in combination of the array of detectors or sensors/signals/microstrip antenna array, or dipole phased array, to get an accurate position of the source/signal, as described in details elsewhere in this disclosure.

Location approximation methods such as those for Wi-Fi 802.11 systems, e.g. cell of origin, distance-based (lateration) techniques, time of arrival, time difference of arrival (TDoA), received signal strength (RSS) method, angle based (angulation) techniques, location patterning (pattern recognition) techniques, Angle of arrival (AOA) techniques, operational phase, and calibration phase, are used in combination of the system of our invention here.

The iris or eye detection or pattern recognition software also can warn the driver or other people outside the car, if the driver's eye is not focused toward the front of the car for a large fraction of the time or for a long period during the driving, as an indication of distractions during the driving for any reason. The warning module is installed in front of the driver to pick up the images of the driver's eyes or head, and it makes sound, light, text, or tel warning notices to the driver or third party (inside or outside the car).

The restrictions of use can be based on location and time, as parents can specify those every morning for the young driver/teenagers, in the control or processor module, through a keyboard or tablet or phone set or user-interface or their PC/computer at home, connected to the control module or phone, via cable or wirelessly. The restrictions can be mandatory by law or by choice/parents'. When going to a new jurisdictions, e.g. crossing the state line to a new state, while driving, the new law of the new jurisdiction is loaded or accessed by the system, from a new database or a central database, to obey the correct rules and laws. The GPS and other methods mentioned above can be used to find the location of the car, for proper jurisdiction assignment by the processor/controller.

The social network and Tweeter and other services can be controlled (and forwarded/answered/stored/auto-reply the messages) using the processor. The zones such as school zones and restaurant zones can add their own restrictions through the added databases, which is monitored and accessed by the processor.

To have compatibility between the devices and phones, a central unit or processor can convert/receive the messages and signals received from different gadgets with different formats, and make them unified and translated to a single format or other formats for other gadgets to understand or be able to process.

The enabling or disabling or limiting functions of user or car or phone are set or determined by one or more of the following: service provider, network provider, tel company, governments or police, tel set manufacturers, car, car manufacturers, car dealers, agents of the above, resellers, courts, parents or guardians, building owner, business owner (e.g. restaurants), schools, school districts, taxi, or the like, through the phone, hardware or software, telco, car, central processor, antennas, towers, remote processor or controller, HQ (headquarters for the company), RFID, or similar technologies, as mentioned above, e.g. by code, manually, automatically, periodically, or based on a trigger event(s). The function of the car, such as ignition, gear box, and brakes can also be changed or affected.

All of the rules and databases from different sources or authorities can be combined logically in a central analysis database for the sake of speed or convenience. The duplicate rules or conditions with a bigger range (versus conditions with smaller range of values allowed) can be eliminated, to speed up the analysis. For example, if one rule by court says that "no driving after 6 pm is allowed", but the parent rule says that "no driving after 9 pm is allowed", then only the more limiting rule (smaller range) survives, and the other rule is unnecessary (and thus ignored or eliminated) (at least temporarily, until the conditions are changed again). Thus, in the above example, the surviving rule is: "no driving after 6 pm is allowed".

Of course, duplicate rules are also unnecessary and not useful at all, and can be ignored altogether. For example, if both parent and local law have the same exact rule that "kids under the age of 18 should not text at all in the car, even as a passenger". Then, only one of these 2 rules is needed for final analysis and filtering or limitation of functions of user/phone/vehicle.

In addition, if Federal rules can override the local rules, then in the rule analysis, that can simplify the comparisons, by eliminating or simplifying the logical relationships or logical terms, mathematically, to reduce the analysis time and total rule size, to speed up the analysis process and processing time for the central processor or analyzer or controller. For example, the restrictions on age of the driver or passengers, or time of driving, e.g. at night, corresponding to the limitations in text or call functions, available to the driver or passengers, as a rule, set by Federal laws or local laws, can be simplified or combined this way, mathematically or logically, similar to the example given above.

The threshold for the range of RFID detection or sensitivity can be adjusted for better accuracy of determination (reducing overlap between two tags, and reducing errors in false negative or positive of detection of the RFID tag).

The codes or ID numbers for components or devices do not have to be absolutely unique in the universe. As long as the probability of repeat number or code is small, one can combine that with other patterns or features in the system, to come up with a unique or almost unique identifier with almost or close to 100 percent probability (but not necessarily exact 100 percent). This relaxation of the conditions makes the generation or guarantee for uniqueness of the codes or IDs much easier and less expensive (e.g. to track, update, generate, or maintain, by a central or distributed authority, or authorities).

Overall, this invention saves lives and reduces the cost to consumers and insurance companies, as well as governments, among other benefits. For example, lots of warnings, e.g. by sound or image or lights, can be given to the driver or passengers or authorities outside the car, to prevent the accidents or discourage the driver, from the violations of the rules or laws. Auto reply/messages for email, text, or SMS can be generated for all relevant people, e.g. parents or friends, to remove the pressure on the driver to reply. This can be combined with locking the keyboard or phone, as described above.

The processor can also manage and prioritize/store/retrieve the messages or text, based on the predetermined list of names, as an example, in the order that user prefers, set or programmed beforehand. It can put a different ring tone on each person's message, for identification by ear/sound/music. It can also mention the name of the caller, by pre-recorded voice of the user or same caller person or third party, or just using generic computer voice, by computer hardware/software, e.g. to read a text as a speech, for a content of the email or text message. The recorded voices can simulate a specific person's voice, as well, or use pre-recorded words/typical sounds by that person, to combine in new words or sentences, to completely pronounce a sentence or word, by attaching or combining pieces of sound or voice, as a simulation of a person talking. This can be combined with neural network and fuzzy logic modules, to train the system, or improve the transitions or extrapolations for unknown samples or words, for better/smoother pronunciations In one embodiment, the system of our invention above can also be combined with a breathalyzer ignition device, for extra safety and analysis. In one embodiment, the user interface (or GUI) is added to the system for user's or administrator's intervention, or manual adjustment or reset, if needed, e.g. if the system is stuck in an in-between, undeterminable, or unstable status or state.

The teaching for mobile or cell phone in general can be applied to any first device (e.g. for computational, business, entertainment, music, communication, hobby, or fun purposes) that is connected by cable (e.g. non-wireless) to another (second) device in the car, but the first device being moveable within the car (e.g. with no single fixed position in the car). The teachings can also apply to air traffic controller room, metro or train headquarters or scheduling room, the unmanned airborne vehicles or drone control room (or controller seat), train locomotive or horse cabin (or driver or controller space or seat or zone or region), or similar situations. The teachings can also apply to MMS (multimedia messaging service) and XMS (extending messaging service) formats, as well. SMS server may be replaced with Short Message Service Center (SMSC), in our teaching above.

A system, an apparatus, a device, or an article of manufacture comprising one of the following items or features mentioned above is an example of this invention. A method comprising one of the following steps, features, or items mentioned above is an example of this invention. Any variations of the above teaching are also intended to be covered by this patent application.

The invention claimed is:

1. A system for modifying one or more functions or available choices for a mobile device, said system comprising:
    a first database or table relating or mapping a tag identification associated with said mobile device to a calling identification associated with said mobile device;
    a resolver;
    said resolver communicates with said first database or table, to resolve said calling identification based on said tag identification, using said first database or table;
    a first device comprising one or more of following: a computer, server, processor device, controller device, computing device, integrated circuit, or microprocessor;
    a function enabler or disabler unit, in or on or loaded on or executed on or implemented in said first device, to modify one or more functions or available choices for said mobile device; and
    a second database or table for rules, conditions, laws, policies, or constraints;
    said function enabler or disabler unit communicates with said second database or table, to modify one or more functions or available choices for said mobile device based on said second database or table.

2. The system for modifying one or more functions or available choices for a mobile device as recited in claim 1, wherein said function enabler or disabler unit communicates with said resolver.

3. The system for modifying one or more functions or available choices for a mobile device as recited in claim 1, wherein said system comprises a telephone number locator unit or database.

4. The system for modifying one or more functions or available choices for a mobile device as recited in claim 1, wherein said system comprises a short message service, multimedia messaging service, extending messaging service, text, or call enable unit or database.

5. The system for modifying one or more functions or available choices for a mobile device as recited in claim 1, wherein said system comprises a short message service, multimedia messaging service, extending messaging service, text, or call server.

6. The system for modifying one or more functions or available choices for a mobile device as recited in claim 1, wherein said system comprises a short message service, multimedia messaging service, extending messaging service, text, or call queued message storage or unit.

7. The system for modifying one or more functions or available choices for a mobile device as recited in claim 1, wherein said system comprises a unit or database for conditions, laws, or rules, set by federal government, state government, local government, parent, court, police, guardian, employer, bus company, train company, metro company, trucking company, school, air traffic controller management, owner of a business, or owner of a building.

8. The system for modifying one or more functions or available choices for a mobile device as recited in claim 1, wherein said system comprises a unit or database for relationship between two or more of following: tag, telephone number, vehicle, and telephone hardware, software, or network element identification number or code.

9. The system for modifying one or more functions or available choices for a mobile device as recited in claim 1, wherein said system is a telephone company or service provider subsystem or environment.

10. The system for modifying one or more functions or available choices for a mobile device as recited in claim 1, wherein said system communicates with a communication device of a vehicle or a moving object.

11. The system for modifying one or more functions or available choices for a mobile device as recited in claim 1, wherein said system communicates with said mobile device.

12. The system for modifying one or more functions or available choices for a mobile device as recited in claim 1, wherein said system communicates with said mobile device and a communication device of a vehicle or a moving object.

13. The system for modifying one or more functions or available choices for a mobile device as recited in claim 1, wherein said system comprises a database or unit for exceptional or emergency telephone numbers, contact names, or authorities.

14. The system for modifying one or more functions or available choices for a mobile device as recited in claim 1, wherein said mobile device is a cell phone, satellite-connection phone, smart phone, tablet, computer, communication device, computing device, music device, business device, laptop, server, personal computer, or entertainment device.

15. The system for modifying one or more functions or available choices for a mobile device as recited in claim 1, wherein said system communicates with a vehicle or a moving object, via a wireless subsystem, unit, or network.

16. The system for modifying one or more functions or available choices for a mobile device as recited in claim 1, wherein said function enabler or disabler unit modifies or limits texting, short message service, multimedia messaging service, extending messaging service, or calling capabilities for said mobile device.

17. The system for modifying one or more functions or available choices for a mobile device as recited in claim 1, wherein said system comprises an updater unit.

18. The system for modifying one or more functions or available choices for a mobile device as recited in claim 1, wherein said system comprises a user interface or graphical user interface.

19. A system for modifying one or more functions or available choices for a mobile device, said system comprising:
    a first database or table relating or mapping a user to a vehicle or a moving object;
    a resolver to resolve identification of said user or said vehicle or said moving object;
    said resolver communicates with said first database or table, to resolve identification of said user or said vehicle or said moving object based on said first database or table;
    a first device comprising one or more of following: a computer, server, processor device, controller device, computing device, integrated circuit, or microprocessor;
    a function enabler or disabler unit, in or on or loaded on or executed on or implemented in said first device, to modify one or more functions or available choices for said mobile device; and
    a second database or table for rules, conditions, laws, or constraints;
    said function enabler or disabler unit communicates with said second database or table, to modify one or more functions or available choices for said mobile device based on said second database or table.

20. A system for modifying one or more functions or available choices for a mobile device, said system comprising:
    a transponder to communicate with said mobile device;
    wherein said mobile device is located at in-range vicinity of said transponder;

said transponder receives a first identification code or number from said mobile device; and a communication module;

said communication module transmits wirelessly said first identification code or number from said mobile device to a service provider or a telephone company;

said transponder and said communication module are located in a vehicle or moving object.

21. The system for modifying one or more functions or available choices for a mobile device as recited in claim 20, wherein said communication module transmits a second identification code or number to said service provider or said telephone company.

22. The system for modifying one or more functions or available choices for a mobile device as recited in claim 21, wherein said second identification code or number identifies or is associated with said transponder.

23. The system for modifying one or more functions or available choices for a mobile device as recited in claim 21, wherein said second identification code or number identifies or is associated with said system.

24. The system for modifying one or more functions or available choices for a mobile device as recited in claim 21, wherein said second identification code or number identifies or is associated with said communication module.

25. A system for modifying one or more functions or available choices for a mobile device, said system comprising:

a network element;

said network element receives a calling identification associated with said mobile device;

a first device comprising one or more of following: a computer, server, processor device, controller device, computing device, integrated circuit, or microprocessor;

a function enabler or disabler unit, in or on or loaded on or executed on or implemented in said first device, to modify one or more functions or available choices for said mobile device; and a short message service, multimedia messaging service, extending messaging service, text, or call enable unit or database;

said function enabler or disabler unit sets availability status of said one or more functions or available choices for said mobile device in said short message service, multimedia messaging service, extending messaging service, text, or call enable unit or database.

* * * * *